(12) United States Patent
Uno

(10) Patent No.: US 7,526,580 B2
(45) Date of Patent: Apr. 28, 2009

(54) PERIPHERAL DEVICE

(75) Inventor: Fumitoshi Uno, Okazaki (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 555 days.

(21) Appl. No.: 10/876,715

(22) Filed: Jun. 28, 2004

(65) Prior Publication Data

US 2005/0023339 A1    Feb. 3, 2005

(30) Foreign Application Priority Data

| Jun. 27, 2003 | (JP) | ............................. 2003-185697 |
| Sep. 30, 2003 | (JP) | ............................. 2003-340553 |
| Jan. 30, 2004 | (JP) | ............................. 2004-024088 |

(51) Int. Cl.
*G06F 3/00* (2006.01)

(52) U.S. Cl. ........................................... 710/14; 710/8

(58) Field of Classification Search ........................ None
See application file for complete search history.

(56) References Cited

U.S. PATENT DOCUMENTS

| 6,438,638 | B1 * | 8/2002 | Jones et al. .................. 710/301 |
| 2003/0167393 | A1 * | 9/2003 | Yoshida ...................... 713/168 |
| 2004/0212831 | A1 * | 10/2004 | Imai et al. .................. 358/1.16 |

FOREIGN PATENT DOCUMENTS

JP        A-2002-324040        11/2002

* cited by examiner

*Primary Examiner*—Eron J Sorrell
(74) *Attorney, Agent, or Firm*—Oliff & Berridge, PLC

(57) ABSTRACT

A multifunction device includes a plurality of slots capable of accepting the insertion of media. Initially, the multifunction device is set to a single drive mode (automatic switching mode) and subsequently is set to a multi-drive mode upon receiving a GET_MAX_LUN command from a personal computer. In the single drive mode, a drive is assigned only to one slot in which a medium has been first inserted. In the multi-drive mode, drives are assigned for all of the slots respectively.

37 Claims, 53 Drawing Sheets

USB CABLE REMOVED (PERSONAL COMPUTER POWER OFF)
OR
PERSONAL COMPUTER RESTART (PnP SEQUENCE)

GET_MAX_LUN RECEPTION

DRIVE MODE SETTING PROCESS

GET_MAX_LUN RESPONSE PROCESS

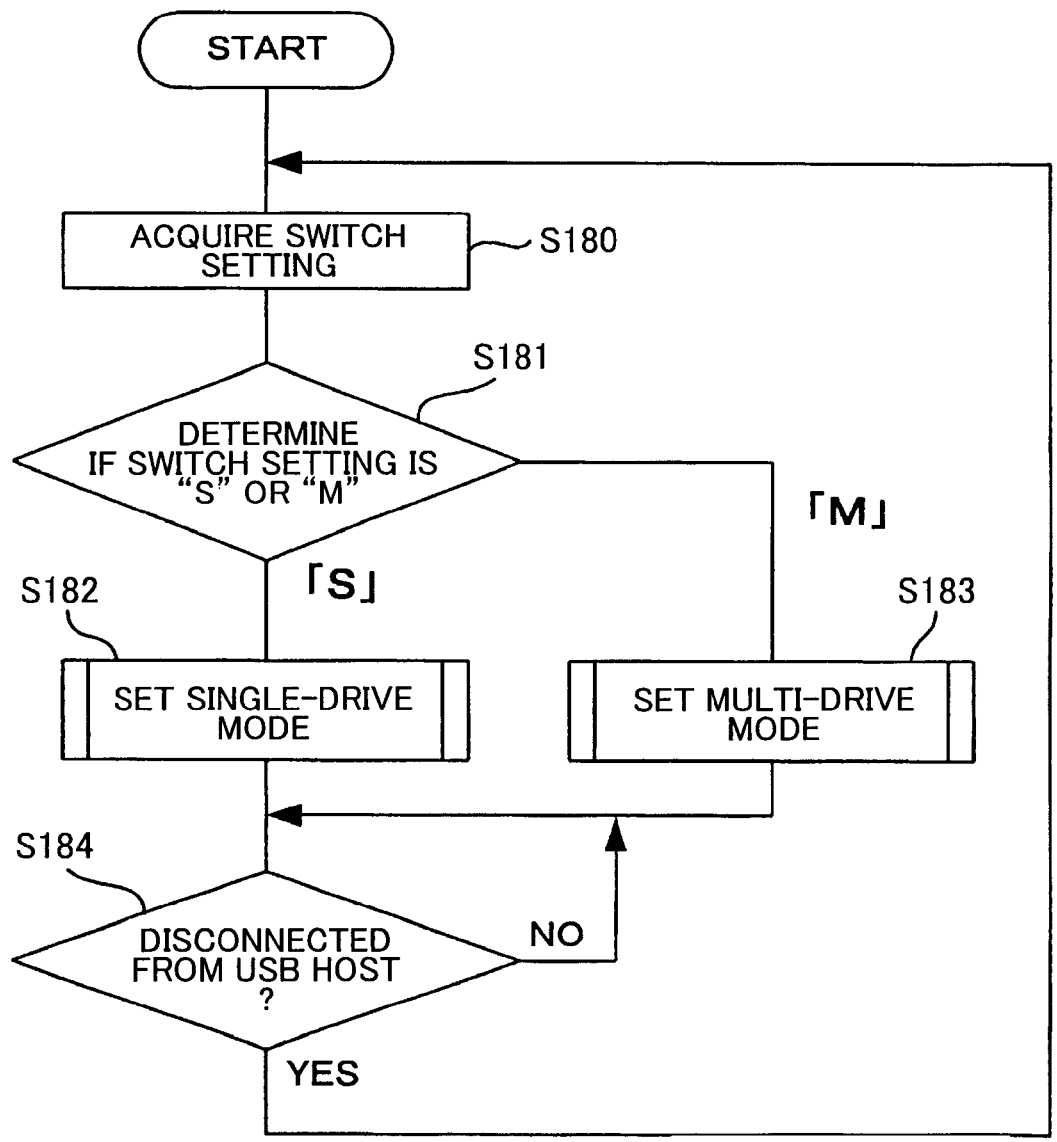

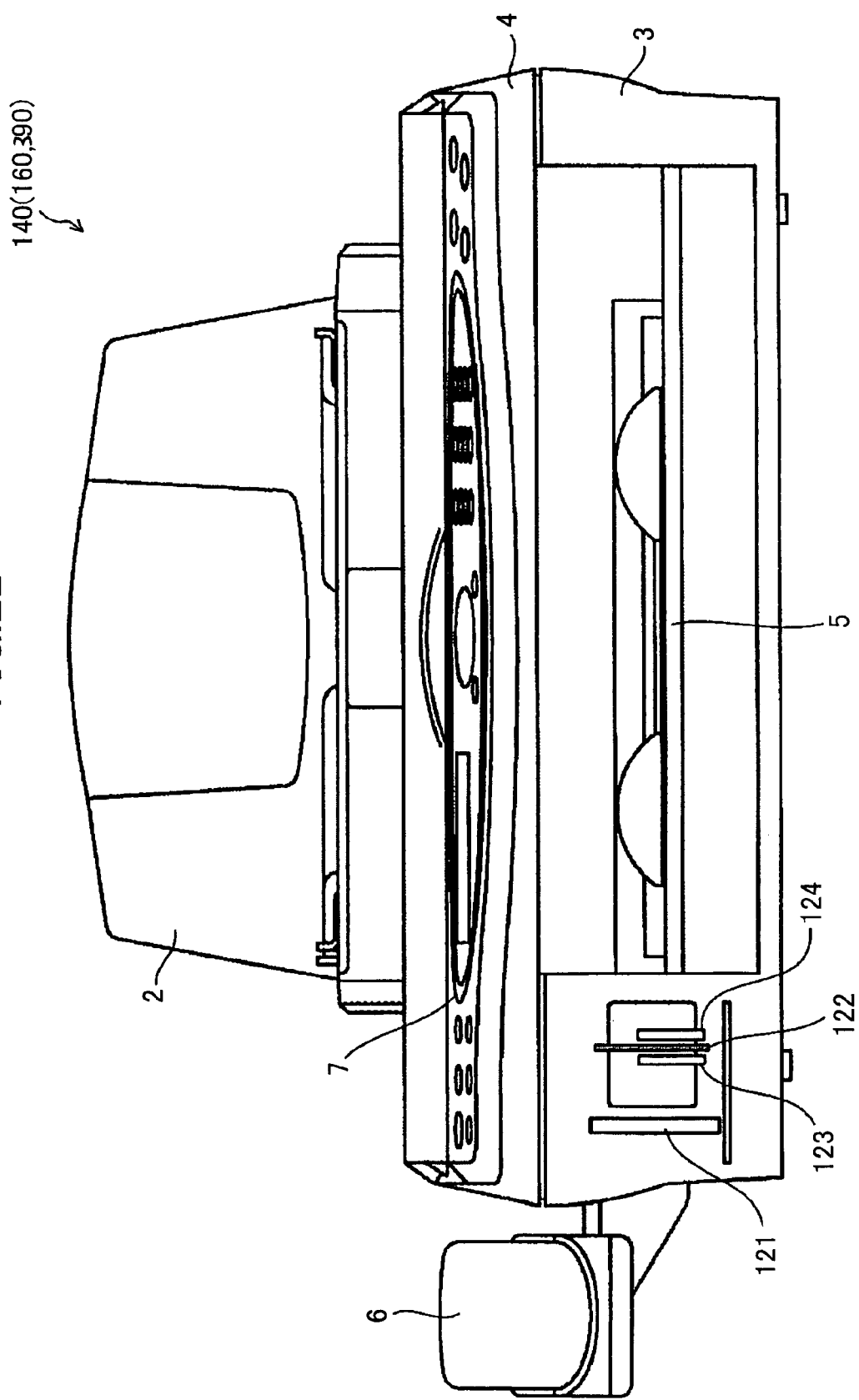

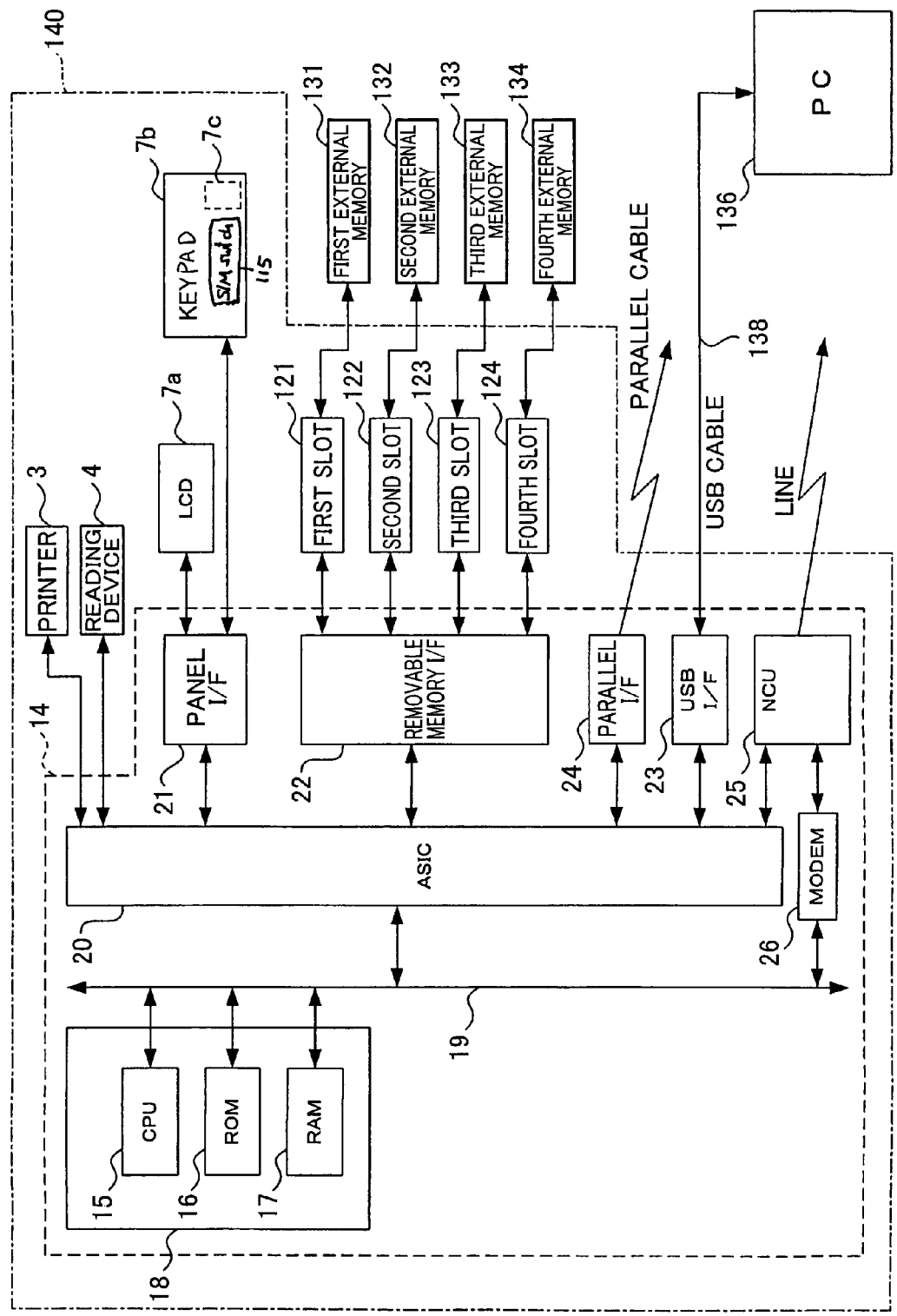

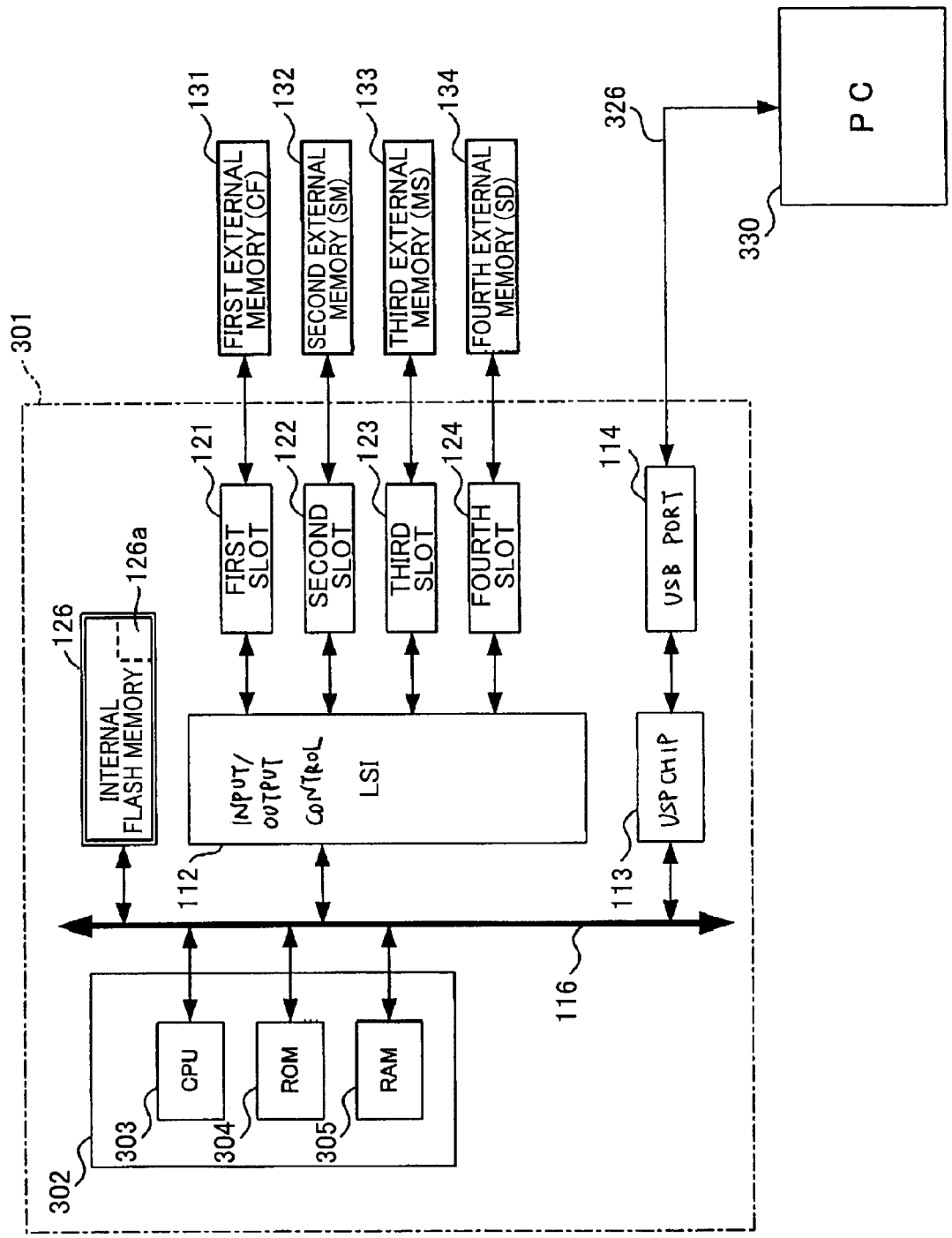

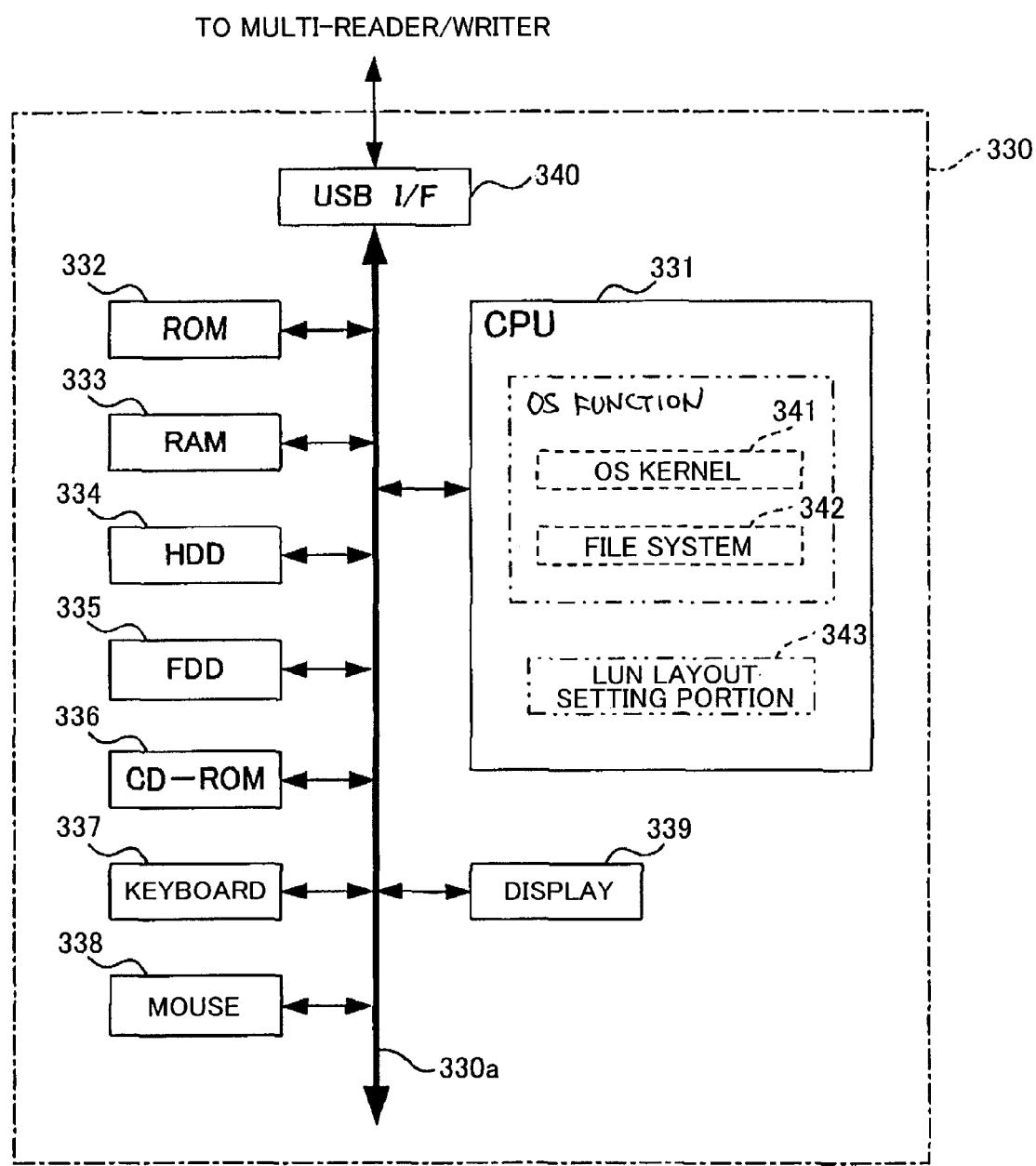

INITIALIZATION PROCESS

GET_MAX_LUN RESPONSE PROCESS

LAYOUT MODE SETTING PROCESS

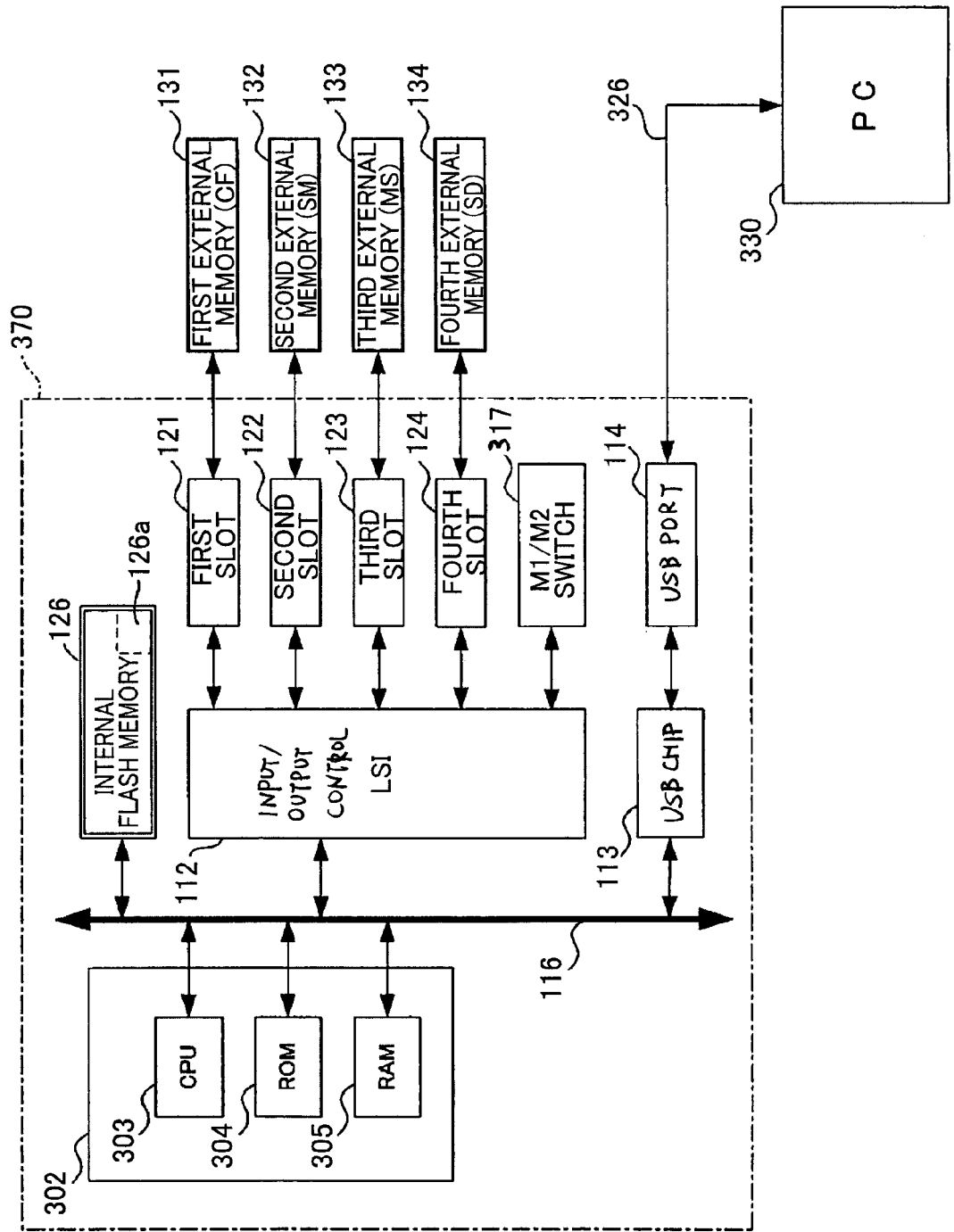

PERIPHERAL DEVICE

BACKGROUND OF THE INVENTION

1. Field of the Invention

The present invention relates to a peripheral device that can be connected to an information processing device, such as a personal computer (PC) and that can read data from and write data to removable media.

2. Description of Related Art

There are available card-type recording media (which will be simply referred to as "media" hereinafter) that are provided with flash memories or the like. These media serve as external memories. Representative examples of the media are: CompactFlash (CF, registered trademark), SmartMedia (SM, registered trademark), Memory Stick (MS, registered trademark), Secure Digital memory card (SD, registered trademark), Microdrive (registered trademark), Multimedia card (registered trademark), XD picture card (registered trademark), Memory Stick Duo (registered trademark), mini-SDs (registered trademark). It is unnecessary to use drive devices for driving these media. These media are therefore used for digital cameras, notebook-type personal computers, and cell phones, and therefore these media should be compact and should have small power consumption.

There are available various types of memory card-reader/writers, which serve as peripheral devices enabling personal computers to read data to and to write data from these media. Representative types of memory card-reader/writers are: a single-slot type; a multi-slot type; and a flash-memory-installed type. The single-slot type memory card-reader/writer is provided with only a single slot to which a medium is inserted. The multi-slot type memory card-reader/writer is provided with a plurality of slots to which a plurality of kinds of media can be inserted. The multi-slot type memory card-reader/writer is therefore capable of reading data from and writing data to the plurality of kinds of media. The flash-memory-installed type memory card-reader/writer is provided with an internal flash memory as well as one or more slots.

The memory card-reader/writer can be connected to a personal computer, for example. In order to enable the personal computer to access a medium inserted in some slot in the memory card-reader/writer, the personal computer has to be installed with a software program (driver software program) for accessing the slot (medium). However, the number of slots accessible from the personal computer is determined dependently on the kind of the operating system (OS) installed in the personal computer.

When the OS installed on the personal computer is a relatively old version OS or a relatively lower rank OS, such as Windows 98SE (registered trademark) or Windows 2000 (registered trademark), the personal computer is installed as standard with a single-reading/writing (single-R/W) driver software that supports the single-slot memory card reader/writer. The single-reading/writing (single-R/W) driver software performs drive allocation for only one slot, and enables the personal computer to read data from and write data to a medium inserted in the one slot.

On the other hand, when the OS installed on the personal computer is a relatively new version OS or a relatively upper rank OS, such as Windows Me (registered trademark) or Windows XP (registered trademark), the personal computer is installed as standard with a multi-reading/writing (multi-R/W) driver software that supports all the single-slot type memory card-reader/writer, the multi-slot type memory card-reader/writer, and the flash-memory-installed type memory card-reader/writer. The multi-reading/writing (multi-R/W) driver software performs drive allocation for a plurality of slots, respectively, and enables the personal computer to read data from and write data to media inserted in the plurality of slots independently from one another. The multi-reading/writing (multi-R/W) driver software performs drive allocation also for an internal flash memory and one or more slots, respectively, and enables the personal computer to read data from and write data to the internal flash memory and one or more media inserted in the one or more slots independently from one another. Hereinafter, the multi-slot type memory card-reader/writer and the flash-memory-installed type memory card-reader/writer will be referred to collectively as "multi-reader/writer", and the multi-reading/writing (multi-R/W) driver software will be referred to as "multi-support driver" hereinafter.

When the multi-reader/writer is connected to such a personal computer that is installed with the older or lower rank OS, a user has to additionally install a special driver software program on the personal computer in order to enable the personal computer to access each slot in the multi-reader/writer. It is troublesome for the user to install such a special driver software program on the personal computer. When the personal computer is installed with the Windows 2000, if the user does not install such a special driver software program on the personal computer, the personal computer can access only a predetermined single slot on the multi-reader/writer.

Japanese unexamined patent application publication No. 2002-324040 has proposed a memory card reader/writer that is provided with two slots and that is provided with a priority selecting switch for setting the priority among the two slots. This conventional memory card reader/writer enables a personal computer, connected thereto, to access one slot that is selected as having a higher priority than the other.

When this conventional memory card reader/writer is connected to a USB port of a personal computer, necessary settings are performed automatically by means of a Plug and Play function. At this time, firmware in the conventional memory card reader/writer determines the slot priority based on the priority selecting switch setting, and reports the slot priority to the Operating System (OS) of the personal computer.

SUMMARY OF THE INVENTION

If the personal computer is installed with the older or lower rank version OS, drive allocation is performed for only one slot that is set with a higher priority, and the personal computer can read data from and write data to a medium inserted in that slot. On the other hand, if the personal computer is installed with the newer or higher rank OS, drive allocation is performed for the plurality of slots according to the priority, and the personal computer can read data from and write data to media inserted in those slots independently.

More specifically, this conventional memory card reader/writer has a SmartMedia (registered trademark) slot and a CompactFlash (registered trademark) slot. It is now assumed that in the personal computer, the A drive is already allocated to a floppy (registered trademark) disk drive and the C drive is already allocated to a hard disk drive. In this case, if the SmartMedia slot is given a priority setting with the priority selecting switch, the D drive is allocated to the SmartMedia slot and the E drive to the CompactFlash slot. Conversely, if the CompactFlash slot is given a priority setting with the priority selecting switch, the D drive is allocated to the CompactFlash slot and the E drive to the smartmedia slot.

In this way, the conventional memory card reader/writer with the priority selecting switch enables even the personal computer that is installed with the older version or lower rank OS to access all the slots. The user does not have to install the special drive software program to the personal computer.

However, this conventional memory card reader/writer with the priority selecting switch enables the personal computer with the older or lower rank OS to access only the slot that is given higher priority. When the user desires to change the driver allocation, he/she has to re-operate the Plug and Play function after manipulating the priority selecting switch to change a higher-priority given slot from one to the other. More specifically, after manipulating the priority selecting switch, the user has to restart the OS of the personal computer, or has to remove the USB cable from the personal computer's USB port and then insert the USB cable in the personal computer's USB port again.

Similarly, even when the personal computer is installed with a newer OS, in order to change the drive allocation (drive letters) for the plurality of slots, the user has to re-operate the Plug and Play function after manipulating the priority selecting switch to change a higher-priority given slot from one to the other.

It may be desirable to modify the conventional memory card reader/writer to have more slots. However, increase of the number of slots will necessitate modifying the priority selecting switch to have more complicated configuration. When the conventional memory card reader/writer is modified to have three slots, for example, it is necessary to modify the priority selecting switch into a three stage switch or a rotary switch that has three selection positions for assigning the highest priority to each of the three switches. This induces an increase in costs.

In view of the foregoing, it is an object of the present invention to provide a peripheral device that improves user-friendliness and that has a simple configuration and therefore that can be made with a low cost.

In order to attain the above and other objects, the present invention provides a peripheral device capable of being connected to a data processing device. The peripheral device includes: a memory receiving portion; a mode setting portion; and a memory-state setting portion. The memory receiving portion receives at least one memory. The mode setting portion sets either one of an automatic switching mode and a multi-drive mode. The memory-state setting portion sets, during the automatic switching mode, a single memory among at least one memory presently received in the memory receiving portion into a state accessible by the data processing device. The memory-state setting portion sets, during the multi-drive mode, two or more memories among at least one memory received in the memory receiving portion into states individually accessible by the data processing device.

According to another aspect, the present invention provides a peripheral device capable of being connected to a data processing device. The peripheral device includes: a memory receiving portion; an association setting portion; a transmission portion. The memory receiving portion receives a plurality of different types of memories. The association setting portion sets association between the plurality of different types of memories and a plurality of logical units, the total number of the logical units being equal to the total number of the plurality of different types of memories, the association setting portion associating the plurality of different types of memories to at least one logical unit among the plurality of logical units, thereby setting at least one drive accessible by the data processing device, the association setting portion associating at least one type of memory to each of the at least one logical unit. The transmission portion transmits data of the at least one logical unit, to which the at least one type of memory is associated, to the data processing device upon receipt of a command from the data processing device, thereby enabling the data processing device to access each of the at least one drive, by indicating the corresponding logical unit, to access one of the corresponding at least one type of memory that is presently received in the memory receiving portion.

According to another aspect, the present invention provides a data processing system. The data processing system includes: a peripheral device capable of being connected to a data processing device; and the data processing device capable of accessing the peripheral device. The peripheral device includes: a memory receiving portion; an association storing portion; and a transmission portion. The memory receiving portion receives a plurality of different types of memories. The association storing portion stores association between the plurality of different types of memories and a plurality of logical units, the total number of the logical units being equal to the total number of the plurality of different types of memories, the association associating the plurality of different types of memories to at least one logical unit among the plurality of logical units, thereby setting at least one drive accessible by a data processing device, the association associating at least one type of memory to each of the at least one logical unit. The transmission portion transmits data of the at least one logical unit, to which the at least one type of memory is associated, to the data processing device upon receipt of the command from the data processing device. The data processing device includes: an accessing portion; an association setting portion; and an association transmission portion. The accessing portion accesses each of the at least one drive, by indicating the corresponding logical unit, to access one of the corresponding at least one type of memory that is presently received in the memory receiving portion. The association setting portion receives a user's manipulation to set the user's desired association, thereby determining at least one of the total number and the type of memory accessible by the data processing device. The association transmission portion transmits data of the set association to the peripheral device, the association storing portion in the peripheral device storing the set association.

According to another aspect, the present invention provides a peripheral device capable of being connected to a data processing device. The peripheral device includes: a plurality of memory receiving portions; a mode setting portion; an association storage portion; a logical unit-assigning portion. Each of the plurality of memory receiving portions is capable of receiving a corresponding type of memory, the corresponding type of memory including at least one kind of memory. The mode setting portion sets either one of an automatic switching mode and a multi-drive mode. The association storage portion stores data of association between a plurality of different types of memories and a plurality of logical units, at least one type of memory being associated to each of at least one logical unit among the plurality of logical units, the at least one logical unit including a predetermined one logical unit. The logical unit-assigning portion assigns, during the automatic switching mode, the predetermined logical unit to one type of memory that is being presently received in the corresponding memory receiving portion and that is one of at least the at least one type of memory that is associated with the predetermined logical unit, the data processing device accessing the one type of memory, to which the predetermined logical unit is assigned, by indicating the predetermined logical unit. The logical unit-assigning portion assigns, during the multi-drive mode, the at least one logical unit to at least one type of memory that is associated to the at least one logical unit, each logical unit being assigned to one type of memory that is associated to the subject logical unit, the data processing device accessing individually the at least one type of memory, to which the at least one logical unit is assigned, by indicating the at least one logical unit.

According to another aspect, the present invention provides a peripheral device capable of being connected to a data processing device. The peripheral device includes: an internal memory receiving portion; at least one external memory receiving portion; a mode setting portion; an association storage portion; and a logical unit-assigning portion. The internal memory receiving portion receives an internal memory. Each of the at least one external memory receiving portion is capable of receiving one type of external memory, the one type of external memory including at least one kind of external memory receivable by the corresponding memory receiving portion. The mode setting portion sets either one of an automatic switching mode and a multi-drive mode. The association storage portion stores data of association between the internal memory and the at least one external memory and a plurality of logical units, at least one of the internal memory and the at least one type of external memory being associated to each of at least one logical unit among the plurality of logical units, the at least one logical unit including a predetermined one logical unit. The logical unit-assigning portion assigns, during the automatic switching mode, the predetermined logical unit to one memory that is associated with the predetermined logical unit, the one memory being either one of the internal memory and one external memory presently received in one of the at least one external memory receiving portion, the data processing device accessing the one memory by indicating the predetermined logical unit. The logical unit-assigning portion assigns, during the multi-drive mode, the at least one logical unit to at least one memory in one-to-one correspondence with each other, each logical unit being assigned to one memory that is associated with the subject logical unit, the one memory being either one of the internal memory and the external memory, the data processing device accessing individually the at least one memory by indicating the at least one logical unit.

According to another aspect, the present invention provides a peripheral device capable of being connected to a data processing device. The peripheral device includes; a plurality of memory receiving portions; a mode setting portion; and a memory-state setting portion. Each of the plurality of memory receiving portions is capable of receiving one memory. The mode setting portion sets either one of an automatic switching mode and a multi-drive mode. The memory-state setting portion sets, during the automatic switching mode, a single memory receiving portion into a state accessible by the data processing device. The memory setting portion sets, during the multi-drive mode, the plurality of memory receiving portions into another state individually accessible by the data processing device.

According to another aspect, the present invention provides a peripheral device capable of being connected to a data processing device. The peripheral device includes: at least one memory receiving portion; an internal memory; a mode setting portion; and a memory-state setting portion. Each of the at least one memory receiving portion is capable of receiving one memory. The mode setting portion sets either one of an automatic switching mode and a multi-drive mode. The memory-state setting portion sets, during the automatic switching mode, either one of the internal memory and a single memory receiving portion into a state accessible by the data processing device. The memory setting portion sets, during the multi-drive mode, the internal memory and the at least one memory receiving portion into another state individually accessible by the data processing device.

According to another aspect, the present invention provides a memory-drive association setting method for setting a memory-drive association for a peripheral device that is capable of being connected to a data processing device and that is capable of receiving a plurality of different types of memories. The method includes: receiving a user's manipulation to input data of the user's desired association between the plurality of different types of memories and a plurality of logical units, the total number of the logical units being equal to the total number of the plurality of different types of memories; associating the plurality of different types of memories to at least one logical unit among the plurality of logical units according to the user's desired association, thereby setting at least one drive accessible by a data processing device, the association associating at least one type of memory to each of the at least one logical unit, thereby determining at least one of the total number and the type of memory accessible by the data processing device; and transmitting data of the set association to the peripheral device.

According to another aspect, the present invention provides a memory-drive association setting program storage medium capable of being read by a computer. The memory-drive association setting program is for setting a memory-drive association for a peripheral device that is capable of being connected to a data processing device and that is capable of receiving a plurality of different types of memories. The memory-drive association setting program includes the programs of: receiving a user's manipulation to input data of the user's desired association between the plurality of different types of memories and a plurality of logical units, the total number of the logical units being equal to the total number of the plurality of different types of memories; associating the plurality of different types of memories to at least one logical unit among the plurality of logical units according to the user's desired association, thereby setting at least one drive accessible by a data processing device, the association associating at least one type of memory to each of the at least one logical unit, thereby determining at least one of the total number and the type of memory accessible by the data processing device; and transmitting data of the set association to the peripheral device.

BRIEF DESCRIPTION OF THE DRAWINGS

The above and other objects, features and advantages of the invention will become more apparent from reading the following description of the preferred embodiments taken in connection with the accompanying drawings in which:

FIG. 21 is a flowchart showing a drive mode setting process according to a fifth embodiment;

FIG. 22 is a front view of a multi-function device according to a sixth embodiment;

FIG. 23 is a block diagram showing the general construction of the multi-function device according to the sixth embodiment;

FIG. 31 is a block diagram showing the general construction of the multi-reader/writer according to the eighth embodiment;

FIG. 32 is a block diagram showing the general construction of a personal computer according to the eighth embodiment;

FIGS. 36(a)-36(c) are flowcharts showing SCSI command response processes executed by the multi-reader/writer according to the eighth embodiment, wherein FIG. 36(a) is a flowchart showing an SCSI command response process (i), FIG. 36(b) is a flowchart showing an SCSI command response process (ii), and FIG. 36(c) is a flowchart showing an SCSI command response process (iii);

FIG. 50 is a block diagram showing the general construction of the multi-reader/writer according to the tenth embodiment;

DETAILED DESCRIPTION OF THE PREFERRED EMBODIMENTS

Figure 1:
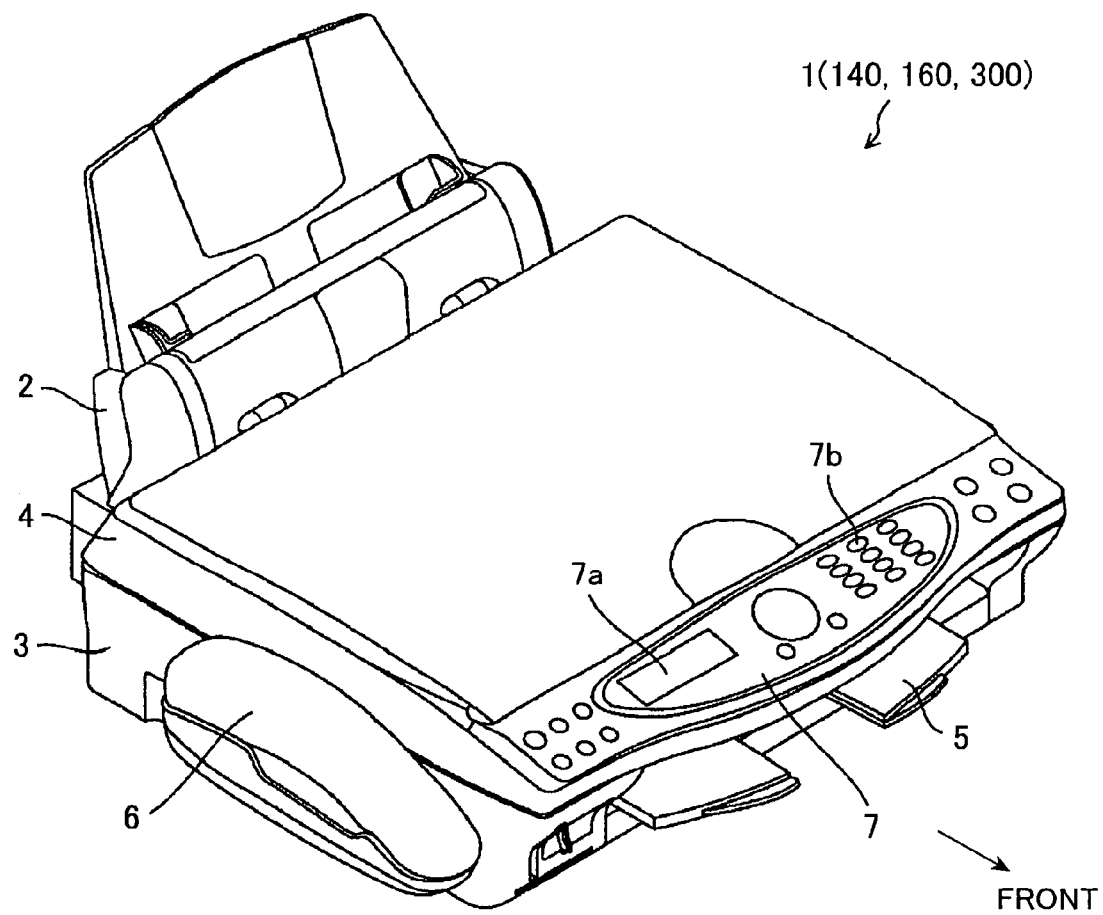
FIG. 1 is a perspective view showing the configuration of a multifunction device of a first preferred embodiment of the present invention.

A peripheral device according to preferred embodiments of the present invention will be described while referring to the accompanying drawings wherein like parts and components are designated by the same reference numerals to avoid duplicating description.

First Embodiment

First, a multifunction device 1 according to a first embodiment will be described with reference to FIGS. 1-10.

First, the overall configuration of a multifunction device 1 of the first embodiment of the present invention will be described with reference to FIG. 1 and FIG. 2. The multifunction device is provided with a printer function, copy function, scanner function, facsimile function, and telephone function.

The multifunction device 1 has a paper feed device 2 located at its rear, an inkjet printer 3 located on a front side of the lower part of the paper feed device 2, a reading device 4 for a copy function and facsimile function located above the printer 3, a paper discharge tray 5 located on a front side of the printer 3, a telephone 6 located on the left of the reading device 4, and a control panel 7 located on the front top part of the reading device 4. The control panel 7 has an LCD 7a and a keypad 7b.

To the left of paper discharge tray 5, the multifunction device 1 has a first slot 8 into which a CompactFlash (CF) card (first external memory 11) can be inserted, a second slot 9 into which a Memory Stick (MS) (second external memory 12) can be inserted, and a third slot 10 into which a SmartMedia (SM) card (third external memory 13) can be inserted.

The first slot 8, second slot 9, and third slot 10 are each provided with a memory detection switch (not shown) that is physically turned on when the external memories 11-13 are inserted. When a memory detection switch is turned on, the associated detection signal performs an interrupt to a control section 14 described later. Therefore, when an external memory is inserted in one of the first through third slots 8 through 10, the control section 14 identifies the slot into which external memory has been inserted, and when a plurality of external memories are inserted in corresponding slots, the control section 14 remembers the order of insertion.

The control section 14 is provided in the multifunction device 1 for controlling each component.

Figure 3:
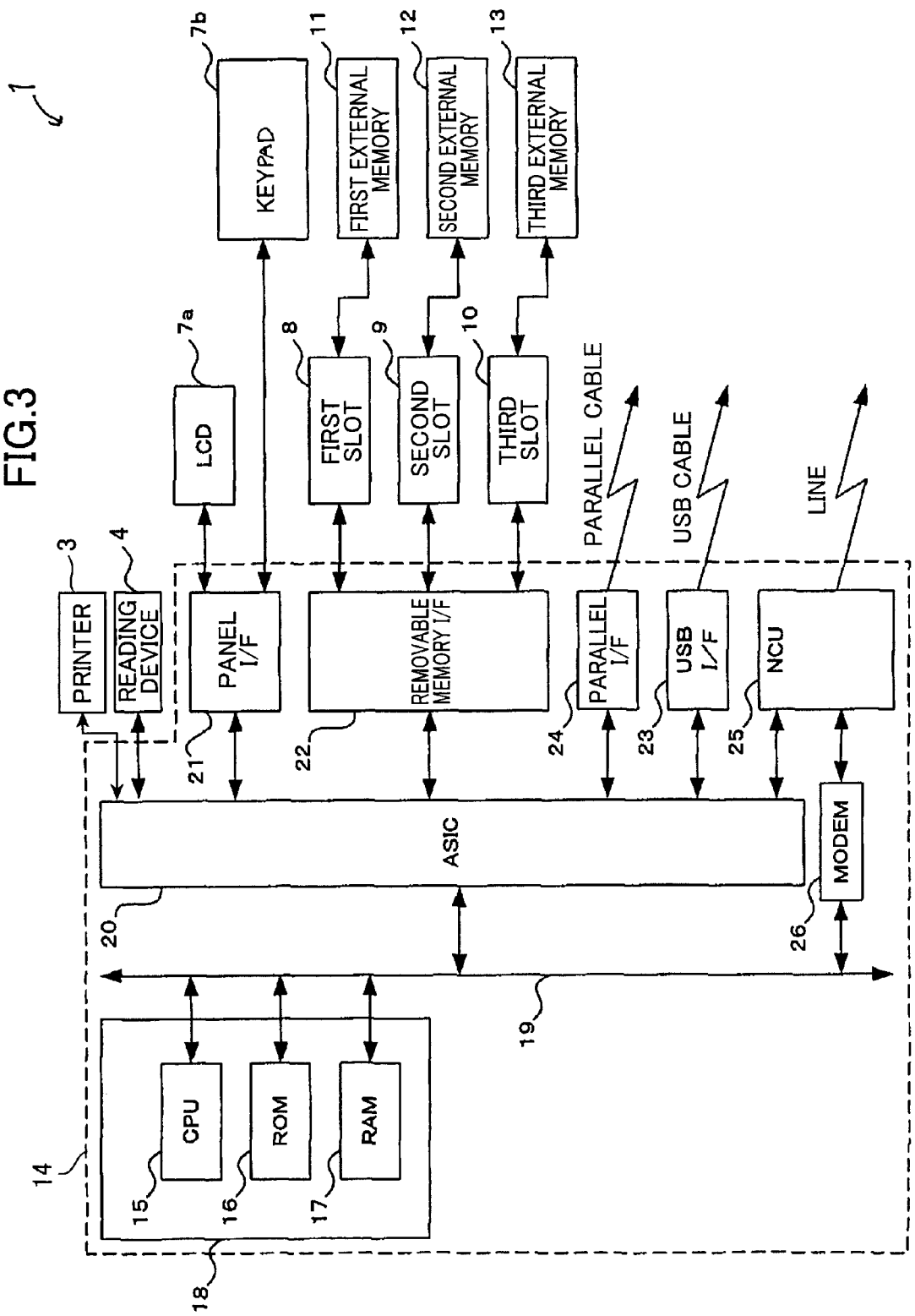
FIG. 3 is a block diagram showing the configuration of the multifunction device of the first embodiment.

Next, the control section 14 will be described with reference to FIG. 3.

The control section 14 has a microcomputer 18 including a CPU 15, a ROM 16, and a RAM 17. The RAM 17 stores the order of detection signals issued by the memory detection switches provided in the slots 8, 9, and 10.

The control section 14 is also provided with an ASIC 20, which is connected to the microcomputer 18 via a bus 19. This ASIC 20 is connected electrically to the reading device 4 and the printer 3, and is also connected electrically to the LCD 7a and keypad 7b of the control panel 7 via a panel interface (I/F) 21. Furthermore, the ASIC 20 is connected electrically to the slots 8, 9, and 10 via a removable memory interface (I/F) 22.

The ASIC 20 is also provided with a USB interface (I/F) 23, and can be connected to a personal computer via a USB cable. In addition, the ASIC 20 is provided with a parallel interface (I/F) 24 and a network control unit (NCU) 25, which can be connected to an external device via a parallel cable and a line, respectively.

The control section 14 is also provided with a modem 26, and can be connected to an external device via this modem 26 and the NCU 25.

Next, a process for setting the drive mode of the multifunction device 1 will be described with reference to FIG. 4.

This drive mode setting process starts when the multifunction device 1 is powered on. When power is turned on, the multifunction device 1 is set in S41 to a single drive mode (automatic switching mode), regardless of whether or not the multifunction device 1 is connected to a personal computer via a USB cable.

When the multifunction device 1 is connected to a personal computer via a USB cable, the multifunction device 1 receives a device check command from the personal computer, and therefore sends to the personal computer a command indicating that the multifunction device 1 is a storage class device.

Figure 5:
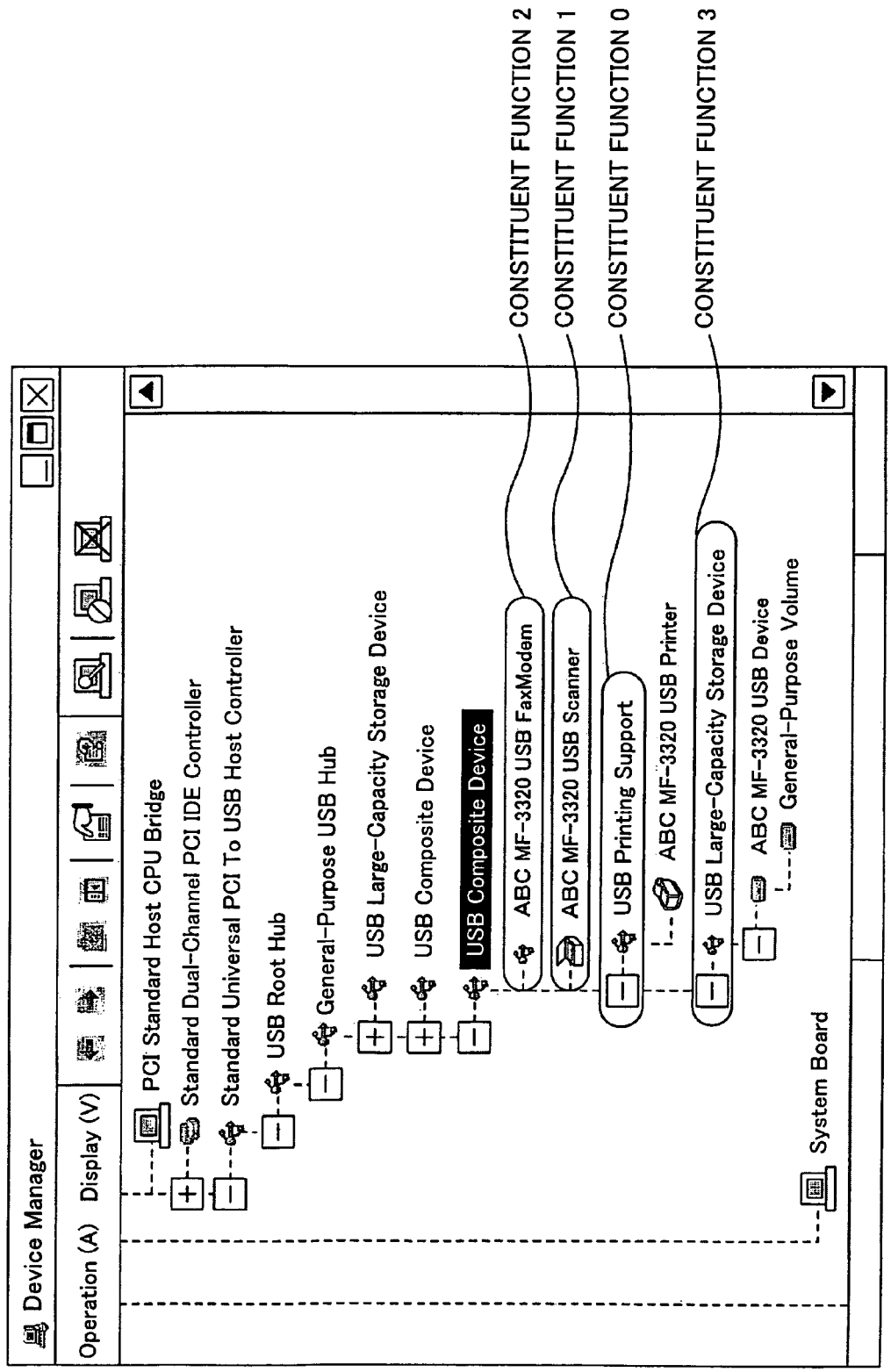
FIG. 5 is an explanatory diagram of a PC window in which the PC recognizes respective functions of the multifunction device of the first embodiment.

More specifically, as shown in FIG. 5, the entire multifunction device 1 is recognized by the personal computer as a "USB composite device," and a plurality of constituent functions are further recognized thereunder. For example, USB printing support is recognized as constituent function 0, the reading device 4 (the scanner) as constituent function 1, the facsimile modem 26 as constituent function 2, and a large-capacity storage device (external memories 11, 12, and 13) as constituent function 3. Each constituent function can have an individual class. Constituent function 3 is a "storage class."

It is noted that FIG. 5 shows a "Device Manager" window indicating how various peripheral devices connected to the personal computer are operating and how they are recognized in Windows. In this display, "ABC" indicates the vendor name for the multifunction device 1, while"MF-3320" indicates the product name for the multifunction device 1. However, this is only one example.

The multifunction device 1 is initially in the single drive mode until a GET_MAX_LUN command described later is received from the personal computer. That is, the multifunction device 1 is in the single drive mode after the multifunction device 1 is turned on until a GET_MAX_LUN command is received from the personal computer.

The single drive mode will now be described in detail.

When a medium (external memory) is inserted in only one slot among the slots 8, 9, and 10, the control. section 14 allocates LUN0 as an LUN (Logical Unit Number) to that slot alone, and the personal computer can access only that slot. That is to say, the personal computer can access only a medium inserted in the slot to which LUN0 is allocated. If the medium is of a type, from which data can be read only, the personal computer can read data from the subject medium. If the medium is of another type, from which data can be read and to which data can be written, the personal computer can read data from and write data to the subject medium.

In other words, in the present specification, "access" refers at least to reading media inserted in the slots, and to both reading and writing of media for which reading and writing is possible.

Figure 6A:
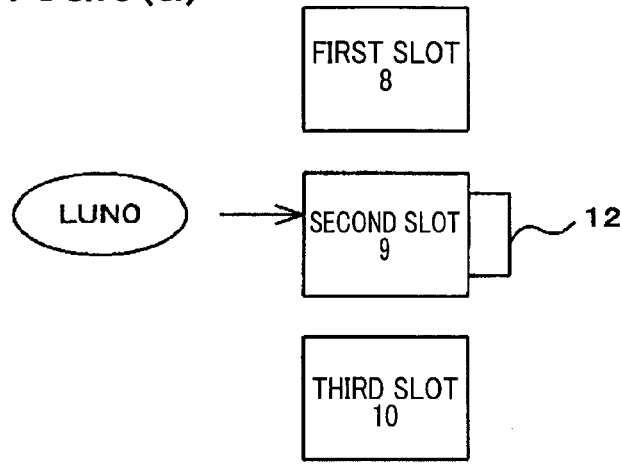
FIGS. 6(a)-6(c) are explanatory diagrams showing examples of drive allocation (LUN allocation) in the multifunction device of the first embodiment.
Figure 6B:
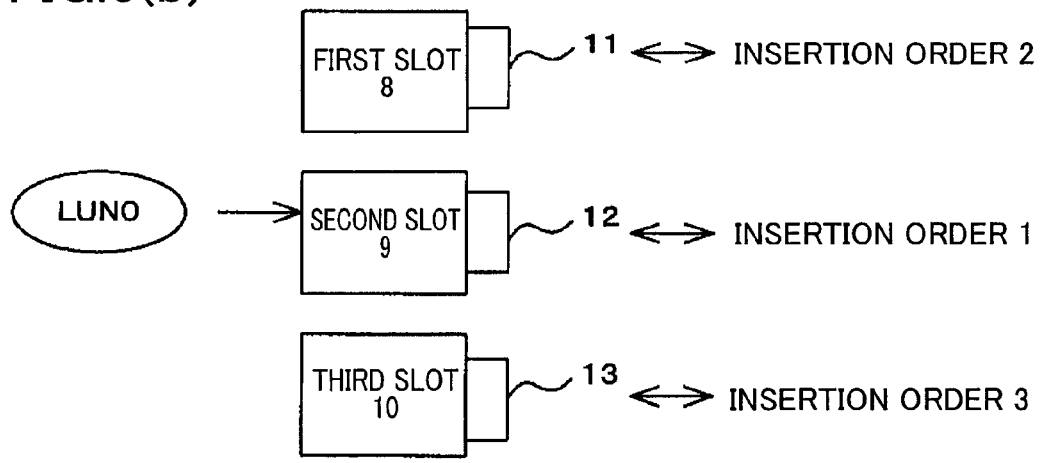
Figure 6C:
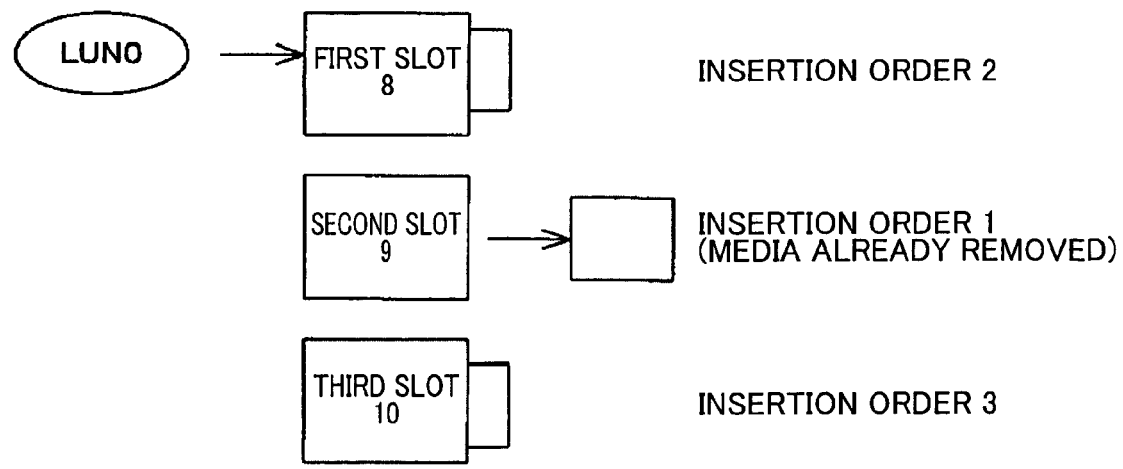

For example, when a medium (second external memory 12) is inserted only in the second slot 9, as shown in FIG. 6(*a*), and media (external memories corresponding to the respective slots) are not inserted in the first slot a or third slot 10, LUN0 is allocated to the second slot 9, and the personal computer can access only the second external memory 12 inserted in the second slot 9.

Also, if the medium (second external memory 12) inserted in the second slot 9 is removed, and another medium (first external memory 11 or third external memory 13) is newly inserted in another slot (for example, the first slot 8 or third slot 10), LUN0 is allocated to the slot in which that medium is newly inserted, and the personal computer can access only the external memory inserted in that slot.

As stated above, the control section 14 recognizes a slot in which media are inserted by means of an interrupt signal from the memory detection switch provided in each slot.

When media are inserted in two or more slots among the slots 8, 9, and 10, the control section 14 allocates LUN0 to the slot in which a medium has been inserted first, and the personal computer can access only the external memory inserted in that slot.

For example, when media (external memories) are inserted in the second slot 9, first slot 8, and third slot 10, in that order, and all the media remain inserted, as shown in FIG. 6(*b*), LUN0 is allocated to the second slot 9 into which a medium has been inserted first, as the media first-insertion slot, and accessible by the personal computer. Therefore, the personal computer cannot access the first external memory 11 inserted in the first slot 8, or the third external memory 13 inserted in the third slot 10.

Assume that media have been inserted in the second slot 9, first slot 8, and third slot 10, in that order, but a medium (second external memory 12) has already been removed from the second slot 9, as shown in FIG. 6 (*c*). In this case, among the first slot 8 and third slot 10 in which media remain, LUN0 is allocated to the first slot 8, into which a medium has been inserted first, as the media first-insertion slot, and accessible by the personal computer. In this case, the personal computer cannot access the third external memory 13 inserted in the third slot 10.

The order in which media are inserted in slots is determined based on interrupt signals issued by the memory detection switches provided in the slots and stored in RAM 17 of control section 14.

Returning to FIG. 4, the process goes from S41 to S42. In S42, the CPU 15 determines whether or not the multifunction device 1 has received a GET_MAX_LUN command (command inquiring about the number of slots provided in the multifunction device 1) from the personal computer.

It is noted that when the OS of the personal computer asks the driver, which is installed in the personal computer and which corresponds to the multifunction device 1, about the number of slots that the multifunction device 1 has, and only if the driver supports multi-reading/writing, this GET_MAX_LUN command is transmitted from the driver to the multifunction device 1. That is to say, the GET_MAX_LUN command indicates that the personal computer is provided with a driver that supports multi-reading/writing.

If the driver installed in the personal computer does not support multi-reading/writing, the driver does not issue a GET_MAX_LUN command in response to the inquiry as to the number of slots from the OS of the personal computer, but replies to the OS that the number of slots is one.

If a GET_MAX_LUN command has been received (yes in S42), the processing flow proceeds to S43. On the other hand, if a GET_MAX_LUN command has not been received (no in S42), S42 is repeated. That is to say, the multifunction device 1 is in a state in which the single drive mode remains being set.

In S43, the mode setting of the multifunction device 1 is changed from the single drive mode to the multi-drive mode.

The multi-drive mode is described in detail below.

It is noted that upon receiving a GET_MAX_LUN command, the multifunction device 1 returns to the personal computer a value of "2," that indicates 3, which is the total slot number in the present embodiment. When the personal computer identifies the number of slots, the personal computer requests access to: the slot to which LUN0 is allocated as a logical unit number, the slot to which LUN1 is allocated, and the slot to which LUN3 is allocated, respectively. It is noted that if the multifunction device has two slots, upon receiving a GET_MAX_LUN command, the multifunction device returns a value of "1" to the personal computer.

In the multi-drive mode, LUN0, LUN1, and LUN2 have are allocated as fixed values to the first slot 8, second slot 9, and third slot 10, respectively. The personal computer can access the first slot 8 to which LUN0 is allocated, the second slot 9 to which LUN1 is allocated, and the third slot 10 to which LUN2 is allocated.

In S44, the CPU 15 determines whether any of the following has occurred: removal of the USB cable connecting the multifunction device 1 to the personal computer; turning off of the personal computer power; or the personal computer restart. If the result of the determination is affirmative (yes in S44), the processing flow proceeds to S41 and the multifunction device 1 is again set to the single drive mode. On the other hand, if the result of the determination is negative (no in S44), the processing flow returns to S44. That is to say, the multifunction device 1 remains in the multi-drive mode.

Figure 7:
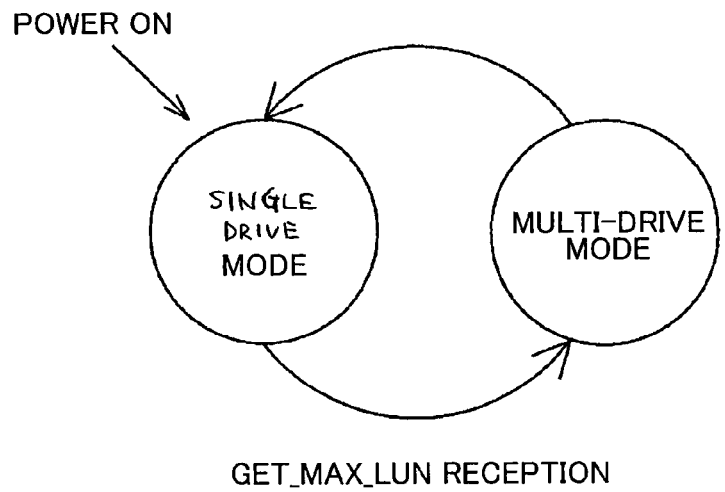
FIG. 7 is an explanatory diagram showing the drive mode setting process executed by the multifunction device of the first embodiment.

FIG. 7 is a drawing showing the states of the multifunction device 1. As is clear from the above description, when the multifunction device 1 is turned on, the multifunction device 1 is placed in the single drive mode (S41). When a GET_MAX_LUN command is received from the personal computer (S42) during the single drive mode, the multifunction device enters the multi-drive mode (S43). If the USB cable is removed, the power to the personal computer is turned off, or the personal computer is restarted, the multifunction device 1 returns to the single drive mode (S44).

Next, read/write operations executed by the multifunction device 1 will be described.

First, read/write operations when the multifunction device 1 is in the single drive mode will be described with reference to FIGS. 8(*a*) and 8(*b*).

Figure 8A:
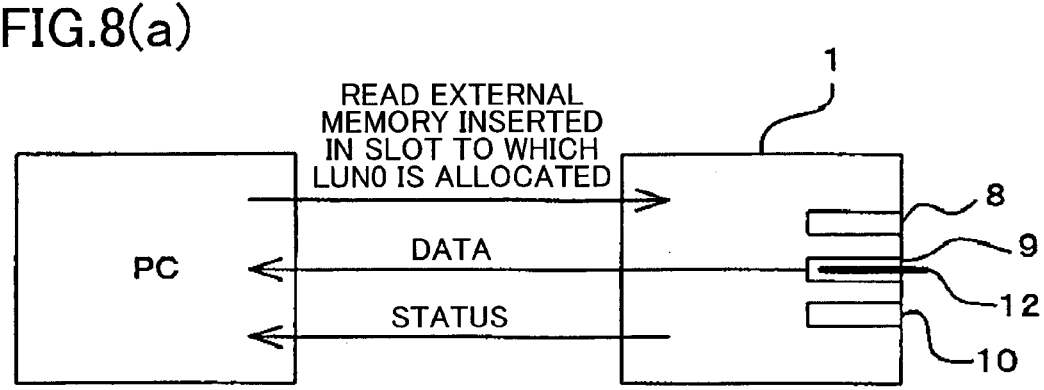
FIG. 8(a) is an explanatory diagram showing a read process executed by the multifunction device of the first embodiment in a single drive mode (automatic switching mode)
Figure 8B:
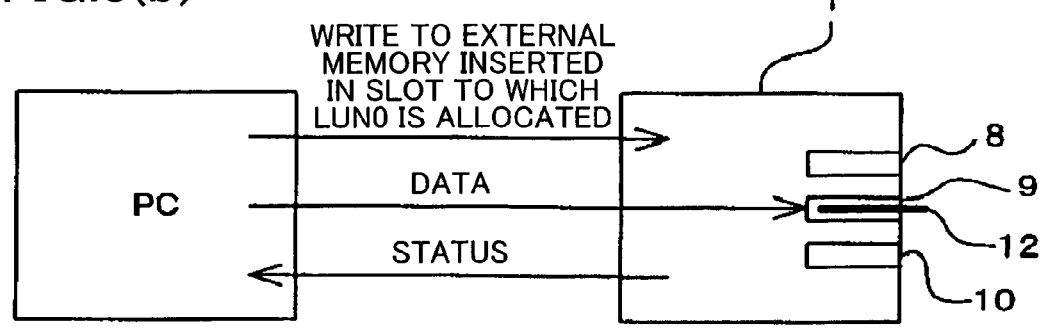
FIG. 8(b) is an explanatory diagram showing a write process executed by the multifunction device of the first embodiment in the single drive mode.

In order to read data from the multifunction device 1, the personal computer transmits a "Read external memory inserted in the slot to which LUN0 is allocated" command to the multifunction device 1, as shown in FIG. 8(*a*). In response to this, the multifunction device 1 reads data from the media (second external memory 12, in this example) inserted in the slot to which LUN0 is allocated (second slot 9, in this example), and transmits this data to the personal computer. Finally, the multifunction device 1 sends an OK or NG status to the personal computer.

In order to write data to the multifunction device 1, the personal computer transmits a "Write to external memory inserted in slot to which LUN0 is allocated" command to the multifunction device 1, as shown in FIG. 8(*b*). In response to this, the multifunction device 1 writes data transmitted from the personal computer to the medium (second external memory 12, in this example) inserted in the slot to which LUN0 is allocated (second slot 9, in this example). Finally, the multifunction device 1 sends an OK or NG status to the personal computer.

When a medium is inserted in only one slot among the first slot 8, second slot 9, and third slot 10, as described above, the slot to which LUN0 is allocated is that slot. When media are inserted in two. or more slots, the slot to which LUN0 is allocated is the slot in which a medium has been inserted first.

Next, read/write operations when the multifunction device 1 is in the multi-drive mode will be described with reference to FIGS. 9(*a*) and 9(*b*).

In multi-drive mode, LUN0, LUN1, and LUN2 are allocated as fixed values to the first slot 8, second slot 9, and third slot 10, respectively. That is to say, if the A drive is already allocated to a floppy (trademark) disk drive and the C drive is already allocated to a hard disk drive, the D drive is allocated to the first slot 8, the E drive to the second slot 9, and the F drive to the third slot 10, and this order does not change. That is to say, in the multi-drive mode, the order of the drive letters allocated to the first slot 8, second slot 9, and third slot 10 is fixed.

Figure 9A:
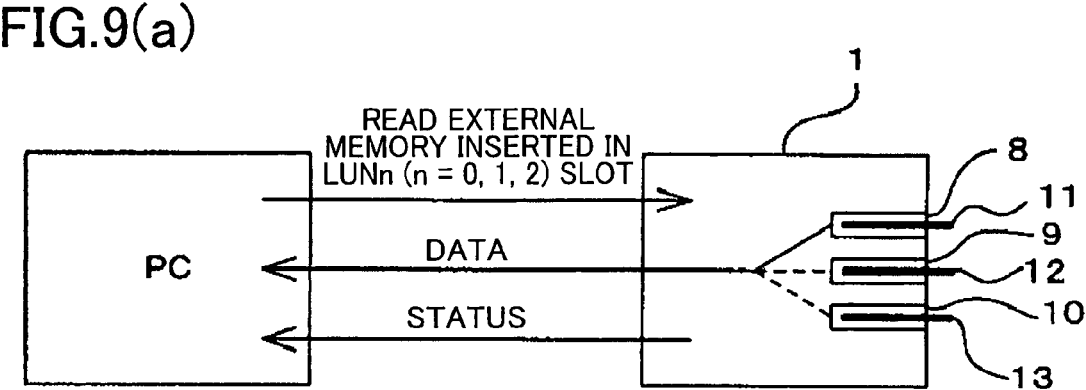
FIG. 9(a) is an explanatory diagram showing a read process executed by the multifunction device of the first embodiment in a multi-drive mode.
Figure 9B:
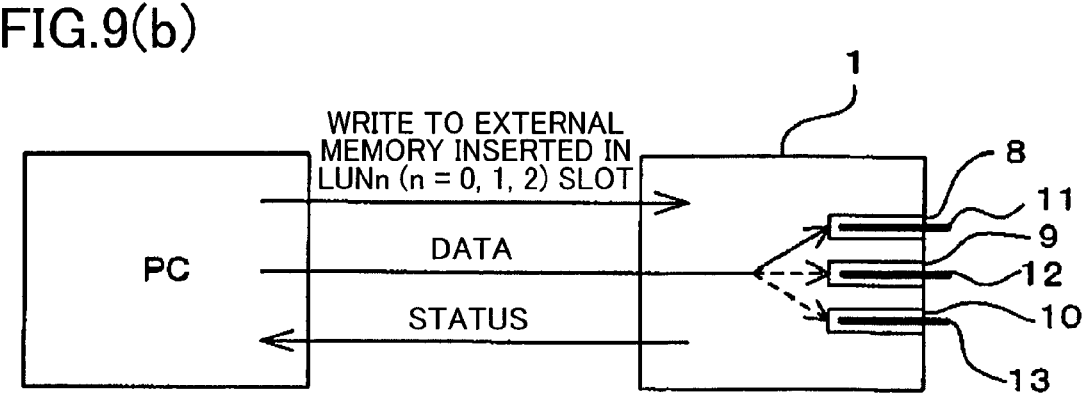
FIG. 9(b) is an explanatory diagram showing a write process executed by the multifunction device of the first embodiment in the multi-drive mode.

Therefore, as shown in FIG. 9(*a*), the personal computer transmits to the multifunction device 1 a "Read external memory inserted in the slot to which LUN0 is allocated" command in order to read data from the medium (first external memory 11) inserted in the first slot 8, a "Read external memory inserted in the slot to which LUN1 is allocated" command in order to read data from the medium (second external memory 12) inserted in the second slot 9, and a "Read external memory inserted in the slot to which LUN2 is allocated" command in order to read data from the medium (third external memory 13) inserted in the third slot 10. In response, the multifunction device 1 reads data from the medium inserted in the relevant slot, and transmits that data to the personal computer. Finally, the multifunction device 1 sends an OK or NG status to the personal computer.

Also, as shown in FIG. 9(*b*), the personal computer transmits to the multifunction device 1 a "Write to external memory inserted in the slot to which LUN0 is allocated" command in order to write data to the medium (first external memory 11) inserted in the first slot 8, a "Write to external memory inserted in the slot to which LUN1 is allocated" command in order to write data to the medium (second external memory 12) inserted in the second slot 9, and a "Write to external memory inserted in the slot to which LUN2 is allocated" command in order to write data to the medium (third external memory 13) inserted in the third slot 10. In response, the multifunction device 1 writes data to the medium inserted in the relevant slot. Finally, the multifunction device 1 sends an OK or NG status to the personal computer.

It is noted that the ROM 16 is prestored with: a set of LUN layout data for the single drive mode; and a set of LUN layout data for the multi-drive mode. The layout data for the single drive mode indicates that all of the first through third slots 8, 9, and 10 correspond to LUN0. The layout data for the multi-drive mode indicates that the first through third slots 8, 9, and 10 correspond to LUN0, LUN1, and LUN2, respectively.

When the multifunction device 1 is set to the single drive mode, the LUN layout data for the single drive mode is copied into the RAM 17. By referring to the layout data in the RAM 17, the CPU 15 sets the LUN0 to a single slot, into which an external memory has been inserted first among the slots 8-10. The personal computer can therefore access one external memory 11, 12, or 13 that has been inserted first in the corresponding slot 8, 9, or 10, by indicating the LUN0, that is, by transmitting a "Read external memory inserted in the slot to which LUN0 is allocated" command or a "Write to external memory inserted in the slot to which LUN0 is allocated" command.

When the multifunction device 1 is set to the multi-drive mode, the LUN layout data for the multi-drive mode is copied into the RAM 17. By referring to the layout data in the RAM 17, the CPU 15 sets the LUN0-LUN2 to the slots 8-10, respectively. The personal computer can therefore access any of the external memories 11, 12, and 13 that are inserted in the corresponding slots 8, 9, and 10, by indicating LUN0, LUN1, or LUN2, that is, by transmitting a "Read external memory inserted in the slot to which LUNn (n=0, 1, or 2) is allocated" command or a "Write to external memory inserted in the slot to which LUNn (n=0, 1, or 2) is allocated" command.

Next, the effects obtained by the multifunction device 1 of the first embodiment will be described.

The multifunction device 1 enters the single drive mode in the initial stage, that is, after power is turned on and until the peripheral device 1 receives from the personal computer the command (GET_MAX_LUN command) indicating that the personal computer is installed with such a type of driver that supports multi-reading/writing, that is, that can simultaneously and individually access two or more slots provided in the peripheral device. In this single drive mode, a personal computer can access a single slot in which a medium is inserted from among the slots 8, 9, and 10.

That is to say, with the multifunction device 1, even when a personal computer is not provided with a driver that supports multi-reading/writing, simply inserting a medium in an arbitrary slot among a plurality of slots makes it possible for that slot to be accessed directly.

With the multifunction device 1, in order to change a slot to be used in the single drive mode from one to another, it is only necessary to remove the media already inserted in one slot and to insert another media to another slot.

When the personal computer is provided with a driver that supports multi-reading/writing, the multifunction device 1 can be placed in the multi-drive mode. In this multi-drive mode, the personal computer can access a plurality of slots.

In the multi-drive mode, the order of LUNs allocated to the slots 8, 9, and 10 is fixed, so that the order of drive letters of slots is not switched, and the user does not become confused.

The order in which media are inserted in the slots 8, 9, and 10 is stored in the RAM 17. Therefore, when media are inserted in two or more slots during the single drive mode, the slot in which a medium has been inserted first from among the two or more slots in which media are inserted can be determined based on the order stored in the RAM 17. Then LUN0 can be allocated to that slot, and the slot can be made accessible by the personal computer.

By this means, even if media are inserted in two or more slots in the single drive mode, it is possible to determine a single slot that can be accessed by the personal computer, and, therefore, confusion does not arise in the operation of the multifunction device 1.

As described above, when media are inserted in one or more slots among the slots 8, 9, and 10, the CPU 15 sets one of these three slots as the media first-insertion slot. More specifically, when a medium is inserted in only one slot among the slots 8, 9, and 10, the CPU 15 sets that slot as the media first-insertion slot. Also, when media are inserted in two or more slots among the slots 8, 9, and 10, the CPU 15 determines the slot, in which a medium has been inserted first, based on the insertion order stored in the RAM 17, and sets the determined slot as the media first-insertion slot. In this way, even if media are inserted in two or more slots in the single drive mode, the CPU 15 can determine one slot to be accessed by the personal computer. Confusion does not arise in the operations of the peripheral device 1.

The memory detection switch fitted to each slot 8, 9, or 10 may be a conduction switch in the form of two memory detection terminals. The two memory detection terminals are two terminals among several terminals, which are provided in the slot and which are connected to terminals provided on the external memory when the external memory is inserted to the subject slot. For example, these memory detection terminals are pulled up in advance, and are electrically grounded when they are connected to the inserted memory terminals. Memory insertion can be known by detecting a voltage change in the memory detection terminals.

The number of slots provided to the multifunction device 1 can be other than 3 (for example, 2, 4, 5, 6, etc.).

The personal computer can access the multifunction device 1 to read image data from some external memory 11, 12, or 13 inserted into the corresponding slot 8, 9, or 10 and can issue a command to control the inkjet printer 3 to record images based on this image data.

Second Embodiment

Next, a multifunction device 1' according to a second embodiment will be described with reference to FIG. 10(*a*).

Figure 10A:
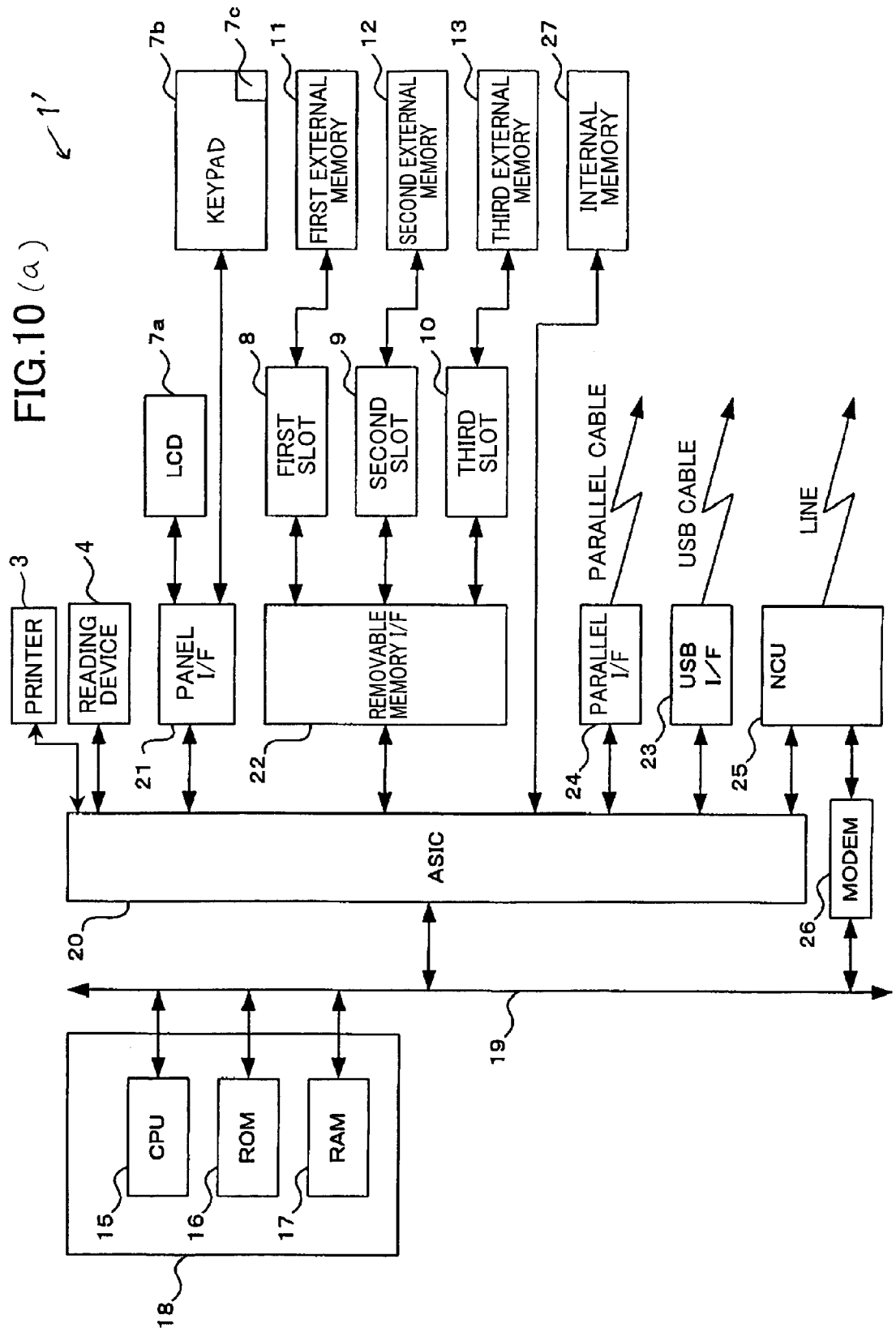
FIG. 10(a) is a block diagram showing the configuration of a multifunction device of a second preferred embodiment.

As shown in FIG. 10(*a*), the multifunction device 1' is the same as the multifunction device 1 of the first embodiment except that the multifunction device 1' is provided with an internal memory 27. The multifunction device 1' executes the drive mode setting process in the same manner as in FIG. 4.

In this example, the internal memory 27 is configured of an independent internal memory, which is connected to the ASIC 20. Representative examples of the independent internal memory include: a hard disk, a RAM (random access memory), and a fixed flash memory, which is not of a card-type but is directly soldered to the ASIC 20. It is noted, however, that a part of the memory area in the RAM 17 may be utilized as the internal memory 27.

According to the present embodiment, in the single drive mode (S41 in FIG. 4), when media is not inserted in any of the first slot 8, second slot 9, or third slot 10, LUN0 is allocated to the internal memory 27 and the personal computer can access the internal memory 27.

On the other hand, when media is inserted in one or more slots among the first slot 8, second slot 9, and third slot 10 in the single drive mode, LUN0 is allocated to one slot among the slots 8, 9, and 10, to which media is inserted, and the personal computer can access that slot.

In the multi-drive mode (S43 in FIG. 4), the personal computer issues four logical unit numbers: LUN0, LUN1, LUN2, and LUN3. These numbers LUN0, LUN1, LUN2, and LUN3 are allocated in this fixed order to the first slot 8, second slot 9, third slot 10, and internal memory 27, respectively. As a result, the personal computer can access each of the first slot 8, second slot 9, third slot 10, and internal memory 27. In this case, the drive letters allocated to the slots and internal memory 27 are in a fixed order.

As the multifunction device 1' of the second embodiment is provided with the internal memory 27, in the multi-drive mode the personal computer can access the internal memory 27 in addition to the first slot 8, second slot 9, and third slot 10.

Also, in the single drive mode, the personal computer can access the internal memory 27 only when media is not inserted in any of the three slots.

It is noted that also in the present embodiment, the ROM 16 is prestored with: a set of LUN layout data for the single drive mode; and a set of LUN layout data for the multi-drive mode. The layout data for the single drive mode indicates that all of the first through third slots 8, 9, and 10 and the internal memory 27 correspond to LUN0. The layout data for the multi-drive mode indicates that the first through third slots 8, 9, and 10 and the internal memory 27 correspond to LUN0, LUN1, LUN2, and LUN3, respectively.

When the multifunction device 1 is set to the single drive mode, the LUN layout data for the single drive mode is copied into the RAM 17. When no external memory is inserted in a corresponding slot, the CPU 15 sets the LUN0 to the internal memory 27. When some external memory is inserted in a corresponding slot, the CPU 15 sets the LUN0 to that slot, into which a corresponding external memory has been inserted first.

When the multifunction device 1 is set to the multi-drive mode, the LUN layout data for the multi-drive mode is copied into the RAM 17. By referring to the layout data in the RAM 17, the CPU 15 sets the LUN0-LUN2 to the slots 8-10, respectively, and sets LUN3 to the internal memory 27. The personal computer can therefore access any of the external memories 11, 12, and 13 that are inserted in the corresponding slots 8, 9, and 10 and the internal memory 27 by indicating LUN0, LUN1, LUN2, that is, by transmitting a "Read external memory inserted in the slot to which LUNn (n=0, 1, 2, or 3) is allocated" command or a "Write to external memory inserted in the slot to which LUNn (n=0, 1, 2, or 3) is allocated" command.

Third Embodiment

According to the third embodiment, the multifunction device 1' of the second embodiment is modified to provide the keypad 7*b* with an access selection switch 7*c* as shown in FIG. 10(*a*).

The access selection switch 7*c* is for selecting whether the object of access by the personal computer is either one of: the "slot" (or external memory); and the "internal memory". The access selection switch 7*c* may be provided as an independent switch on the keypad 7*b*, or may be provided as one of the functions provided by a function key. A variety of functions are changed and displayed each time the function key is pressed.

According to the third embodiment, the single drive mode is different from that of the second embodiment in a manner described below.

According to the present embodiment, when the user selects "slot" by manipulating the access selection switch 7c, the CPU 15 does not set LUN0 to the internal memory 27 even when no external memory 8, 9, or 10 is inserted into the corresponding slot 11, 12, or 13. The personal computer may not access the internal memory 27, but may access only the one slot 8, 9, or 10, into which a corresponding external memory 11, 12, or 13 has been inserted first.

When the user selects "internal memory" by manipulating the access selection switch 7c, the CPU 15 does not set LUN0 to any slots 11, 12, or 13 even when corresponding external memory 8, 9, or 10 is inserted into the slots 11, 12 or 13. The personal computer may not access the external memory 8, 9, or 10, but may access the internal memory 27 only.

Figure 10B:
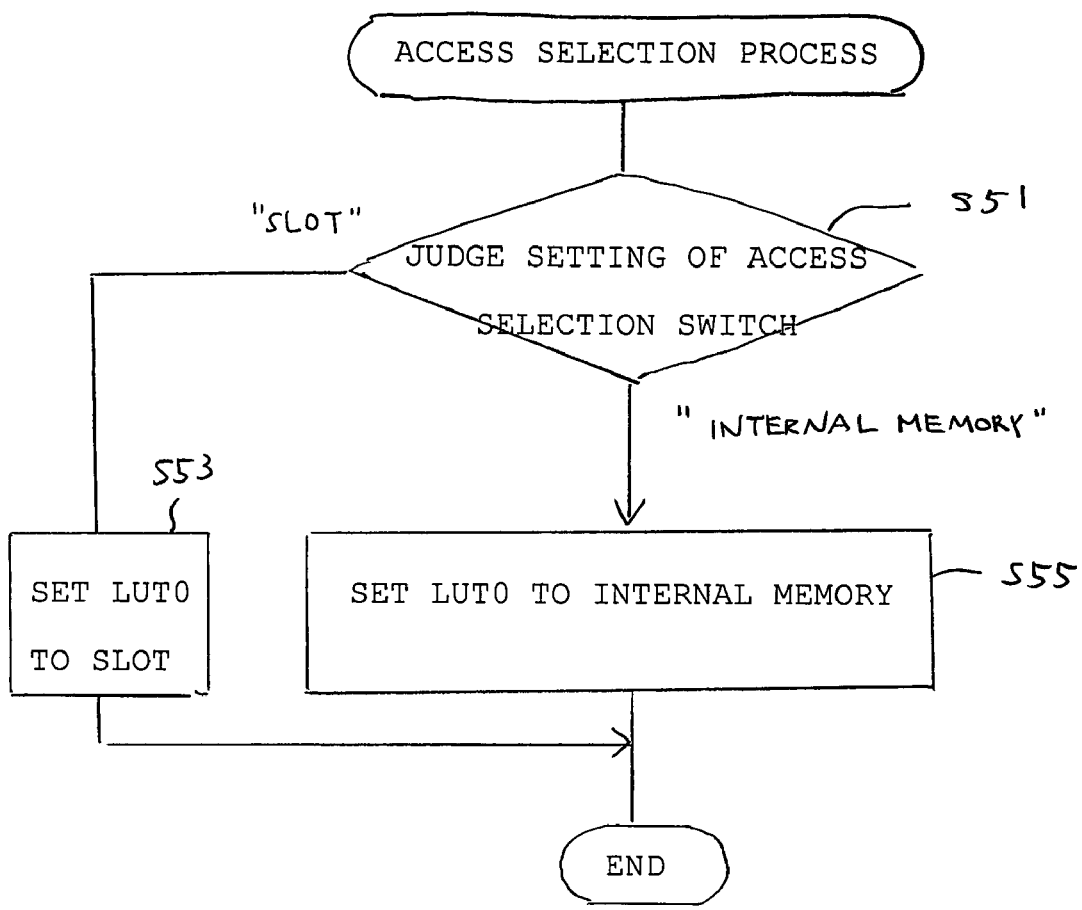
FIG. 10(b) is a flowchart of an access selection process according to a third preferred embodiment.

More specifically, as shown in FIG. 10(b), during the single drive mode (S41 in FIG. 4), the CPU 15 judges in S51 the setting of the access selection switch 7c. If the access selection switch 7c selects "slot", the CPU 15 forcibly allocates in S53 the logical unit LUT0 to one slot, into which an external memory has been inserted first. On the other hand, if the access selection switch 7c selects "internal memory", the CPU 15 forcibly allocates in S55 the logical unit LUT0 to the internal memory 27.

Thus, according to the third embodiment, it is possible to allow the user to manipulate the access selection switch 7c, in the single drive mode, to select either: the media first-insertion slot among the slots 8, 9, and 10; or the internal memory 27 to be accessible by the personal computer.

<Modification of First-Third Embodiments>

Figure 11:
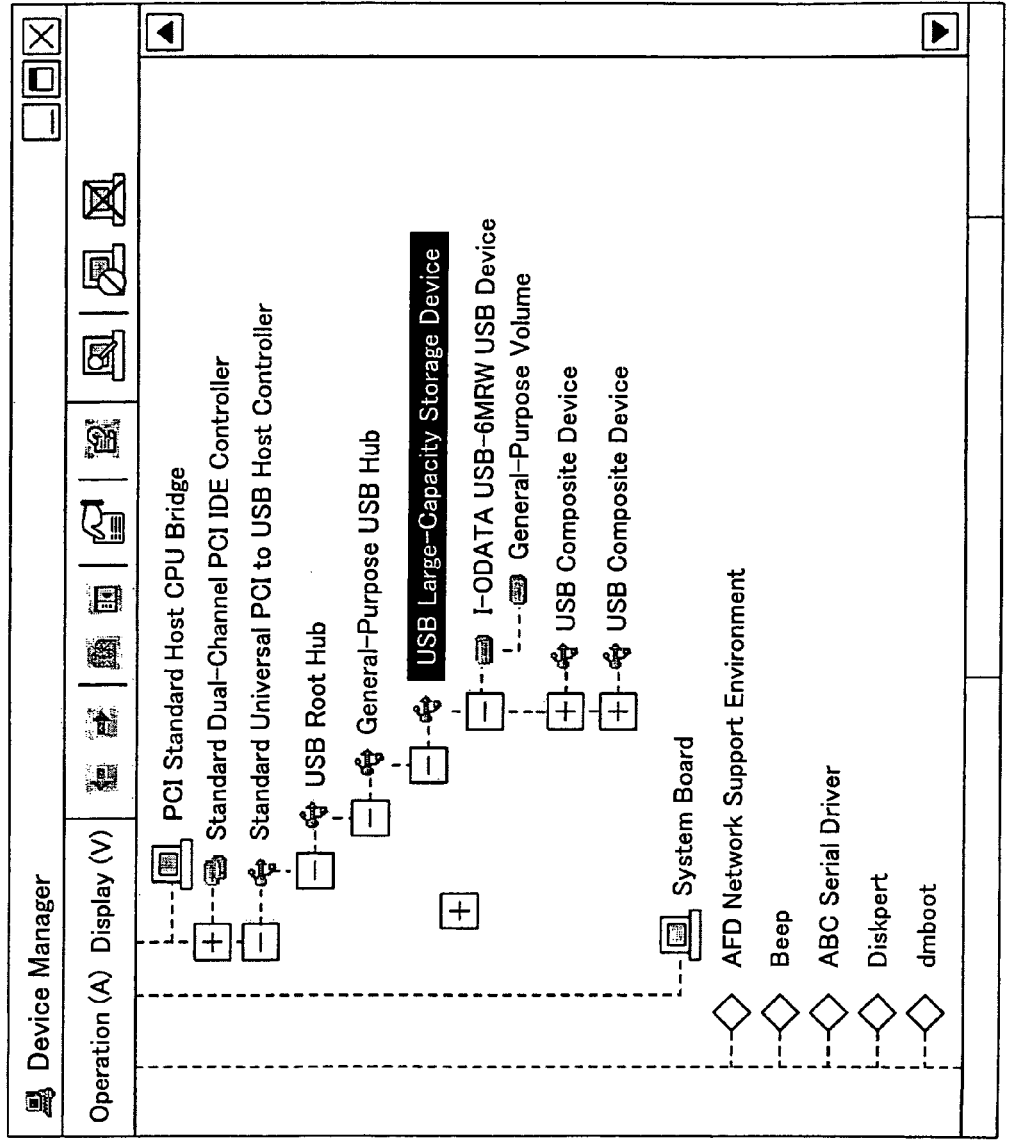
FIG. 11 is an explanatory diagram of a PC window in which the PC recognizes a card reader.

Furthermore, the multifunction devices 1 and 1' of the first through third embodiments may be applied to a card reader. In this case, when the card reader is connected to a personal computer via a USB cable, the entire card reader becomes a "storage class" device as shown in FIG. 11.

Fourth Embodiment

Next, a multi-reader/writer according to a fourth embodiment will be described with reference to FIG. 12(a) to FIG. 20.

Figure 12A:
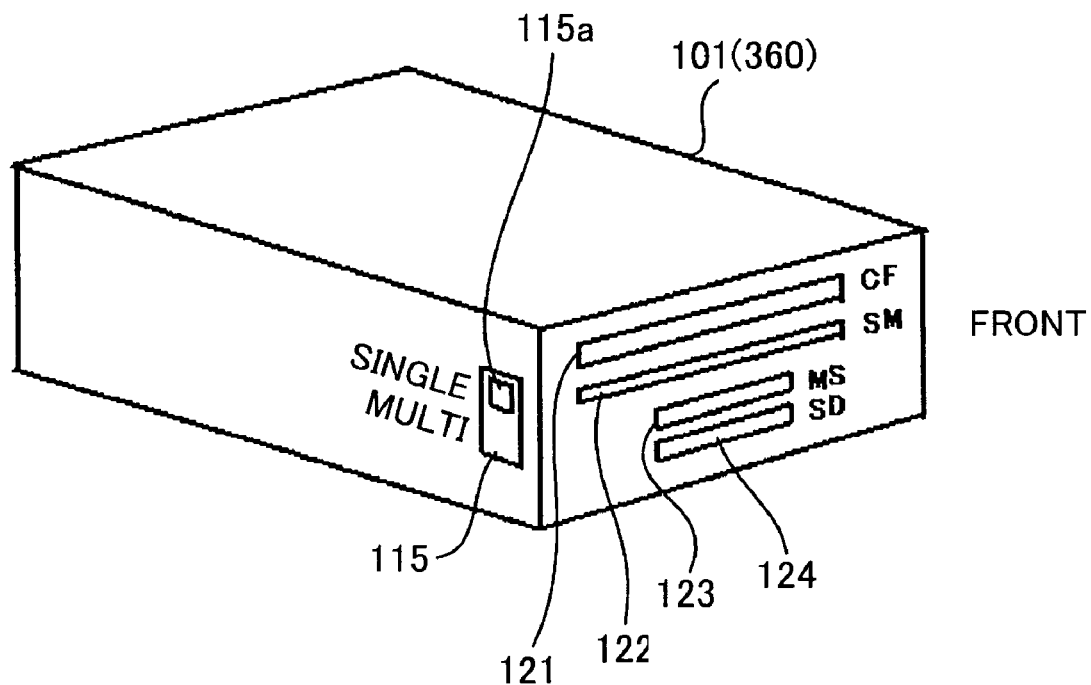
FIG. 12(a) is a perspective view showing a front side of a multi-reader/writer according to a fourth embodiment.
Figure 12B:
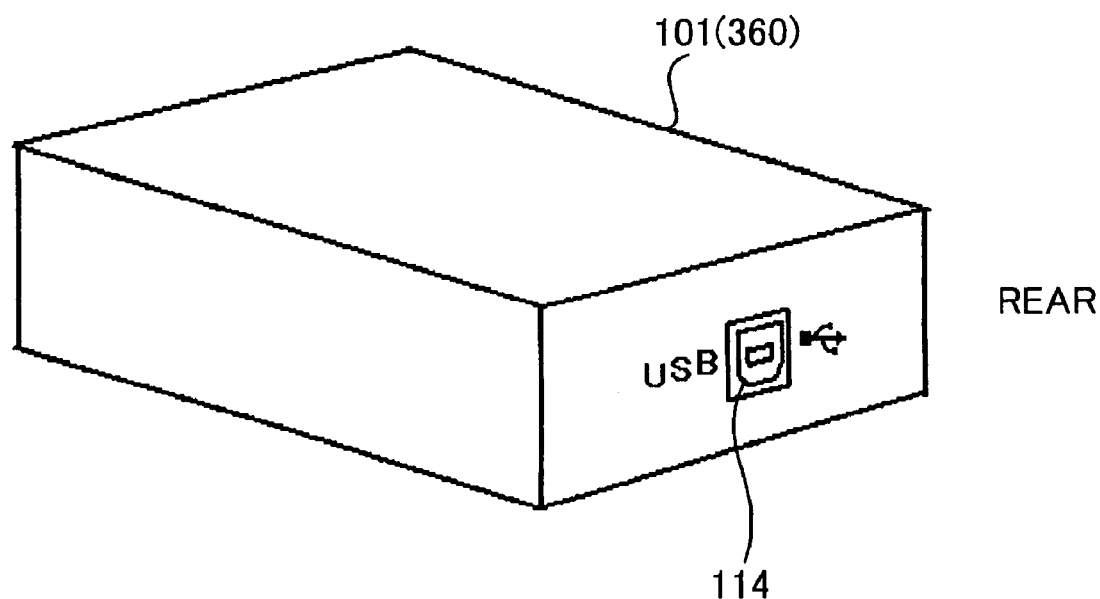
FIG. 12(b) is a perspective view showing a rear side of the multi-reader/writer according to the fourth embodiment.
Figure 13:
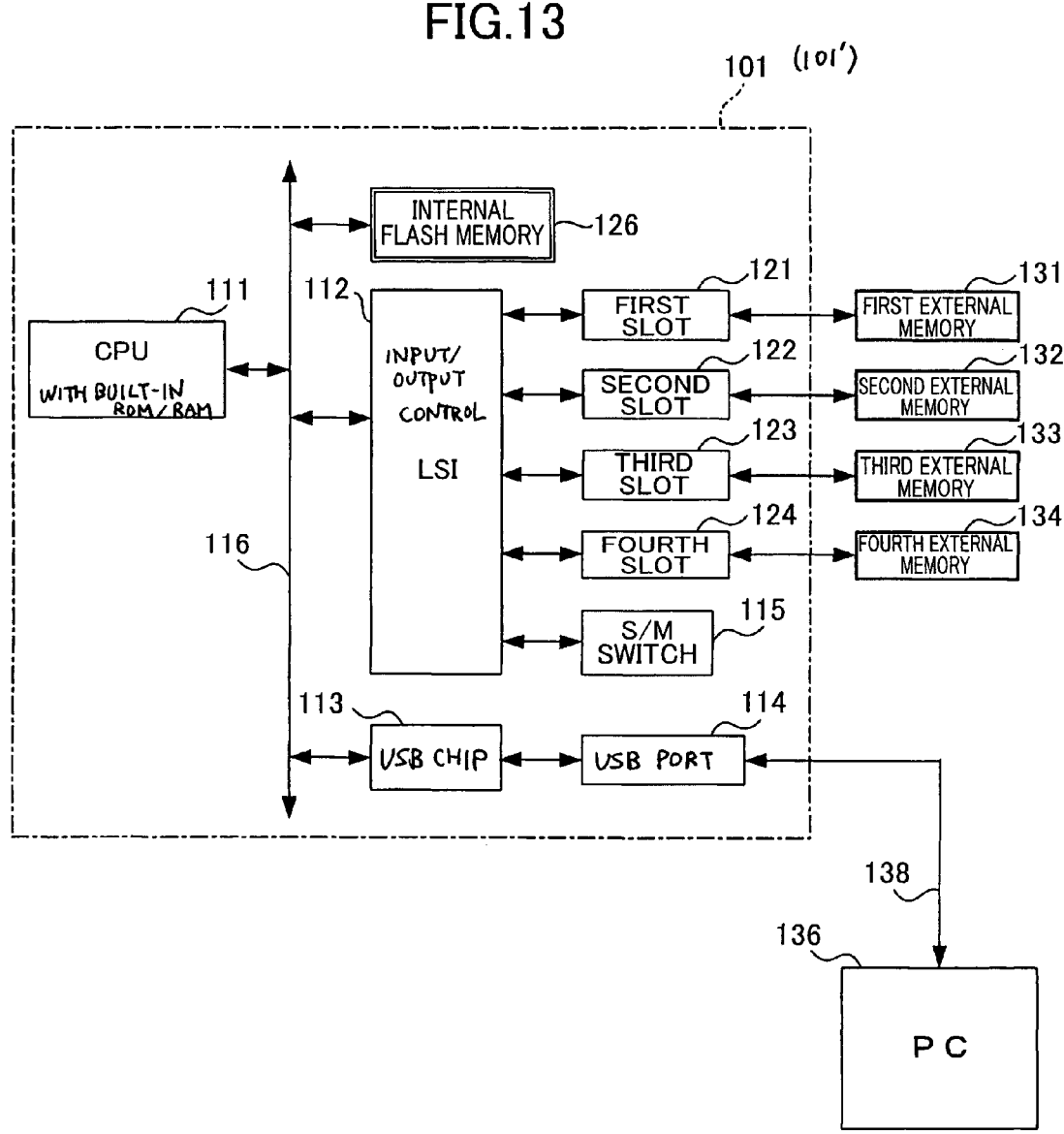
FIG. 13 is a block diagram showing the general structure of the multi-reader/writer according to the fourth embodiment.

FIGS. 12(a) and 12(b) are perspective views showing a multi-reader/writer (multi-slot memory card reader/writer) 101 according to the fourth embodiment. FIG. 13 is a block diagram showing the general construction of the multi-reader/writer 101.

As shown in FIG. 12(a) and FIG. 13, the multi-reader/writer 101, functioning as a peripheral device for a PC, includes in the front surface thereof a first slot 121 for inserting a first external memory 131 (CompactFlash (CF) in the preferred embodiment), a second slot 122 for inserting a second external memory 132 (SmartMedia (SM) in the preferred embodiment), a third slot 123 for inserting a third external memory 133 (Memory Stick (MS) in the preferred embodiment), and a fourth slot 124 for inserting a fourth external memory 134 (Secure Digital (SD) in the preferred embodiment).

An S/M switch 115 is provided on the side of the multi-reader/writer 101 for selectively switching the multi-reader/writer 101 between a single-drive mode and a multi-drive mode. The user can select a mode by moving a protruding part 115a in the S/M switch 115 up or down. In FIG. 12(a), the S/M switch 115 is set for operating the multi-reader/writer 101 in the single-drive mode. As shown in FIGS. 12(b) and 13, a USB port 114 is provided on the back of the multi-reader/writer 101 for connecting a USB cable 138.

As shown in FIG. 13, the multi-reader/writer 101 further includes such internal components as a CPU 111, an input/output control LSI 112, a USB chip 113, and an internal flash memory 126, all of which are connected via a bus 116. The CPU 111 controls all components in the multi-reader/writer 101. The input/output control LSI 112 controls: input to and output from the external memories 131-134 inserted into the corresponding slots 121-124; and data input indicating the selection of the S/M switch 115. The USB chip 113 is a controller for controlling data communications based on the USB standard. The internal flash memory 126 can be read and written to through file operations performed on a personal computer 136, which is connected to the multi-reader/writer 101 via the USB cable 138.

The first slot 121, second slot 122, third slot 123, and fourth slot 124 are each provided with a memory detection switch (not shown) that is physically turned on when the external memories 131-134 are inserted. When a memory detection switch is turned on, the associated detection signal performs an interrupt to the input/output control LSI 112. Therefore, when an external memory is inserted in one of the first through fourth slots 121 through 124, the CPU 111 identifies the slot into which external memory has been inserted, and when a plurality of external memories are inserted in corresponding slots, the CPU 111 can also remember the order of insertion.

The CPU 111 is configured with a built-in ROM and RAM. The RAM stores an order of detection signals received from memory detection switches provided in each of the slots 121-124. The multi-reader/writer 101 operates by a power (bus power) that is supplied from the personal computer 136 via the USB cable 138.

In the preferred embodiment, the multi-reader/writer 101 is connected to the personal computer 136 with the USB cable 138, as shown in FIG. 13. Hence, the slots 121-124 and the internal flash memory 126 of the multi-reader/writer 101 can be accessed from the personal computer 136.

Next, a drive mode setting process executed in the multi-reader/writer 101 based on a selection made with the S/M switch 115 will be described with reference to FIG. 14.

Figure 14:
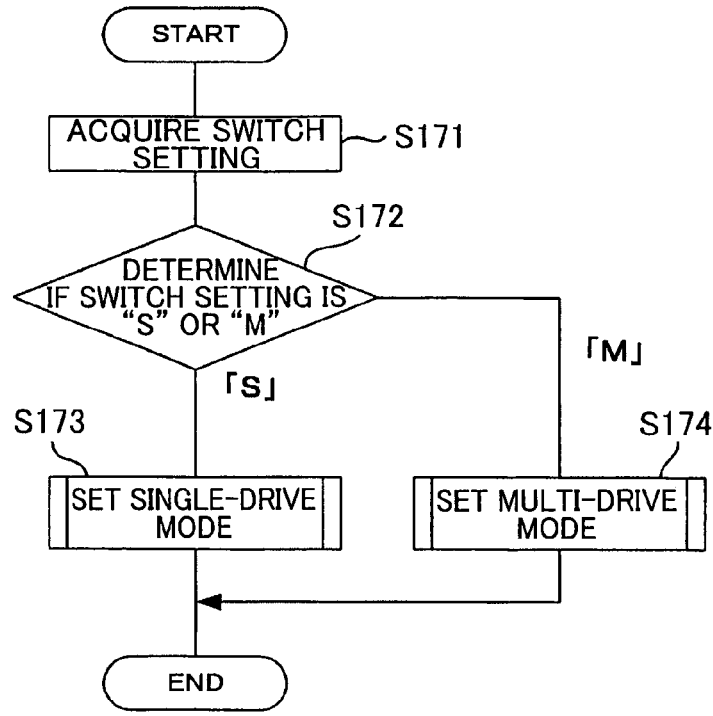
FIG. 14 is flowchart showing a drive mode setting process according to the fourth embodiment.

FIG. 14 is a flowchart showing the drive mode setting process executed by the CPU 111 of the multi-reader/writer 101. The CPU 111 reads a drive mode setting process program from the built-in ROM and executes the process according to this program. The multi-reader/writer 101 begins executing the drive mode setting process when the multi-reader/writer 101 receives a power supply (bus power) from the personal computer 136.

At the beginning of the process in 171, the CPU 111 reads the setting of the S/M switch 115.

In S172 the CPU 111 determines based on the data read in S171 whether the S/M switch 115 is set to a single-drive mode (an automatic switching mode) or a multi-drive mode.

If the single-drive mode is selected at this time, the CPU 111 advances to S173 and sets the operating mode of the multi-reader/writer 101 to the single-drive mode.

In the single-drive mode, if a medium (external memory) is inserted in only one of the slots 121-124, a logical unit number LUN0 is assigned only to that slot and, hence, the personal computer 136 can access only that slot. If no media has been inserted in any of the slots, then LUN0 is assigned to the internal flash memory 126, allowing the personal computer 136 to access only the internal flash memory 126. In other words, the personal computer 136 can read from and write to only media inserted in a slot assigned LUN0 or the internal flash memory 126 assigned LUN0.

Figure 16A:
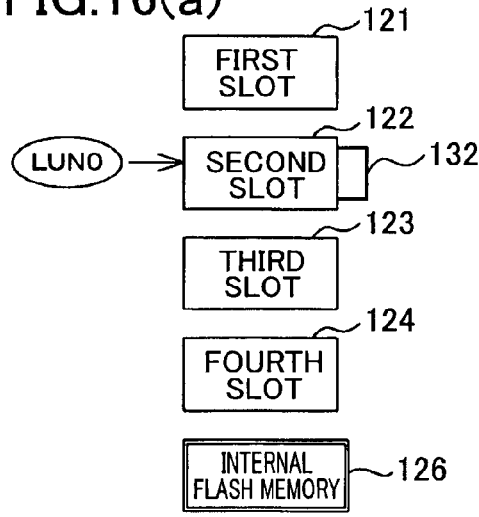
FIGS. 16(a)-16(d) are explanatory diagrams illustrating examples of drive allocation (LUN allocation) in the single drive mode according to the fourth embodiment.

For example, when a medium (second external memory 132) is inserted only in the second slot 122, as shown in FIG. 16(a), and media (external memories corresponding to the respective slots) are not inserted in the first slot 121, third slot 123, or fourth slot 124, LUN0 is allocated to the second slot 122, and the personal computer 136 can access only the second external memory 132 inserted in the second slot 122.

Also, if the medium (second external memory 132) inserted in the second slot 122 is removed, and another medium (first external memory 131, for example) is newly inserted in another slot (the first slot 121), LUN0 is allocated to the slot in which that medium is newly inserted, and the personal computer 136 can access only the external memory inserted in that slot.

Figure 16B:
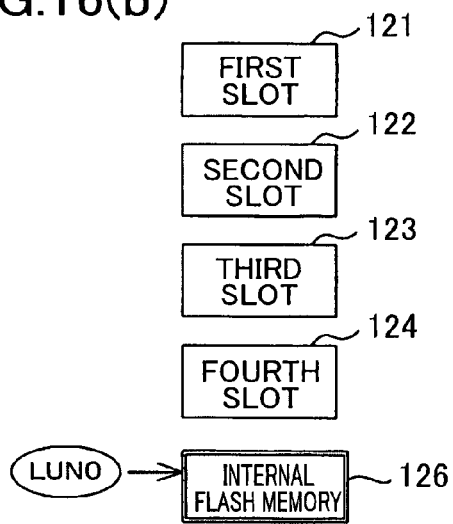

As shown in FIG. 16(b), LUN0 is assigned to the internal flash memory 126 when no media has been inserted into any of the slots. Accordingly, the personal computer 136 can access only the internal flash memory 126.

As described above, the CPU 111 recognizes a slot, in which a medium is inserted, by an interrupt signal issued from the memory detection switch provided to each slot 121-124. When media are inserted in two or more slots among the four slots 121-124, the CPU 111 allocates LUN0 to the slot in which a medium has been inserted first, and the personal computer 136 can access only the external memory inserted in that slot.

Figure 16C:
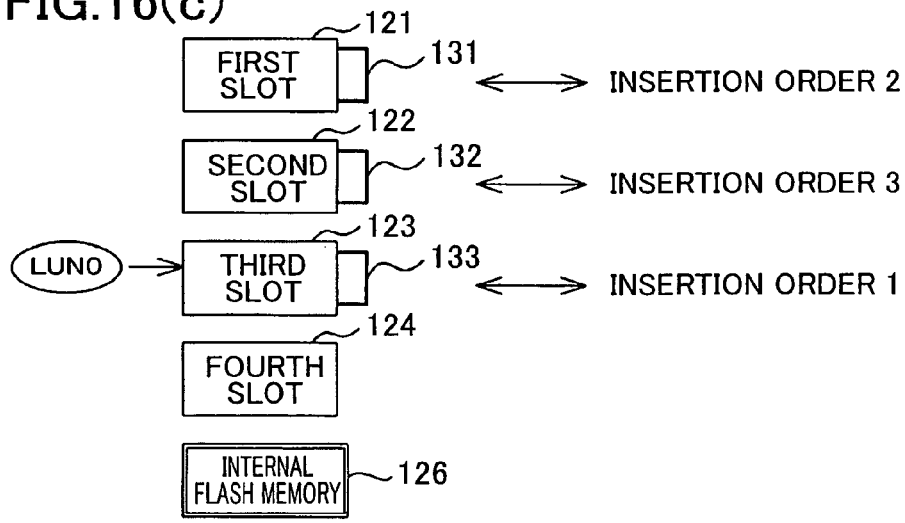

For example, when media (external memories) are inserted in the third slot 123, first slot 121, and second slot 122, in that order, and all the media remain inserted, as shown in FIG. 16(c), LUN0 is allocated to the third slot 123 into which a medium has been inserted first, as the media first-insertion slot, and accessible by the personal computer 136. Therefore, the personal computer 136 cannot access the first external memory 131 inserted in the first slot 121, or the second external memory 132 inserted in the second slot 122.

Figure 16D:
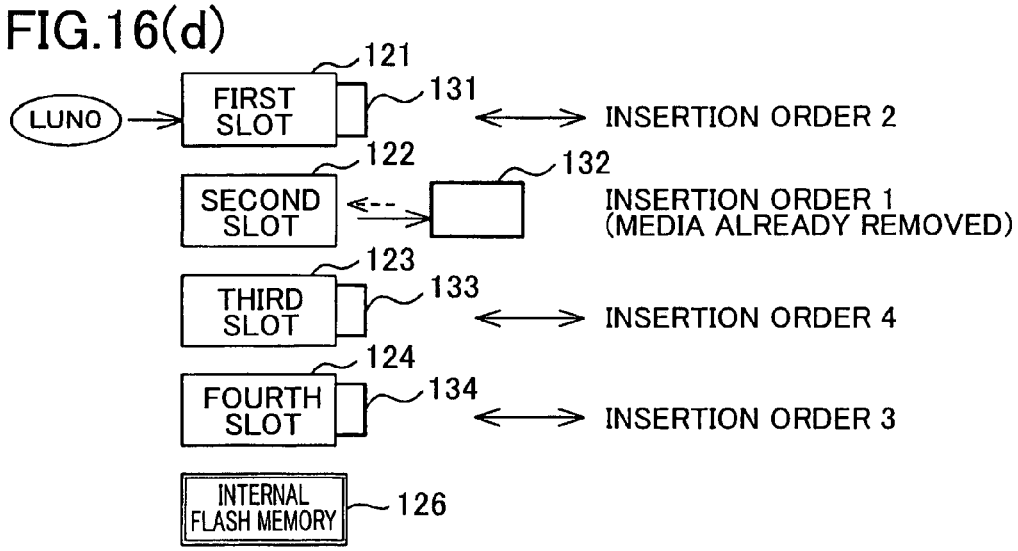

Assume that media have been inserted in the second slot 122, first slot 121, fourth slot 124, and third slot 123, in that order, but a medium (second external memory 132) has already been removed from the second slot 122, as shown in FIG. 16(d). In this case, among the first slot 121, third slot 123, and fourth slot 124 in which media remain, LUN0 is allocated to the first slot 121, into which a medium has been inserted first, as the media first-insertion slot, and accessible by the personal computer 136. In this case, the personal computer 136 cannot access the third external memory 133 inserted in the third slot 123 or the fourth external memory 134 inserted in the fourth slot 124.

As is clear from the above description, LUN0 is assigned to the internal flash memory 126 in the single-drive mode when no media is inserted in any of the slots. Accordingly, the personal computer 136 can access only the internal flash memory 126. If only one medium is inserted in a slot, LUN0 is assigned to the slot having the medium, and the personal computer 136 can access only that medium. Further, if that medium is removed from the slot and a different medium is inserted into its corresponding slot, LUN0 is reassigned to the slot having the different medium, and the personal computer 136 can only access that medium.

On the other hand, if a plurality of media is inserted into their corresponding slots from a state in which no media has been inserted in any slots, LUN0 is assigned to the slot that has first received a medium, and the personal computer 136 can access only that medium. If that medium is removed from its slot, LUN0 is reassigned to the slot that has second received a medium, and the personal computer 136 can now access only the medium in the slot that has second received a medium.

In the single-drive mode, therefore, the personal computer 136 is able to access only one memory from among the external memories 131-134 inserted in the slots 121-124 and the internal flash memory 126. The memory that can be accessed by the personal computer 136 is automatically switched as the external memories 131-134 are inserted into or removed from their respective slots 121-124. In other words, the single-drive mode in the preferred embodiment is an automatic switching mode for automatically switching the single drive that can be accessed by the personal computer 136.

The order in which media (external memories) are inserted in slots is determined based on interrupt signals that have been issued by the media detection switches fitted to the slots and that are stored in the RAM in the CPU 111.

However, if the CPU 111 determines in S172 that the multi-drive mode has been selected, then in S174 the CPU 111 sets the operating mode of the multi-reader/writer 101 to the multi-drive mode. In the multi-drive mode, logical unit numbers are assigned to each of the first slot 121, second slot 122, third slot 123, fourth slot 124, and internal flash memory 126, enabling the personal computer 136, which is provided with a multi-support driver, to access each slot 121-124 and the internal flash memory 126 independently.

Figure 17:
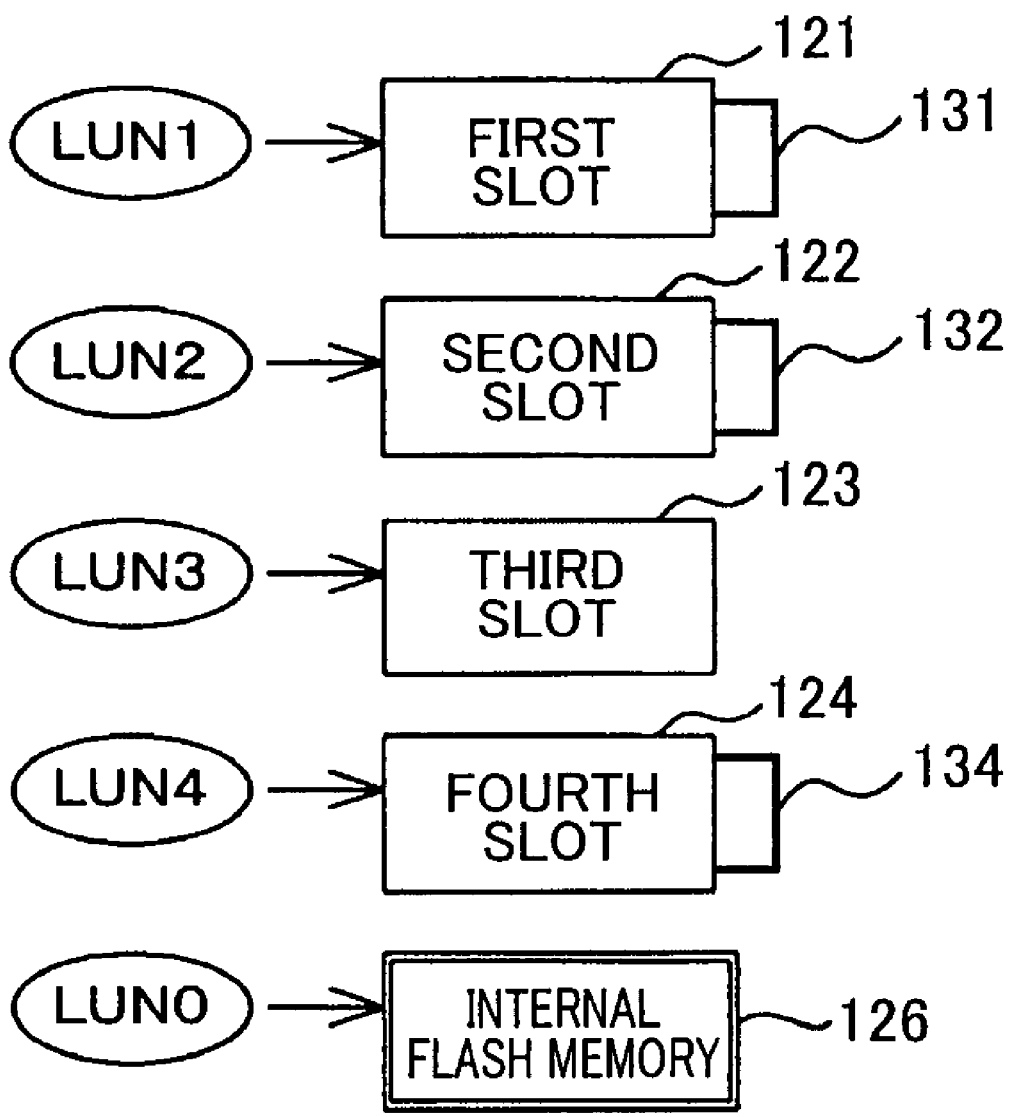
FIG. 17 is an explanatory diagram illustrating drive allocation (LUN allocation) in the multi-drive mode according to the fourth embodiment.

Here, predetermined logical unit numbers are assigned to each of the slots 121-124 and the internal flash memory 126. As shown in FIG. 17, in this example, the CPU 111 assigns LUN0 to the internal flash memory 126, LUN1 to the first slot 121, LUN2 to the second slot 122, LUN3 to the third slot 123, and LUN4 to the fourth slot 124.

After the operating mode of the multi-reader/writer 101 has been set to the mode selected by the S/N switch 115 as described above, thereafter this mode is preserved while the multi-reader/writer 101 continues operating. In order to change the mode, the USB cable 138 has to be temporarily disconnected from the USB port 114 and then reconnected, or the personal computer 136 has to be restarted, for example. In other words, it is necessary to restart the multi-reader/writer 101.

Although not indicated in the flowchart of FIG. 14, upon receiving a bus power supply and starting up, the multi-reader/writer 101 receives a device check command from the personal computer and, in response, transmits a command to the personal computer 136 indicating that the multi-reader/writer 101 is a storage class device. Through this process, the personal computer 136 recognizes the multi-reader/writer 101 as a high-capacity storage device.

Figure 15:
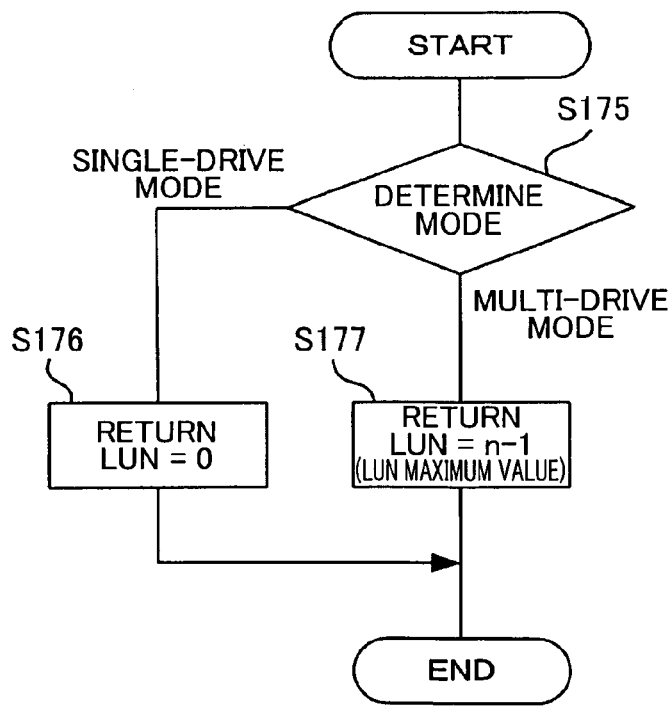
FIG. 15 is a flowchart showing a GET_MAX_LUN response process according to the fourth embodiment.

At the same time the drive mode setting process of FIG. 14 is being executed, a GET_MAX_LUN response process shown in FIG. 15 is also executed. When the OS on the personal computer 136 queries driver software installed on the personal computer 136 for supporting the multi-reader/writer 101 regarding the total number of drives possessed by the multi-reader/writer 101 (including slots and internal flash memory), the driver software transmits a GET_MAX_LUN command to the multi-reader/writer 101 only when the driver software is a multi-support driver. In other words, the GET_MAX_LUN command is a query regarding the total number of drives provided in the multi-reader/writer 101 and indicates that the personal computer 136 is provided with a multi-support driver.

Here, the command transmitted to the multi-reader/writer 101 only when the driver software is a multi-support driver is not limited to a command for directly indicating that the plurality of slots 121-124 and the internal flash memory 126 provided in the multi-reader/writer 101 can be accessed individually, but may indicate this information indirectly, as described above. In other words, when a data processing device capable of individually accessing the plurality of slots 121-124 and the internal flash memory 126 outputs some command to the multi-reader/writer 101 for individually accessing the plurality of slots, the multi-reader/writer 101 can recognize from this command that the personal computer 136 supports the multi-drive mode.

If the driver software installed on the personal computer 136 is not a multi-support driver and supports only single-slot reader/writers, the driver does not transmit a GET_MAX_LUN command in response to a query for the total number of drives received from the OS of the personal computer 136, but instead returns the value 1 as the total number of drives.

Accordingly, if the OS on the personal computer 136 is an older or lower rank OS for which a multi-support driver is not installed as standard, then a GET_MAX_LUN command will not be transmitted to the multi-reader/writer 101. In other words, the GET_MAX_LUN response process of FIG. 15 will not be executed.

However, if the OS of the personal computer 136 is a newer or upper rank OS for which a multi-support driver is installed as standard, then a GET_MAX_LUN command will be transmitted to the multi-reader/writer 101. Therefore, when the multi-reader/writer 101 receives a GET_MAX_LUN command, the GET_MAX_LUN response process of FIG. 15 is executed as an interrupt process.

The drive mode setting process of FIG. 14 and the GET_MAX_LUN response process of FIG. 15 are separately executed tasks. However, the GET_MAX_LUN response process is executed when the OS of the personal computer 136 is a newer or upper rank OS, only after the drive mode setting process of FIG. 14 has been executed to set the operating mode.

The GET_MAX_LUN response process begins when the multi-reader/writer 101 receives a GET_MAX_LUN command. At the beginning of the process in S175, the CPU 111 determines the mode set in the drive mode setting process of FIG. 14. If the mode has been set to the single-drive mode, then in S176 the CPU 111 returns a "0" to the personal computer 136 as the LUN value. The LUN value is one less than the number of drives accessible from the personal computer 136. Since the personal computer 136 can only access a medium inserted into a single slot (or the internal flash memory 126 when no media are inserted) in the single-drive mode, the CPU 111 returns LUN=0. Hence, even though the multi-reader/writer 101 is provided with a plurality of slots, the CPU 111 responds to the personal computer 136 that the total number of drives is one when the operating mode is set to the single-drive mode, so that the personal computer 136 can access a single slot only or the internal flash memory 126 only.

However, if the CPU 111 determines in S175 that the operating mode is set to the multi-drive mode, then in S177 is the CPU 111 returns a value equivalent to one less than the total number of drives n to the personal computer 136 as the LUN value. In other words, the CPU 111 returns a value equivalent to the maximum LUN value (maximum value of the LUN) as the LUN value. Since the total number of drives n is five in the preferred embodiment, the CPU 111 returns LUN=4. In other words, since the maximum LUN value is four in the preferred embodiment, the CPU 111 returns LUN=4.

Figure 18A:
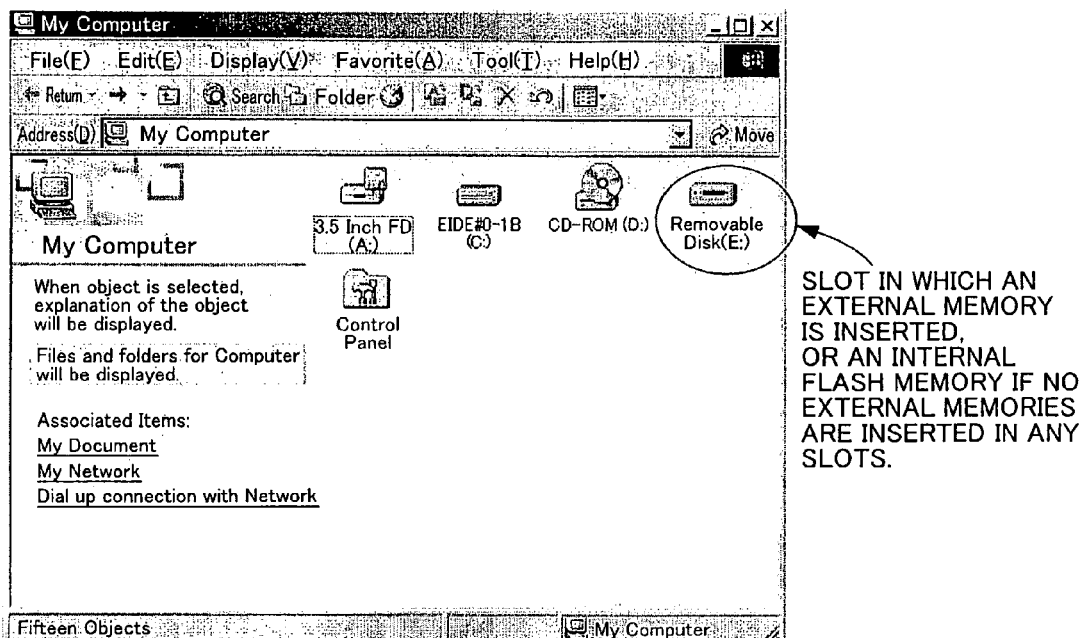
FIG. 18(a) is an explanatory diagram showing a PC window in which the PC recognizes a slot or an internal flash memory in the single drive mode according to the fourth embodiment.

As a result, the personal computer 136 recognizes that the total number of accessible drives is one in the single-drive mode. Accordingly, when displaying the drives on a display (not shown) of the personal computer 136 in the "My Computer" window, only a drive E is displayed as a removable disk, as shown in FIG. 18(a). In other words, to the personal computer 136, the multi-reader/writer 101 appears to have only one drive. In reality, since LUN0 has been assigned to a single slot in the multi-reader/writer 101 having an inserted medium, or to the internal flash memory 126 when no media are inserted, the personal computer 136 can access only the drive to which LUN0 has been assigned as drive E.

Figure 18B:
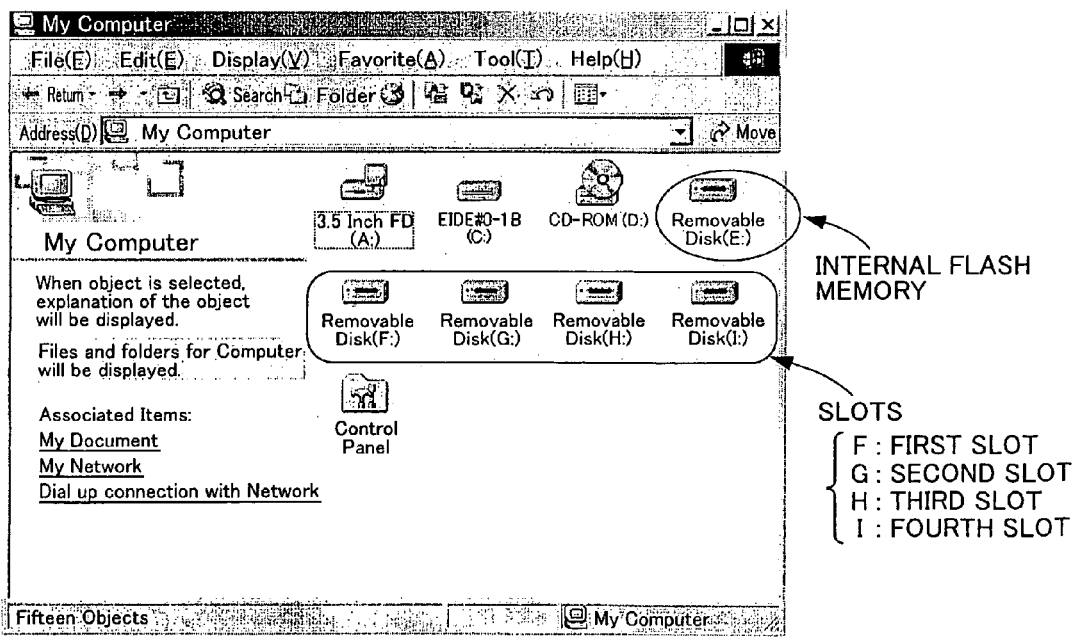
FIG. 18(b) is an explanatory diagram showing a PC window in which the PC recognizes a plurality of slots and an internal flash memory in the multi drive mode according to the fourth embodiment.

In the multi-drive mode, however, the personal computer 136 recognizes that the number of accessible drives is five, Accordingly, the display in the "My Computer" window includes drives E, F, G, H, and I as removable disks, as shown in FIG. 18(b). Hence, the personal computer 136 can independently access each of the slots 121-124 and the internal flash memory 126. The assignment of drive letters is fixed in the preferred embodiment, such that the internal flash memory 126 identified by LUN0 is assigned to drive E, the first slot 121 identified by LUN1 is assigned to drive F, the second slot 122 identified by LUN2 is assigned to drive G, the third slot 123 identified by LUN3 is assigned to drive H, and the fourth slot 124 identified by LUN4 is assigned to drive I.

Next, the read/write operation executed by the multi-reader/writer 101 will be described.

Figure 19A:
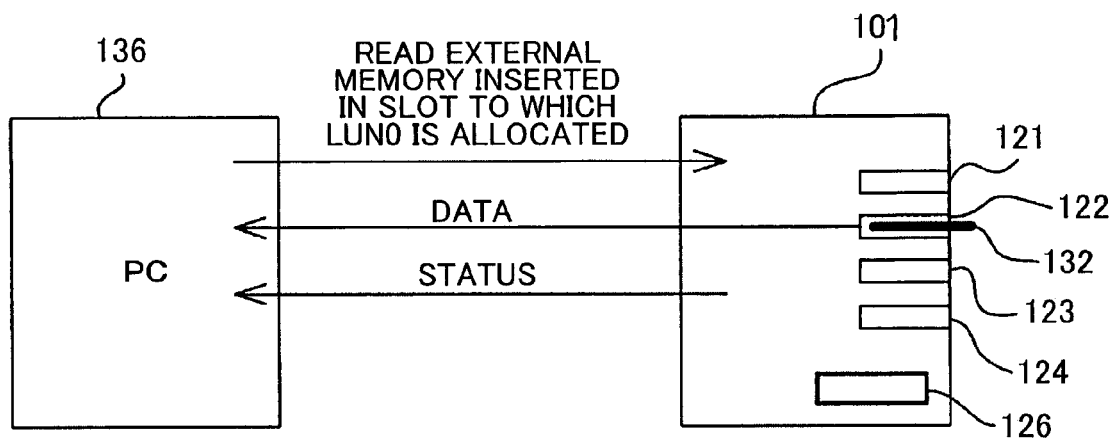
FIG. 19(a) is an explanatory diagram illustrating a data read process in the single drive mode according to the fourth embodiment.

First, the read/write operation executed by the multi-reader/writer 101 when the multi-reader/writer 101 is in the single drive mode will be described with reference to FIGS. 19(a) and 19(b).

In order to read data from the multi-reader writer 101, the personal computer 136 transmits a "Read external memory inserted in the slot to which LUN0 is allocated" command to the multi-reader writer 101, as shown in FIG. 19 (a). In response to this, the multi-reader/writer 101 reads data from the media (second external memory 132, in this example) inserted in the slot to which LUN0 is allocated (second slot 122, in this example), and transmits this data to the personal computer 136. Finally, the multi-reader/writer 101 sends an OK or NG status to the personal computer 136.

Figure 19B:
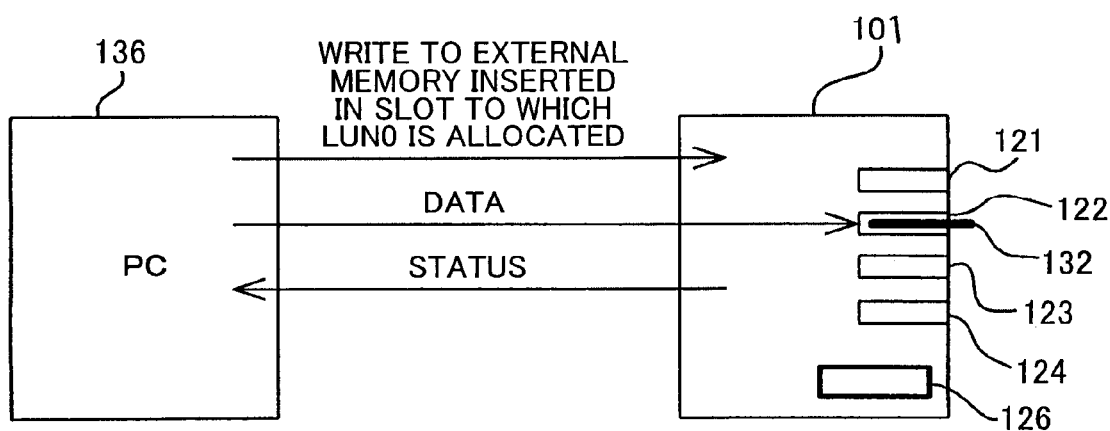
FIG. 19(b) is an explanatory diagram illustrating a data write process in the single drive mode according to the fourth embodiment.

In order to write data to the multi-reader/writer 101, the personal computer 136 transmits a "Write to external memory inserted in slot to which LUN0 is allocated" command to the multi-reader/writer 101, as shown in FIG. 19(b). In response to this, the multi-reader/writer 101 writes data transmitted from the personal computer 136 to the medium (second external memory 132, in this example) inserted in the slot to which LUN0 is allocated (second slot 122, in this example). Finally, the multi-reader/writer 101 sends an OK or NG status to the personal computer 136.

As described above, when a medium (external memory) is inserted into only one slot from among the slots 121-124, LUN0 is assigned to that slot. When media are inserted into two or more slots, LUN0 is assigned to the slot into which a medium has first been inserted. LUN0 is assigned to the internal flash memory 126 when no media are inserted into any of the slots.

Next, read/write operations when the multi-reader/writer 101 is in the multi-drive mode will be described with reference to FIGS. 20(a) and 20(b), In multi-drive mode, LUN0, LUN1, LUN2, LUN3, and LUN4 are allocated as fixed values to the internal flash memory 126, the first slot 121, second slot 122, third slot 123, fourth slot 124, respectively.

Figure 20A:
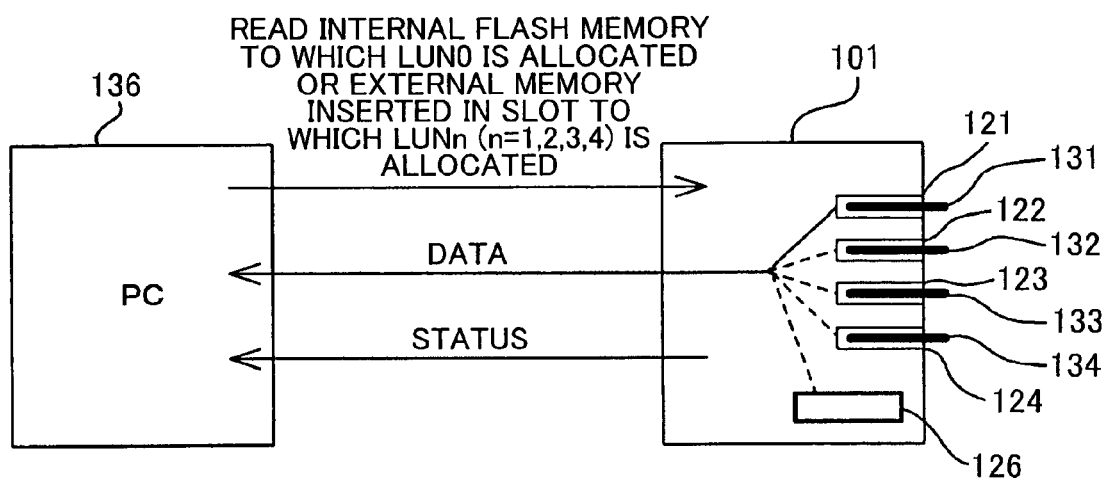
FIG. 20(a) is an explanatory diagram illustrating the data read process in the multi-drive mode according to the fourth embodiment.

Therefore, as shown in FIG. 20(a), the personal computer 136 transmits to the multi-reader/writer 101 a "Read external memory inserted in the slot to which LUN0 is allocated" command when reading data from the internal flash memory 126, a "Read external memory inserted in the slot to which LUN1 is allocated" command when reading data from the medium (first external memory 131) inserted in the first slot 121, a "Read external memory inserted in the slot to which LUN2 is allocated" command when reading data from the medium (second external memory 132) inserted in the second slot 122, a "Read external memory inserted in the slot to which LUN3 is allocated" command when reading data from the medium (third external memory 133) inserted in the third slot 123, and a "Read external memory inserted in the slot to which LUN4 is allocated" command when reading data from the medium (fourth external memory 134) inserted in the fourth slot 124.

In response, the multi-reader/writer 101 reads data from the medium (external memory) inserted in the relevant slot, and transmits that data to the personal computer 136. Finally, the multi-reader/writer 101 sends an OK or NG status to the personal computer 136.

Figure 20B:
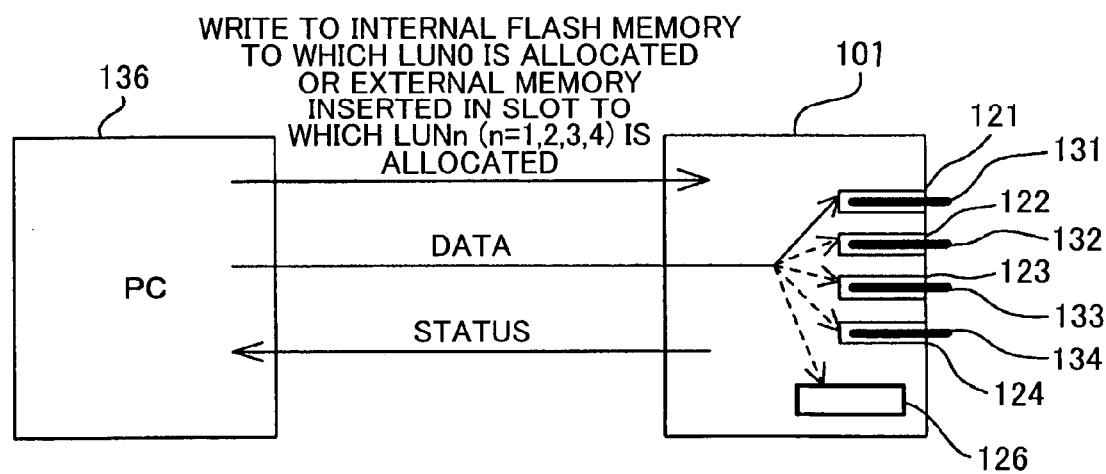
FIG. 20(b) is an explanatory diagram illustrating the data write process in the multi-drive mode according to the fourth embodiment.

As shown in FIG. 20(b), the personal computer 136 transmits to the multi-reader/writer 101 a "Write to external memory inserted in the slot to which LUN0 is allocated" command when writing data to the internal flash memory 126, a "Write to external memory inserted in the slot to which LUN1 is allocated" command when writing data to the medium (first external memory 131) inserted in the first slot 121, a "Write to external memory inserted in the slot to which LUN2 is allocated" command when writing data to the medium (second external memory 132) inserted in the second slot 122, a "Write to external memory inserted in the slot to which LUN3 is allocated" command when writing data to the medium (third external memory 133) inserted in the third slot 123, and a "Write to external memory inserted in the slot to which LUN4 is allocated" command when writing data to the medium (fourth external memory 134) inserted in the fourth slot 124.

In response, the multi-reader/writer 101 write data to the medium (external memory) inserted in the relevant slot. Finally, the multi-reader/writer 101 sends an OK or NG status to the personal computer 136.

It is noted that in the present embodiment, the ROM in the CPU 111 is prestored with: a set of LUN layout data for the single drive mode; and a set of LUN layout data for the multi-drive mode. The layout data for the single drive mode indicates that all of the internal memory 126 and the first through fourth slots 121, 122, 123, and 124 correspond to LUN0. The layout data for the multi-drive mode indicates that all of the internal memory 126 and the first through fourth slots 121, 122, 123, and 124 correspond to LUN0, LUN1, LUN2, LUN3, and LUN4, respectively.

When the multi-reader/writer 101 is set to the single drive mode, the LUN layout data for the single drive mode is copied into the RAM in the CPU 111. When no external memory is inserted in a corresponding slot, the CPU 111 sets the LUN0 to the internal memory 126. When some external memory is inserted in a corresponding slot, the CPU 111 sets the LUN0 to that slot, into which a corresponding external memory has been inserted first.

When the multi-reader/writer 101 is set to the multi-drive mode, the LUN layout data for the multi-drive mode is copied into the RAM in the CPU 111. By referring to the layout data in the RAM, the CPU 15 sets the LUN1-LUN4 to the slots 121-124, respectively. The CPU 15 sets the LUN0 to the internal memory 126. The personal computer can therefore access any of the external memories 131, 132, 133, and 134 that are inserted in the corresponding slots 121, 122, 123, and 124 and the internal memory 126 by indicating LUN0, LUN1, LUN2, LUN3, that is, by transmitting a "Read external memory inserted in the slot to which LUNn (n=0, 1, 2, 3, or 4) is allocated" command or a "Write to external memory inserted in the slot to which LUNn (n=0, 1, 2, 3, or 4) is allocated" command.

In the multi-reader/writer 101, the drive is automatically allocated to a desired slot among a plurality of slots simply by inserting a medium into the desired slot, even when the OS of the personal computer 136 is an older or lower rank OS that is not provided with a multi-support driver as standard. Accordingly, the user can access his/her desired slot without requiring the user to re-operate the Plug and Play function by unplugging and reinserting the cable.

Even when the multi-reader/writer 101 is connected to the personal computer that runs an older or lower rank OS and therefore a multi-support driver is not installed in the OS, the operating mode of the multi-reader/writer 101 can be set to the single-drive mode, enabling the personal computer to access any one desired slot using only the standard driver in the older or lower rank OS. It is possible to use all drives in the reader/writer. It is unnecessary to install special driver software into the personal computer separately.

When the personal computer 136 is running a newer or upper rank OS provided with a multi-support driver as standard, use of the multi-drive mode or the single-drive mode can be selected using the S/M switch 115. In other words, although the peripheral device is a multi-slot type provided with a plurality of slots, the user can use the S/M switch 115 to select whether to assign drives for all of the plurality of slots or to assign a drive for a single slot in which a medium is inserted. The multi-reader/writer 101 is user-friendly.

Specifically, if the user does not wish to assign a plurality of drives that appear as removable disks on the display of the personal computer, as shown in FIG. 18(b), the user can select the single-drive mode in order to display a single removable disk, as shown in FIG. 18(a).

In the multi-drive mode, the order of LUNs allocated to the slots 121-124 and the internal flash memory 126 is fixed as shown in FIG. 17, so that the order of drive letters of slots 121-124 and the internal flash memory 126 is not switched but is fixed as shown in FIG. 18(b), and the user does not become confused.

Tho multi-reader/writer 101 only requires a switch that can select between two modes, regardless of the number of slots. Accordingly, a cost increase caused by provision of the S/M switch 115 does not change according to the number of slots.

The configuration for executing the mode selecting operation is not limited to the S/M switch 115. For example, the mode may be selected based on control signals received from the personal computer 136.

Further, in addition to media inserted in the slots, the multi-reader/writer 101 can also access the internal flash memory 126. Accordingly, the multi-reader/writer 101 is highly versatile and allows the personal computer 136 to read or write data, even when no media are inserted into the slots of the multi-reader/writer 101.

Fifth Embodiment

Next, a multi-reader/writer according to a fifth embodiment will be described with reference to FIG. 21.

The multi-reader/writer 101 according to the fourth embodiment operates through bus power. Once the mode is set in the drive mode setting process of FIG. 14, changes to the mode setting can be achieved by unplugging and reconnecting the USB cable 138 or by restarting the personal computer 136.

The multi-reader/writer 101 may not be bus-powered but may receive a power supply from its own external power source.

If the multi-reader/writer 101 is modified to a self-powered type, the multi-reader/writer 101 can continue operating even when the USB cable 138 is disconnected or the power supply for the personal computer 136 is turned off. Accordingly, in order to turn off the multi-reader/writer 101, it is necessary to turn off and back on again the external power source of the multi-reader/writer 101.

Therefore, when the multi-reader/writer 101 is modified into a self-powered type, mode settings can be changed by reconnecting the USB cable 138 and the like without having to restart the multi-reader/writer 101 itself.

A multi-reader/writer 101' according to the present embodiment is the same as the multi-reader/writer 101 according to the present embodiment except that multi-reader/writer 101' is self powered and that the drive mode setting process of FIG. 14 is modified as shown in FIG. 21.

It is noted that the multi-reader/writer 101' according to the fifth embodiment begins operating when the multi-reader/writer's own power is turned on.

When the multi-reader/writer 101' starts up, the drive mode setting process of FIG. 21 is executed.

In this process, the steps S180-S183 are identical to S171-S174 in the drive mode setting process of FIG. 14. Therefore, a description of these steps has been omitted.

After the operating mode is set in either S182 or S183 based on the position of the S/M switch 115, the CPU 111 determines in S184 whether communication with the USB host (i.e., the personal computer 136) has been interrupted. In other words, the CPU 111 determines whether the USB cable 138 has been disconnected, the personal computer 136 has been restarted, or the power to the personal computer 136 has been turned off. In other words, the CPU 111 determines whether the personal computer 136 is capable of accessing the multi-reader/writer 101.

The determination in S184 is repeated (no in S184) as long as the personal computer 136 is connected to the multi-reader/writer 101 by the USB cable 138 and the personal computer 136 is capable of accessing the multi-reader/writer 101. When communication with the USB host (personal computer 136) is interrupted by disconnection of the USB cable 138 or the like (yes in S184), the CPU 111 returns to S180. As a result, the entire process is repeated from S180 to set the operating mode according to the selection by the S/M switch 115.

Hence, with the self-powered multi-reader/writer 101' according to the present embodiment, the mode setting is repeated if the USB cable 138 is disconnected or the personal computer 136 is restarted, for example, while the multi-reader/writer 101 is operating. Accordingly, the mode setting can be modified without turning off the power supply to the multi-reader/writer 101'.

Sixth Embodiment

Next, a multifunction device according to a sixth embodiment will be described with reference to FIGS. 22 to 24.

Figure 2:
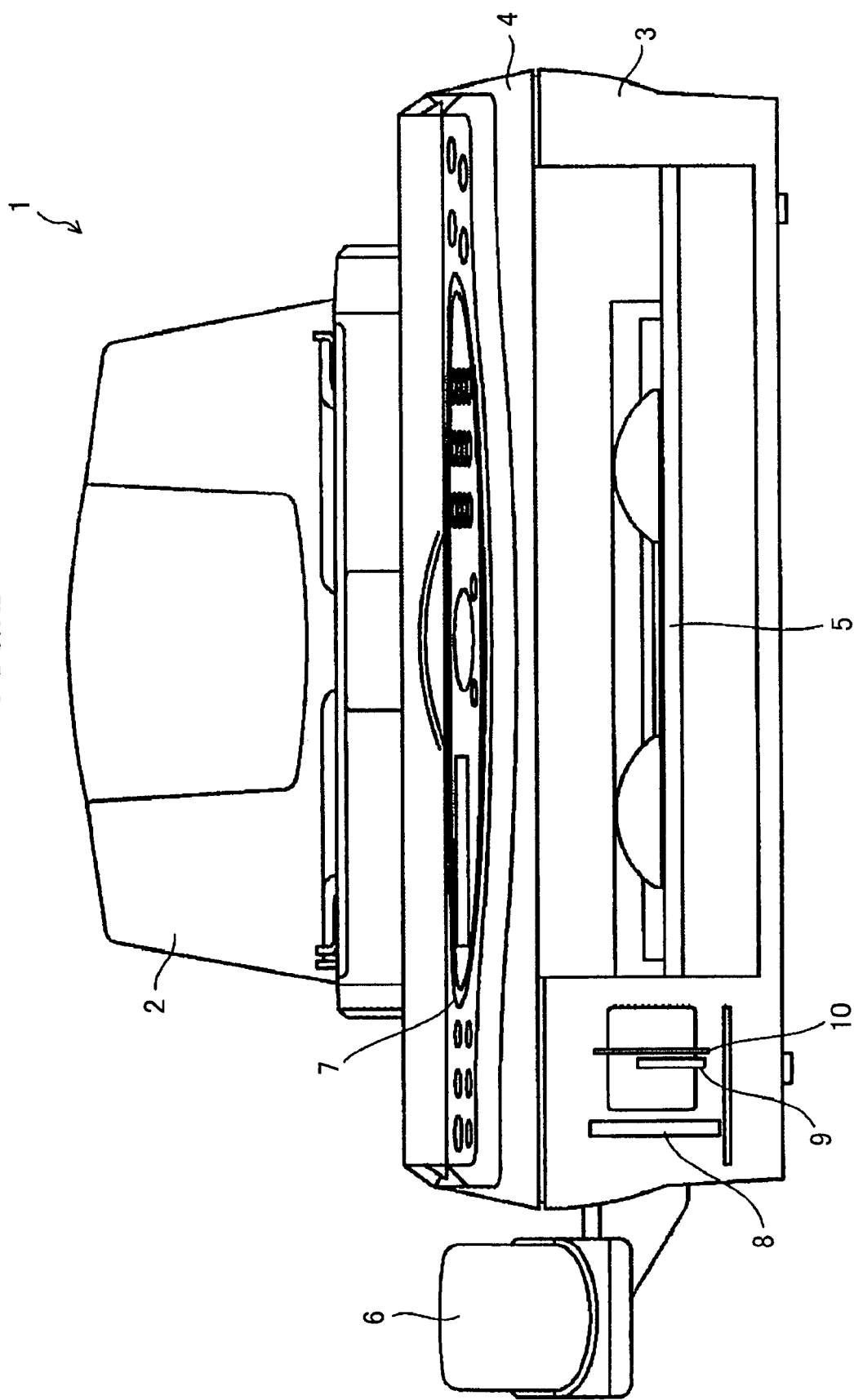
FIG. 2 is a front view of the multifunction device of the first embodiment.

The multifunction device 140 of the sixth embodiment has a perspective view the same as that of the multi-function device 1 of the first embodiment shown in FIG. 1, and has a front view shown in FIG. 22 that is substantially the same as that of the multi-function device 1 of the first embodiment shown in FIG. 2 except that the multifunction device 140 has four slots 121-124.

As shown in FIG. 22, similarly to the multi-reader/writer 101 of FIGS. 12(*a*) and 12(*b*), the multifunction device 140 has the first slot 121, into which a CompactFlash (CF) card (first external memory 131) can be inserted, the second slot 122 into which a SmartMedia (SM) (second external memory 132) can be inserted, the third slot 123 into which a Memory Stick (MS) card (third external memory 133) can be inserted, and the fourth slot 124 into which a Secure Digital (SD) memory card (fourth external memory 134) can be inserted.

As shown in FIG. 23, the multifunction device 140 has substantially the same internal configuration with the multifunction device 1 of the first embodiment except that the multifunction device 140 has four slots 121-124 and except that the S/M switch 115 is additionally provided. In this embodiment, the S/M switch 115 is provided as a function key. The function key is implemented by manipulating keys on the keypad 7b in a prescribed order. However, the S/M switch 115 may also be provided as a physically independent device similarly to the fourth embodiment.

It is noted that according to the present embodiment, the multifunction device 140 can be connected to the personal computer (136, in this example) via the USB cable (138, in this example).

The multifunction device 140 having this construction allows the personal computer 136 to access each of the slots 121-124. Accordingly, the personal computer 136 can read data from and write data to each of the external memories 131-134 inserted in the slots 121-124. As in the fourth embodiment, the operating mode of the multifunction device 140 for accessing the slots 121-124 can be set to a single-drive mode or a multi-drive mode.

The user can select a mode by manipulating the S/M switch 115 similarly to the fourth embodiment. It is noted, however, that in the present embodiment, the operating mode is forcibly set to the single-drive mode on startup. The multifunction device 140 leaves the operating mode in the single-drive mode if the single-drive mode has been selected by the S/M switch 115 when a GET_MAX_LUN command is received from the personal computer 136, but changes the operating mode to the multi-drive mode if the multi-drive mode has been selected.

Next, the drive mode setting process performed in the multifunction device 140 will be described with reference to FIG. 24.

Figure 24:
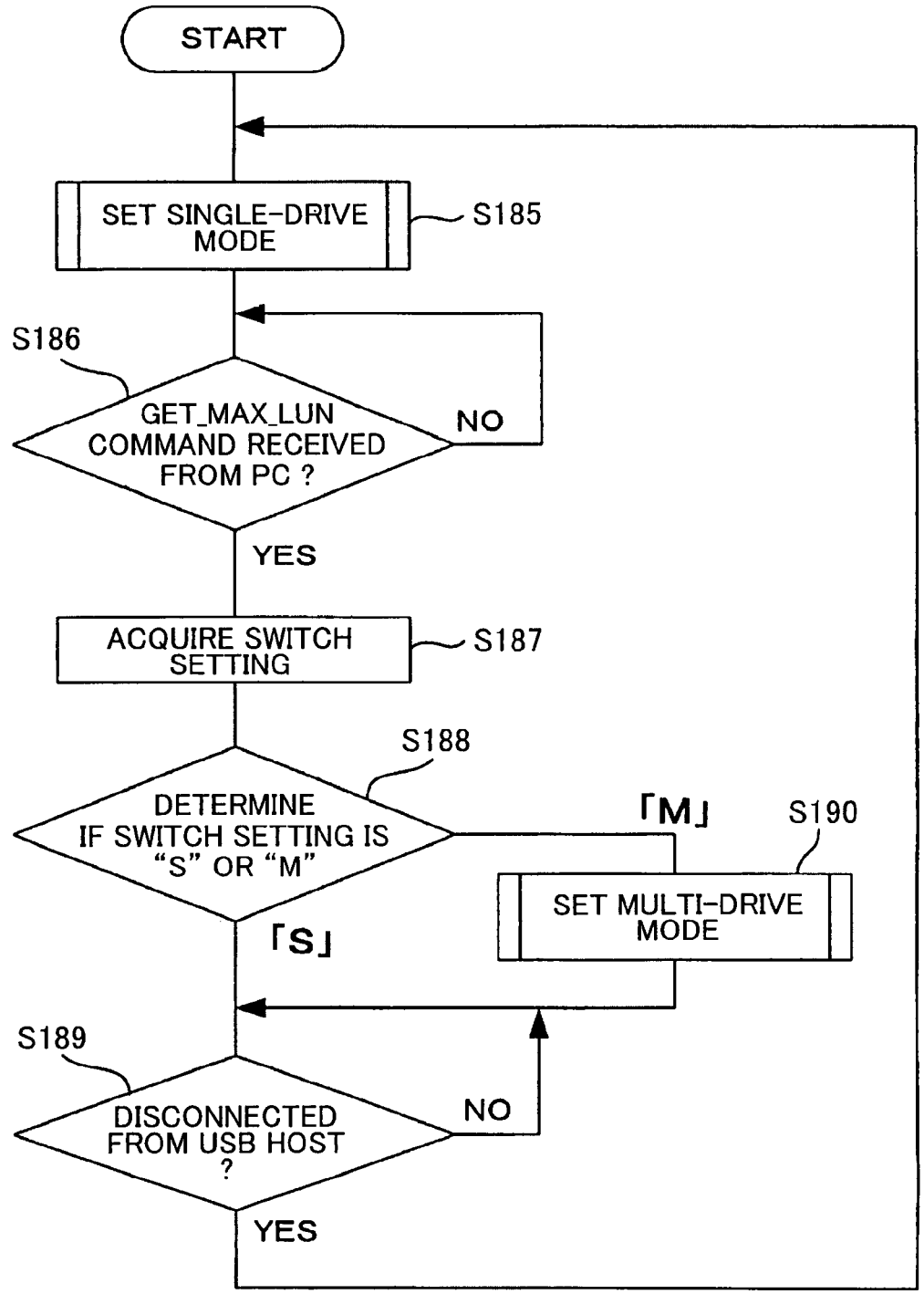
FIG. 24 is a flowchart showing a drive mode setting process according to the sixth embodiment.

FIG. 24 is a flowchart showing the drive mode setting process according to the sixth embodiment, In the multifunction device 140, the CPU 15 reads a drive mode setting process program from the ROM 16 and executes the drive mode setting process according to this program. The drive mode setting process begins when the multifunction device 140 is turned on.

At the beginning of the process in S185, the CPU 143 sets the operating mode to the single-drive mode. The difference from the setting process in the fourth embodiment is that the process according to the present embodiment initially sets the multifunction device 140 to operate in the single-drive mode, regardless of which mode the user has selected with the switch.

When the multifunction device 140 is connected to the personal computer 136 via the USB cable 138, the multifunction device 140 receives a device check command from the personal computer 136, and therefore sends to the personal computer 136 a command indicating that the multifunction device 140 is a storage class device. More specifically, the entire multifunction device 140 is recognized by the personal computer 136 as a "USB composite device," and a plurality of constituent functions are further recognized thereunder. For example, USB printing support is recognized as constituent function 0, the reading device 4 (the scanner) as constituent function 1, the facsimile modem 26 as constituent function 2, and a large-capacity storage device (external memories 131-134) as constituent function 3. Each constituent function can have an individual class. Constituent function 3 is a "storage class."

In S186 the CPU 143 determines whether a GET_MAX_LUN command has been received from the personal computer 136 and repeats this determination in S186 continuously as long as a command has not been received. Since a GET_MAX_LUN command will not be received when the personal computer 136 is running an older or lower rank OS that is not provided with a standard multi-support driver, the multifunction device 140 will operate in the single-drive mode regardless of the mode selected by the switch.

However, since the personal computer 136 running a newer or upper rank OS will transmit a GET_MAX_LUN command, the CPU 143 advances to S187 upon receiving the command and in S187 reads the setting of the S/M switch 115. In S188 the CPU 143 determines whether the single-drive mode or the multi-drive mode has been selected based on the switch setting.

If the single-drive mode has been selected, then in S189 the CPU 143 determines whether communication with the USB host (personal computer 136) has been interrupted. This process is identical to the process of S184 in FIG. 21 according to the fifth embodiment. Hence, if the single-drive mode has been selected with the switch 115 when a GET_MAX_LUN command is received, the multifunction device 140 continues operating in the single-drive mode.

The LUN allocation in this case is similar to that in FIGS. 16(*a*)-16(*d*) described in the fourth embodiment, except that the internal flash memory 126 is omitted from FIG. 16, since the multifunction device 140 is not provided with the internal flash memory 126. Further, drive allocation for the slots 121-124 is identical to that shown in FIG. 18(*a*), wherein drive E is assigned to the slot in which a medium has first been inserted.

On the other hand, if the CPU 143 determines in S188 that the multi-drive mode has been selected with the switch 115, then in S190 the CPU 143 sets the operating mode of the multifunction device 140 to the multi-drive mode and advances to S189. LUN allocation in this case is slightly different from that in FIG. 17 according to the fourth embodiment. In the present embodiment, LUN0 is assigned to the first slot 121, LUN1 to the second slot 122, LUN2 to the third slot 123, and LUN3 to the fourth slot 124. Drive allocations for the slots 121-124 are also slightly different from those shown in FIG. 18(*b*). In the preferred embodiment, the first slot 121 is assigned to drive E, the second slot 122 to drive F, the third slot 123 to drive G, and the fourth slot 124 to drive H. As in the fourth embodiment, allocation of drive letters in the present embodiment is fixed.

It is noted that the ROM 16 is prestored with: a set of LUN layout data for the single drive mode; and a set of LUN layout data for the multi-drive mode. The layout data for the single drive mode indicates that all of the first through fourth slots 121, 122, 123, and 124 correspond to LUN0. The layout data for the multi-drive mode indicates that the first through third slots 121, 122, 123, and 124 correspond to LUN0, LUN1, LUN2, and LUN3, respectively.

When the multifunction device 140 is set to the single drive mode, the LUN layout data for the single drive mode is copied into the RAM 17. By referring to the layout data in the RAM 17, the CPU 15 sets the LUN0 to a single slot, into which an external memory has been inserted first among the slots 121-124. The personal computer 136 can therefore access one external memory 131, 132, 133, or 134 that has been inserted first in the corresponding slot 121, 122, 123, or 124, by indicating the LUN0, that is, by transmitting a "Read external memory inserted in the slot to which LUN0 is allocated" command or a "Write to external memory inserted in the slot to which LUN0 is allocated" command.

When the multifunction device 140 is set to the multi-drive mode, the LUN layout data for the multi-drive mode is copied into the RAM 17. By referring to the layout data in the RAM 17, the CPU 15 sets the LUN0-LUN3 to the slots 121-124, respectively. The personal computer 136 can therefore access any of the external memories 131, 132, 133, and 134 that are inserted in the corresponding slots 121, 122, 123, and 124, by indicating LUN0, LUN1, LUN2, or LUN3, that is, by transmitting a "Read external memory inserted in the slot to which LUNn (n=0, 1, 2, or 3) is allocated" command or a "Write to external memory inserted in the slot to which LUNn (n=0, 1, 2, or 3) is allocated" command.

As described above, the multifunction device 140 is set to the single drive mode regardless of the selection by the selection switch 115 when the OS of the personal computer 136 is an older or lower rank OS that is not provided with a multi-support driver as standard. Accordingly, the drive is automatically allocated to a desired slot among a plurality of slots simply by inserting a medium into the desired slot. Accordingly, the user can access his/her desired slot without requiring the user to re-operate the Plug and Play function by unplugging and reinserting the cable.

Moreover, since the operating mode is automatically initialized to the single-drive mode as described above, the multifunction device 140 will not be set in the multi-drive mode, even if the switch 115 has been set to the multi-drive mode in error, because the multifunction device 140 will not receive a GET_MAX_LUN command from the personal computer 136. Accordingly, an incorrect setting of the switch 115 does not affect the multifunction device 140.

On the other hand, when the personal computer 136 is running a newer or upper rank OS provided with a multi-support driver as standard, use of the multi-drive mode or the single-drive mode can be selected using the switch 115. The user can select his/her desired mode setting according to the using conditions. Accordingly, the multifunction device 140 is user-friendly.

In the multi-reader/writer 101 of the fourth embodiment, the user can set the operating mode of the multi-reader/writer 101 to the multi-drive mode by selecting multi-drive mode with the S/M switch 115. However, similarly to the multifunction device 140 of the sixth embodiment, the multi-reader/writer 101 of the fourth embodiment may be initialized to the single drive mode (automatic selection mode) when the multi-reader/writer 101 is turned on by receiving a power supply (bus power) from the personal computer 136 even if the multi-drive mode has been selected with the S/M switch 115 and can be selectively switched to the multi-drive mode upon receiving a multi-R/W indicating command from the personal computer 136.

Seventh Embodiment

Next, a multifunction device 160 according to the seventh embodiment will be described with reference to FIGS. 25-29.

Figure 25:
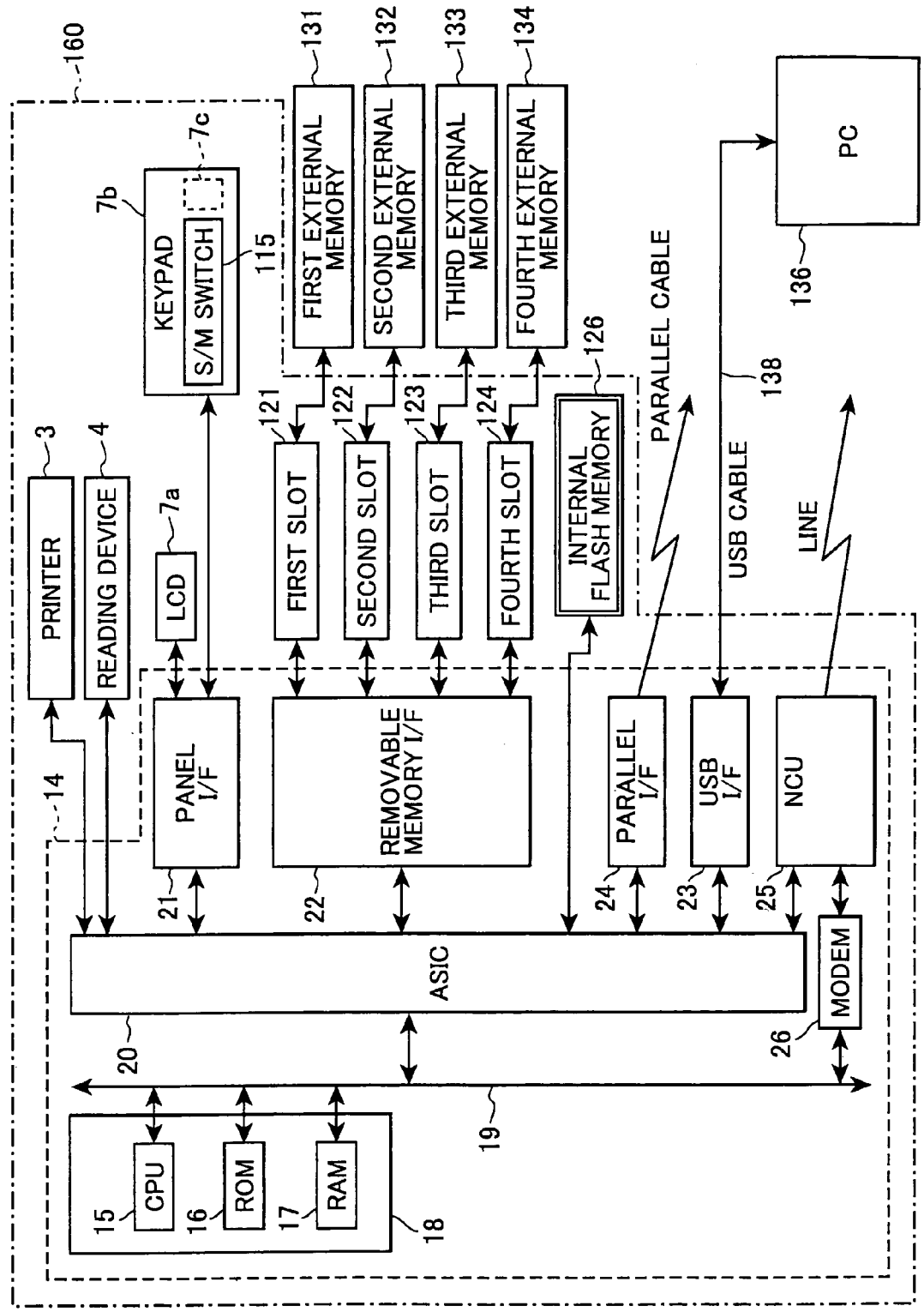
FIG. 25 is a block diagram showing the general construction of a multi-function device according to a seventh embodiment.

FIG. 25 shows the general structure of the multifunction device 160 according to the seventh embodiment. As shown in FIG. 25, the multifunction device 160 differs from the multifunction device 140 according to the sixth embodiment in that: the multifuction device 160 is provided with the internal flash memory 126 so that the personal computer 136 can read data from and write data to the internal flash memory 126; and the operating modes of the multifunction device 160 include a double-drive mode in addition to the single-drive mode and the multi-drive mode.

The remaining structure and operations are essentially identical to the multifunction device 140 of the sixth embodiment.

Further, the internal flash memory 126 of the present embodiment is identical to the internal flash memory 126 provided in the multi-reader/writer 101 according to the fourth embodiment (see FIG. 13). Accordingly, the following description of the seventh embodiment will focus on the differences from the embodiments described above.

First, the drive mode setting process performed in the multifunction device 160 will be described with reference to FIG. 26.

Figure 26:
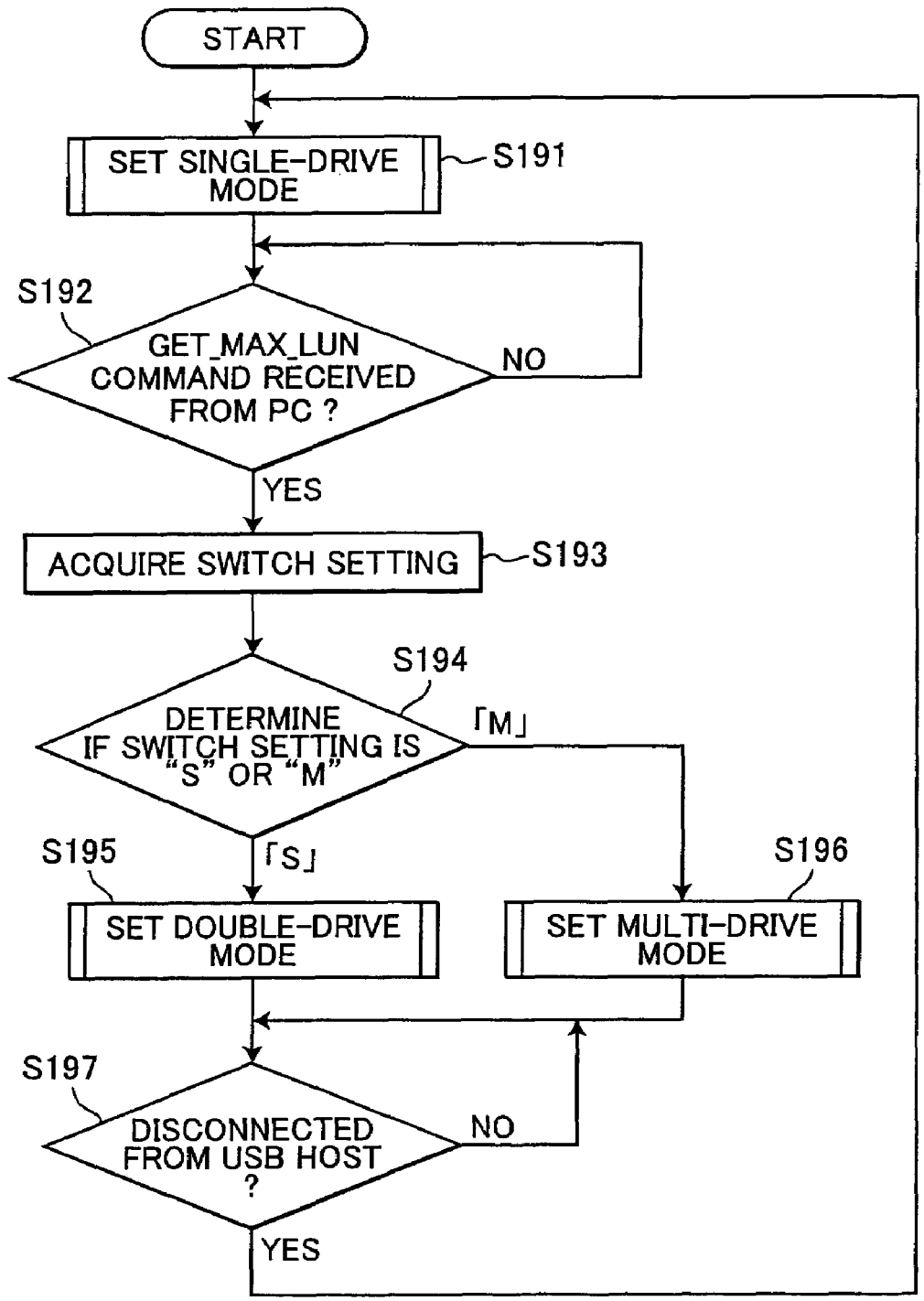
FIG. 26 is a flowchart showing a drive mode setting process according to the seventh embodiment.

In the drive mode setting process of FIG. 26, steps S191-S194, S196, and S197 are identical to steps S185-S188, S190, and S189 in the drive mode setting process of the sixth embodiment shown in FIG. 24. The only difference from the drive mode setting process of the sixth embodiment is the addition of a double-drive mode setting process in S195 of the seventh embodiment.

Hence, when the personal computer 136 has a newer or upper rank OS and the operating mode selected by the switch is the single-drive mode, the CPU 15 advances to S195 and modifies the mode setting from the initial single-drive mode to the double-drive mode.

In the double-drive mode, the personal computer 136 can access one of the slots 121-124 in which a medium has been inserted (if media have been inserted into a plurality of slots, the slot in which a medium has been first inserted) and the internal flash memory 126 individually.

Hence, in the present embodiment, the operating mode is set to the double-drive mode when the personal computer 136 is running a newer or upper rank OS, even when the switch 115 is set to the single-drive mode. Accordingly, the personal computer 136 can access both one of the slots and the internal flash memory 126.

Figure 28A:
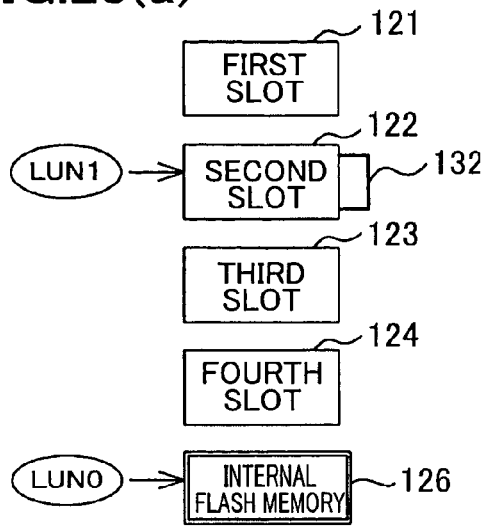
FIG. 28(a)–28(d) are explanatory diagrams illustrating examples of drive allocation (LUN allocation) in a double-drive mode according to the seventh embodiment.

During the double drive mode, as shown in FIGS. 28(a)-28(e), LUN0 is assigned to the internal flash memory 126, and LUN1 is assigned to either one of the slots 121-124. The manner how to assign LUN1 to the slots 121-124 is the same as the manner how to assign LUN0 to the slots 121-124 in the fourth embodiment (FIGS. 16(a)-16(d)). More specifically, as shown in FIG. 28(a), when a medium (second external memory 132) is inserted only in the second slot 122, and media (external memories corresponding to the respective slots) are not inserted in the first slot 121, third slot 123, or fourth slot 124, LUN0 is allocated to the second slot 122.

Figure 28B:
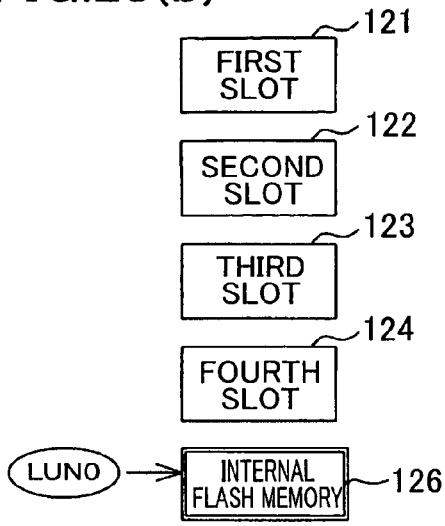

As shown in FIG. 28(b), LUN0 is assigned to the internal flash memory 126 when no media has been inserted into any of the slots. Accordingly, the personal computer 136 can access only the internal flash memory 126. At this time, LUN1 is assigned to no slot. When the personal computer 136 issues an access command to the LUN1, the multifunction device 160 reports the personal computer 136 that no media is inserted into the LUN1. When some medium is inserted into some slot, the CPU 15 assigns LUN1 to that slot. As a result, the personal computer 136 can access the internal flash memory 126 and the slot to which the LUN1 is assigned.

Figure 28C:
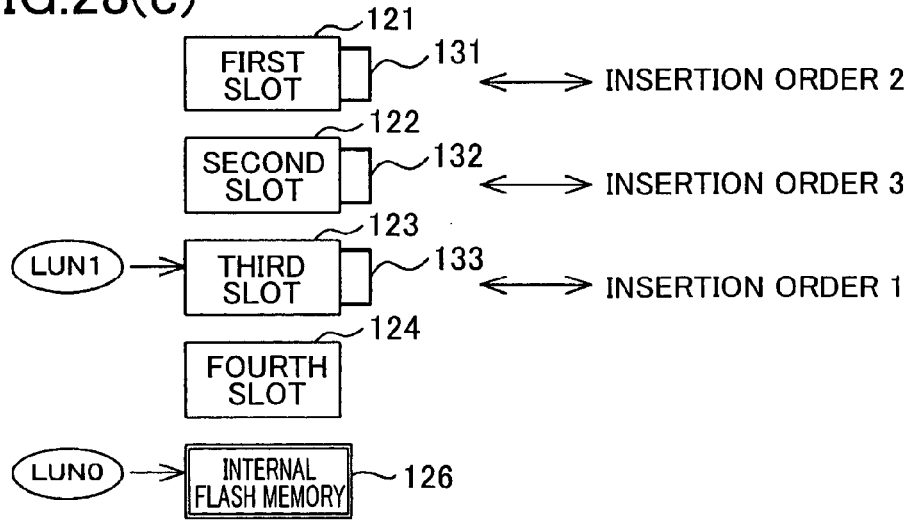

When media (external memories) are inserted in the third slot 123, first slot 121, and second slot 122, in that order, and all the media remain inserted, as shown in FIG. 28(c), LUN1 is allocated to the third slot 123 into which a medium has been inserted first, as the media first-insertion slot, and accessible by the personal computer 136.

Figure 28D:
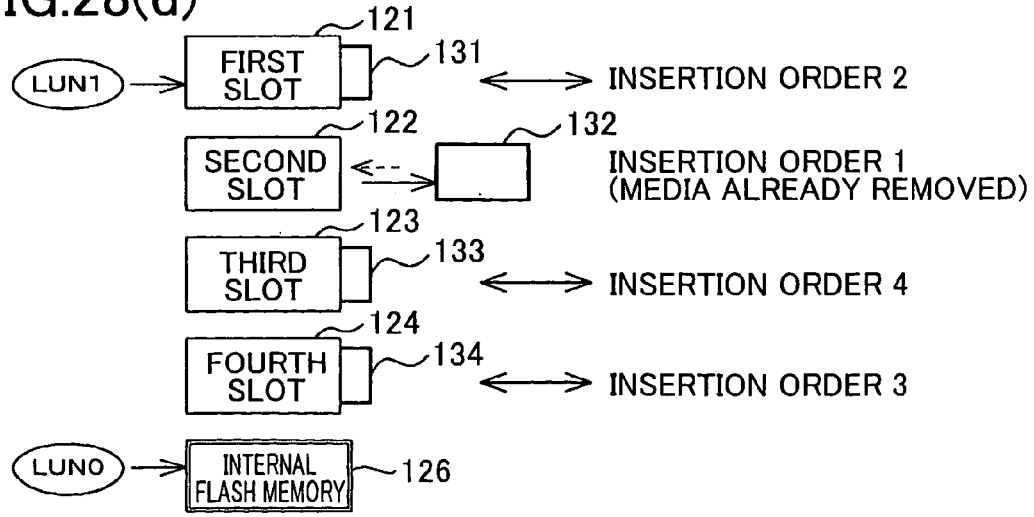

Assume that media have been inserted in the second slot 122, first slot 121, fourth slot 124, and third slot 123, in that order, but a medium (second external memory 132) has already been removed from the second slot 122, as shown in FIG. 28(d). In this case, among the first slot 121, third slot 123, and fourth slot 124 in which media remain, LUN1 is allocated to the first slot 121, into which a medium has been inserted first, as the media first-insertion slot, and accessible by the personal computer 136.

The order in which media are inserted in slots is determined based on interrupt signals that has been issued by the memory detection switches fitted to the slots, and is stored in RAM 17 of the microcomputer 18.

Figure 27:
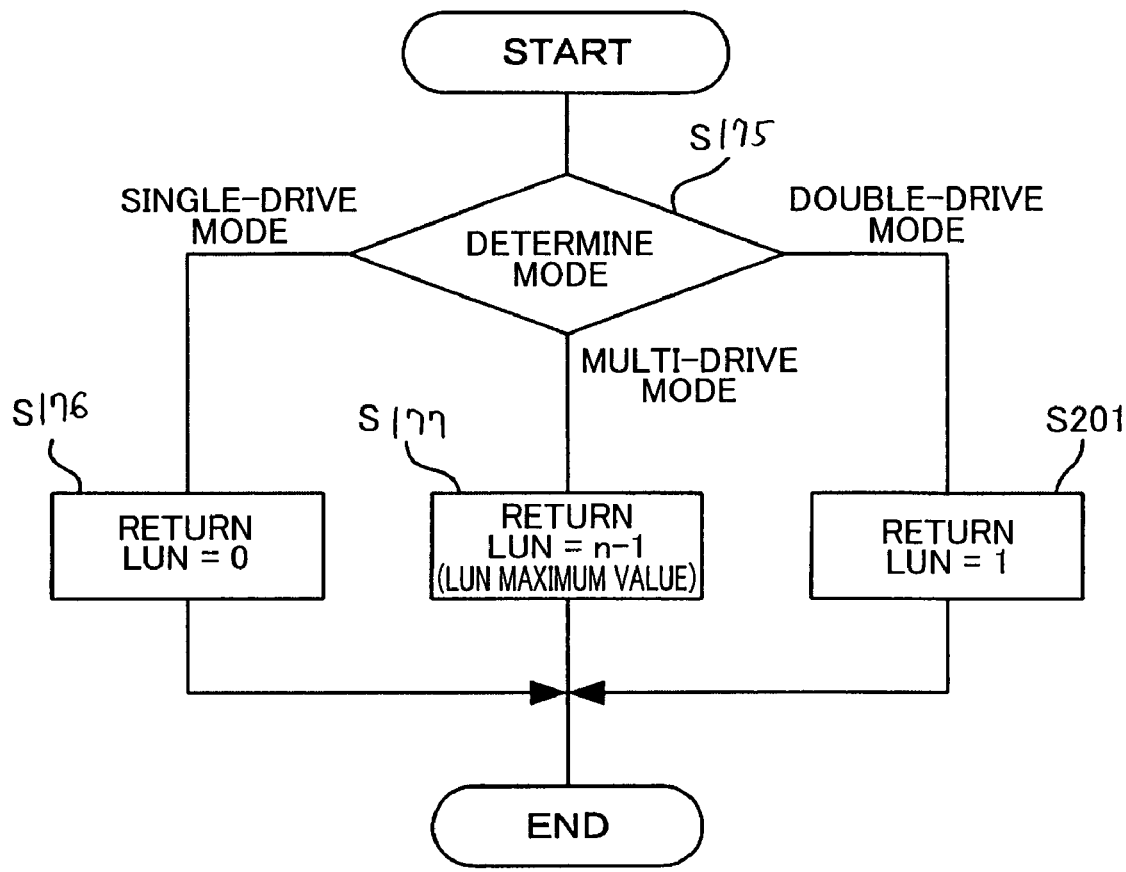
FIG. 27 is a flowchart showing a GET_MAX_LUN response process according to the seventh embodiment.

As shown in FIG. 27, the GET_MAX_LUN response process executed on the multifunction device 160 according to the seventh embodiment differs from the process according to the fourth embodiment shown in FIG. 15 in the addition of a step S201. In S201 the CPU 163 returns a "1" to the personal computer 136 as the LUN value when the operating mode has been set to the double-drive mode.

Figure 29:
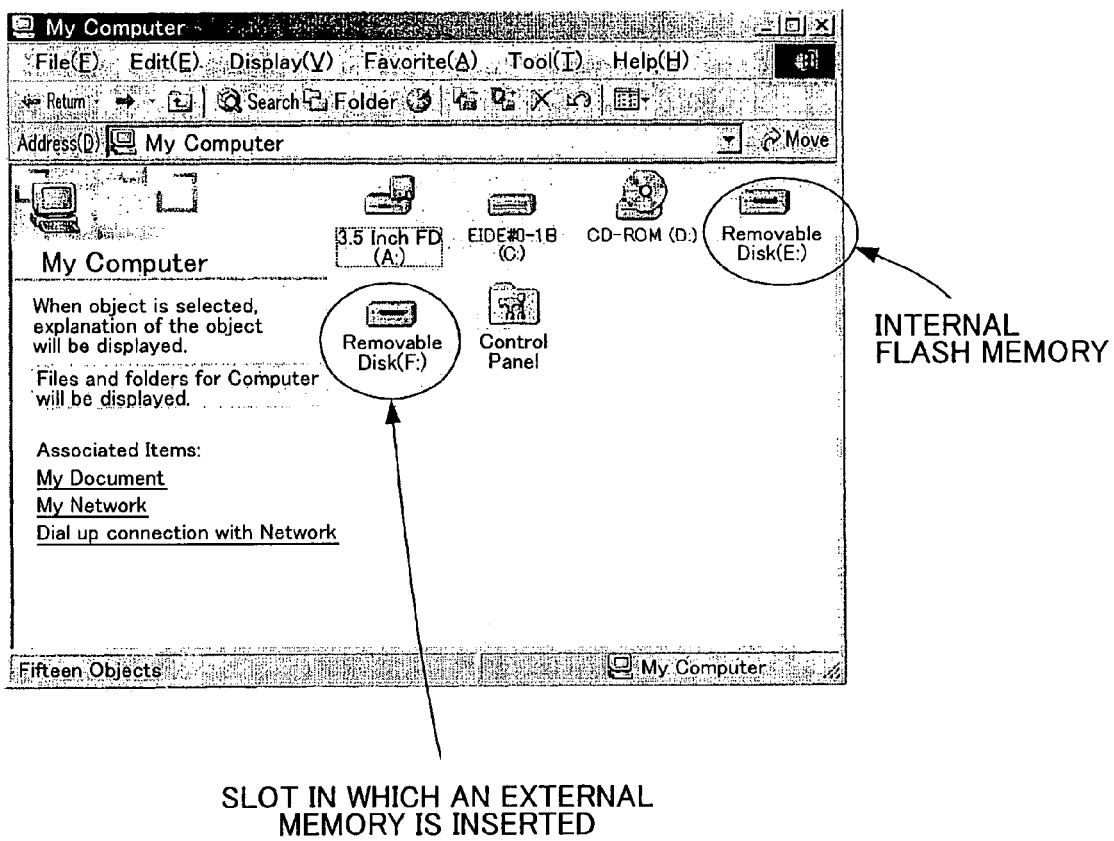
FIG. 29 is an explanatory diagram showing a PC window in which the PC recognizes a slot and an internal flash memory in the double-drive mode according to the seventh embodiment.

Through the process of S201, the personal computer 136 recognizes that the multifunction device 160 is provided with two accessible drives. Hence, when the drives are displayed in the "My Computer" window on the display of the personal computer 136, drives E and F appear as removable disks, as shown in FIG. 29. Here, drive E indicates the internal flash memory 126, while drive F is one of the slots.

It is noted that the ROM 16 is prestored with: a set of LUN layout data for the single drive mode; a set of LUN layout data for the multi-drive mode; and a set of LUN layout data for the double-drive mode. The layout data for the single drive mode indicates that the internal memory 127 and all of the first through fourth slots 121, 122, 123, and 124 correspond to LUN0. The layout data for the multi-drive mode indicates that the internal memory 126, the slot 121, the slot 122, the slot 123, and the slot 124 correspond to LUN0, LUN1, LUN2, LUN3, and LUN4 respectively. The layout data for the double drive mode indicates that the internal memory 127 corresponds to LUN0 and the first through fourth slots 121, 122, 123, and 124 correspond to LUN1.

When the multifunction device 160 is set to the single drive mode, the LUN layout data for the single drive mode is copied into the RAM 17. When no external memory 131-134 is inserted into the slot 121-124, the CPU 15 sets the LUN0 to the internal memory 126. The personal computer 136 can therefore access the internal memory 126 by transmitting a "Read external memory inserted in the slot to which LUN0 is allocated" command or a "Write to external memory inserted in the slot to which LUN0 is allocated" command. When one or more external memory 131-134 is inserted into the slot 121-124, the CPU 15 sets the LUN0 to a single slot, into which an external memory has been inserted first among the slots 121-124. The personal computer 136 can therefore access the one external memory 131, 132, 133, or 134 that has been inserted first in the corresponding slot 121, 122, 123, or 124, by indicating the LUN0, that is, by transmitting a "Read external memory inserted in the slot to which LUN0 is allocated" command or a "Write to external memory inserted in the slot to which LUN0 is allocated" command.

When the multifunction device 160 is set to the multi-drive mode, the LUN layout data for the multi-drive mode is copied into the RAM 17. By referring to the layout data in the RAM 17, the CPU 15 sets the LUN0 to the internal memory 126, and sets LUN1-LUN4 to the slots 121-124, respectively. The personal computer 136 can therefore access any of the external memories 131, 132, 133, and 134 that are inserted in the corresponding slots 121, 122, 123, and 124 and the internal memory 126 by indicating LUN0, LUN1, LUN2, or LUN3, that is, by transmitting a "Read external memory inserted in the slot to which LUNn (n=0, 1, 2, 3, or 4) is allocated" command or a "Write to external memory inserted in the slot to which LUNn (n=0, 1, 2, 3, or 4) is allocated" command.

When the multifunction device 160 is set to the double drive mode, the LUN layout data for the double drive mode is copied into the RAM 17. The CPU 15 sets the LUN0 to the internal memory 126 regardless of whether or not some external memory 131-134 is inserted into the slot 121-124. The personal computer 136 can therefore access the internal memory 126 by transmitting a "Read external memory inserted in the slot to which LUN0 is allocated" command or a "Write to external memory inserted in the slot to which LUN0 is allocated" command. When one or more external memory 131-134 is inserted into the slot 121-124, the CPU 15 sets the LUN1 to a single slot, into which an external memory has been inserted first among the slots 121-124. The personal computer 136 can therefore access the one external memory 131, 132, 133, or 134 that has been inserted first in the corresponding slot 121, 122, 123, or 124, by indicating the LUN1, that is, by transmitting a "Read external memory inserted in the slot to which LUN1 is allocated" command or a "Write to external memory inserted in the slot to which LUN1 is allocated" command.

As described above, the multifunction device 160 enables the personal computer 136 to access individually both the internal flash memory 126 and a single slot accommodating a medium when the personal computer 136 is running a newer or upper rank OS, even when the single-drive mode has been selected with the switch 115. Hence, the multifunction device 160 is effective when, for example, the user does not wish a drive to be assigned for all slots and the internal flash memory 126, but would like to assign drives at least for the internal flash memory 126 and one slot in which a medium has been inserted.

As in the sixth embodiment, the multifunction device 160 sets the operating mode to the single-drive mode regardless the switch setting when the personal computer 136 is running an older or lower rank OS, and sets the operating mode to the multi-drive mode when the personal computer 136 is running a newer or upper rank OS and if the multi-drive mode has been selected with the switch 115.

<Modifications of Fourth-Seventh Embodiments>

While the multi-reader/writers of the fourth and fifth embodiments described above are provided with the internal flash memory 126 in addition to the slots 121-124, these multi-reader/writers may be configured without the internal flash memory 126.

Further, the number of slots in the fourth through sixth embodiments may be set to just one. In other words, the devices according to the fourth through sixth embodiments may be configured with a single slot and the internal flash memory 126. In this case, the personal computer 136 running a newer or upper rank OS views the device as a multi-reader/writer provided with two drives.

Further, the devices according to the sixth and seventh embodiments may be configured to allow access to only a slot or the internal flash memory 126 when operating in the single-drive mode.

More specifically, similarly to the third embodiment, the keypad 7b may be provided with the access selection switch 7c as indicated by broken lines in FIGS. 24 and 25 for selecting "slot" or "internal flash memory".

The access selection switch 7c may be provided as an independent switch on the keypad 7b, or may be provided as one of the functions provided by a function key. A variety of functions are changed and displayed each time the function key is pressed.

In the same manner as shown in FIG. 10(*b*), when the setting of the access selection switch 7c selects "slot," the CPU 15 sets LUN0 to a slot in which a medium is first inserted, thereby enabling the personal computer 136 to access the slot. On the other hand, if the setting of the access selection switch 7c selects the "internal flash memory," then the CPU 15 sets LUN0 to the internal memory 126 regardless of whether or not some media are inserted into some slots, thereby enabling the personal computer 136 to access the internal flash memory 126.

Limiting the accessible drives in the single-drive mode is effective when the internal flash memory 126 is rarely used or, conversely, when the slots are rarely used, for example. This configuration is particularly effective when the internal flash memory 126 is used primarily, enabling the personal computer 136 to access the internal flash memory 126 while media remain being inserted in the slots.

The access selection switch 7c may be provided in the multi-reader/writer 101 of the fourth and fifth embodiments to perform the same operations described above. However, since the multi-reader/writer 101 of the fourth and fifth embodiments is not provided with the keypad 107b, the access selection switch 7c should be provided on the side surface of the multi-reader/writer 101, as is the S/M switch 115. Alternatively, the S/M switch 115 and the access switch 7c may be provided on the front surface together with the first through fourth slots 121-124, on the back surface together with the USB port 114, or at any other location, provided that the user can operate these switches.

Further, the functions and structure of the multi-reader/writer 101 according to the fourth and fifth embodiments described above may also be incorporated into the multifunction device described in the sixth embodiment, or in a printer, facsimile machine, or other type of device.

Conversely, the functions and constructions in the sixth and seventh embodiments for reading data from and writing data to the slots 121-124 and the internal flash memory 126 may be configured as a multi-slot reader/writer (standalone product), as described in the fourth embodiment.

In the fourth through seventh embodiments described above, if media has been inserted into a plurality of slots and the operating mode has been set to the single-drive mode, LUN0 is assigned to one slot in which a medium has inserted first. However, it is possible to assign LUN0 to a slot in which a medium has been inserted latest, rather than the first-inserted slot. Accordingly, the personal computer 136 can always access the slot in which a medium has been inserted last.

One example of a primary application for some media is the storage of image data taken by a digital camera. There is a strong demand and numerous applications involving an image-forming device for recording on a recording medium image data stored on media. For example, a printer or the like may be used to print image data on paper.

Therefore, by providing the multi-reader/writer 101 according to the fourth embodiment, for example, in an image-forming device, the personal computer 136 can access the multi-reader/writer 101 to read image data stored on a is medium and can issue a command to record (print or the like) images based on this image data, similar to the multifunction device 140. This configuration is even more effective because the user can set the desired slots (or the internal flash memory 126) that the personal computer 136 can access in the peripheral device.

Eighth Embodiment

Next, a multi-reader/writer 301 according to an eighth embodiment will be described with reference to FIG. 30(*a*) to FIG. 47.

The eighth embodiment focuses on differences in media usage frequency among individuals using the multi-reader/writer. When there are multiple users using a multi-reader/writer that supports, for example, an internal flash memory and CompactFlash, SmartMedia, Memory Stick, and Secure Digital (SD) memory cards for a total of five types of media, it is unlikely that many users will use all of the media with high frequency. For example, some users may only use CompactFlash cards and the internal flash memory with frequency and rarely use the other media types, while other users may have purchased the multi-reader/writer with the intention of only using CompactFlash cards in the immediate future, but having the option to use other media later on. Therefore, media access can be handled according to the user's preferences by allowing the personal computer to recognize frequently used media as independent drives and sharing a single drive letter among infrequently used media (or preventing the personal computer from recognizing this media).

Figure 30A:
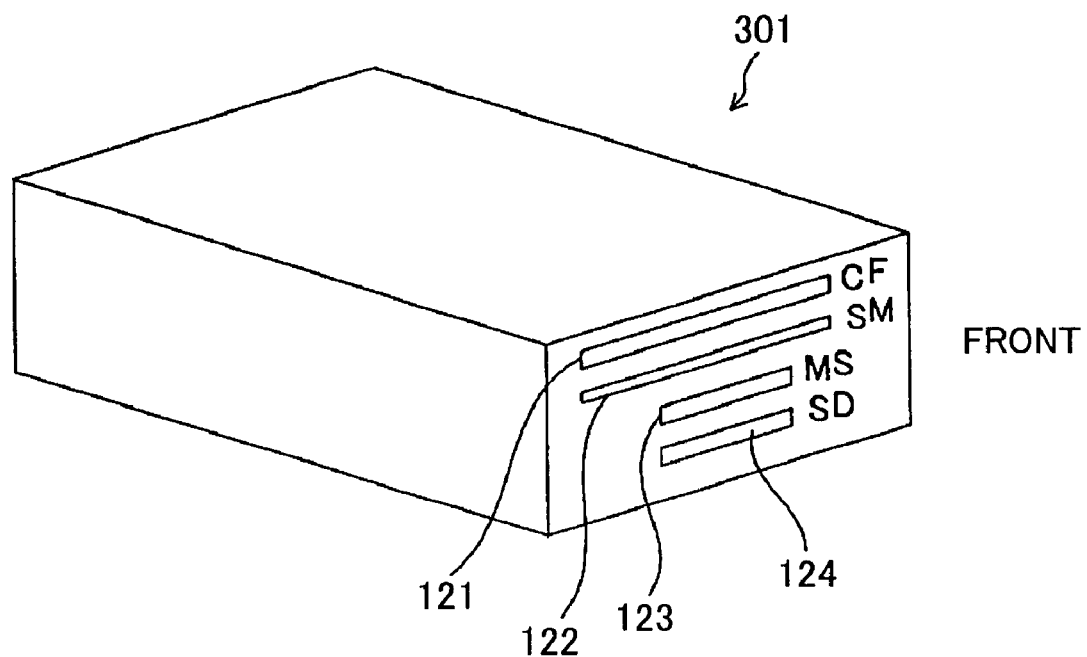
FIG. 30(a) is a perspective view showing a front side of a multi-reader/writer according to an eighth embodiment.
Figure 30B:
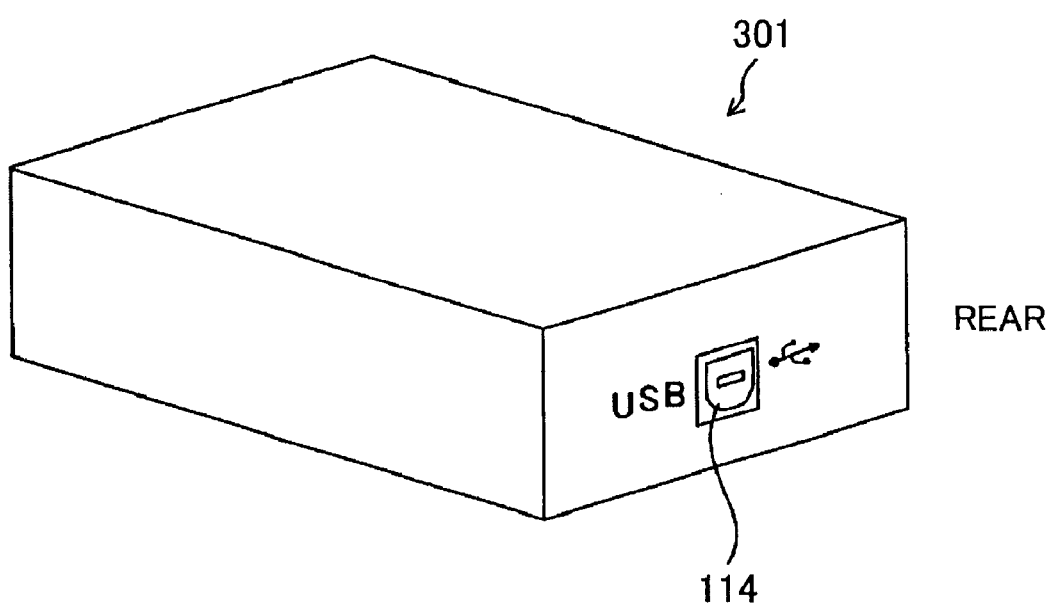
FIG. 30(b) is a perspective view showing a rear side of a multi-reader/writer according to the eighth embodiment.

The multi-reader/writer 301 of the eighth embodiment has an external configuration, shown in FIGS. 30(*a*) and 30(*b*), which is the same as that of the multi-reader/writer 101 of the fourth embodiment (FIGS. 12(*a*) and 12(*b*)) except that the multi-reader/writer 301 is provided with no S/M switch 115.

The multi-reader/writer 301 has an internal configuration, shown in FIG. 31, which is the same as that of the multi-reader/writer 101 of the fourth embodiment (FIG. 13) except that the multi-reader/writer 301 has a microcomputer 302 in place of the CPU 111, that the internal flash memory 126 has a flash ROM 126*a* (which will be described later), and that the multi-reader/writer 301 is provided with no S/M switch 115.

The multi-reader/writer 301 of the present embodiment is connectable to a personal computer 330 via the USB port 114 and a USB cable 326.

By connecting the multi-reader/writer 301 to the personal computer 330 using the USB cable 326, as shown in FIG. 31, a data processing system is constructed in the present embodiment for allowing the personal computer 330 to access the slots 121-124 and the internal flash memory 126 of the multi-reader/writer 301.

The microcomputer 302 has a CPU 303, a ROM 304, and a RAM 305. The CPU 303 executes various operations according to various programs stored in the ROM 304 and to various kinds of data stored in the internal flash memory 126. The ROM 304 is further stored with other programs to be executed by the CPU 303 to respond to various commands, such as USB commands and SCSI commands, transmitted from the personal computer 330.

The RAM 305 stores an order of detection signals received from the memory detection switches provided in each of the slots 121-124. The multi-reader/writer 301 operates by a power (bus power) that is supplied from the personal computer 330 via the USB cable 326.

Figure 37:
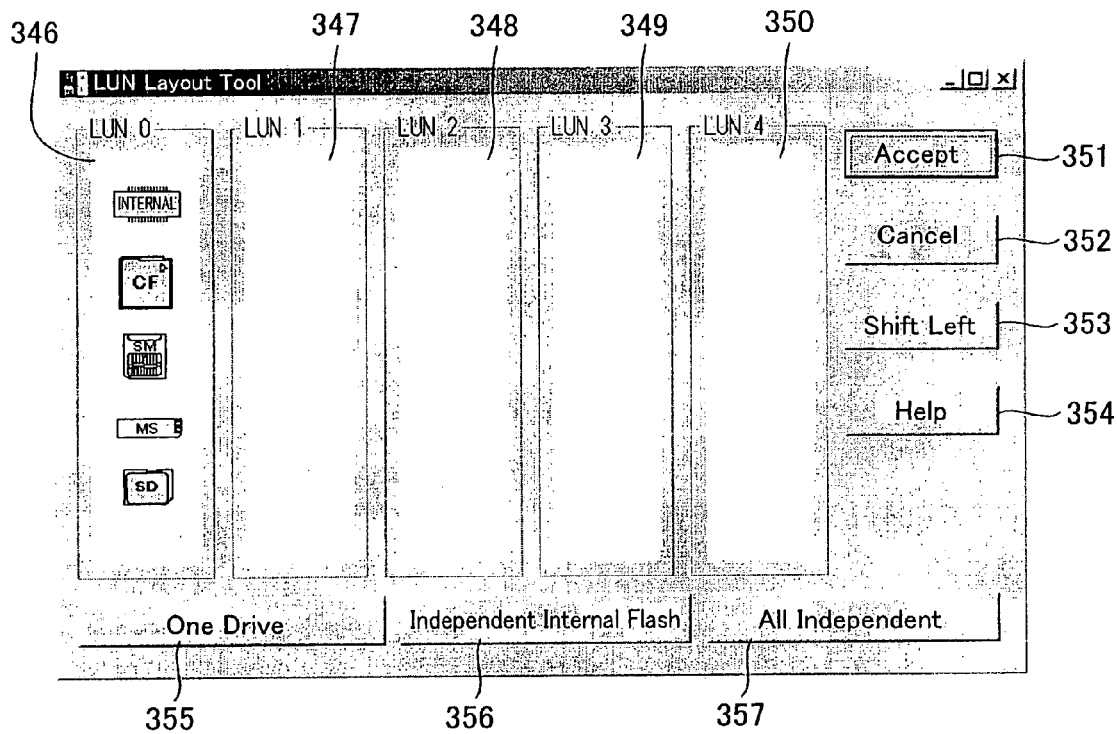
FIG. 37 is an explanatory diagram showing an example of a PC settings window for a LUN layout tool according to the eighth embodiment.

The multi-reader/writer 301 according to the eighth embodiment has a total of five types of media that can be accessed by the personal computer 330, including the external memories 131-134 and the internal flash memory 126. Five logical units are set for the five types of memory. More specifically, as shown in the example of FIG. 37, a first logical unit 346, a second logical unit 347, a third logical unit 348, a fourth logical unit 349, and a fifth logical unit 350 are set in the multi-reader/writer 301. The logical unit numbers (LUN) assigned to the logical units are LUN0 for the first logical unit 346, LUN1 for the second logical unit 347, LUN2 for the third logical unit 348, LUN3 for the fourth logical unit 349, and LUN4 for the fifth logical unit 350.

Figure 38:
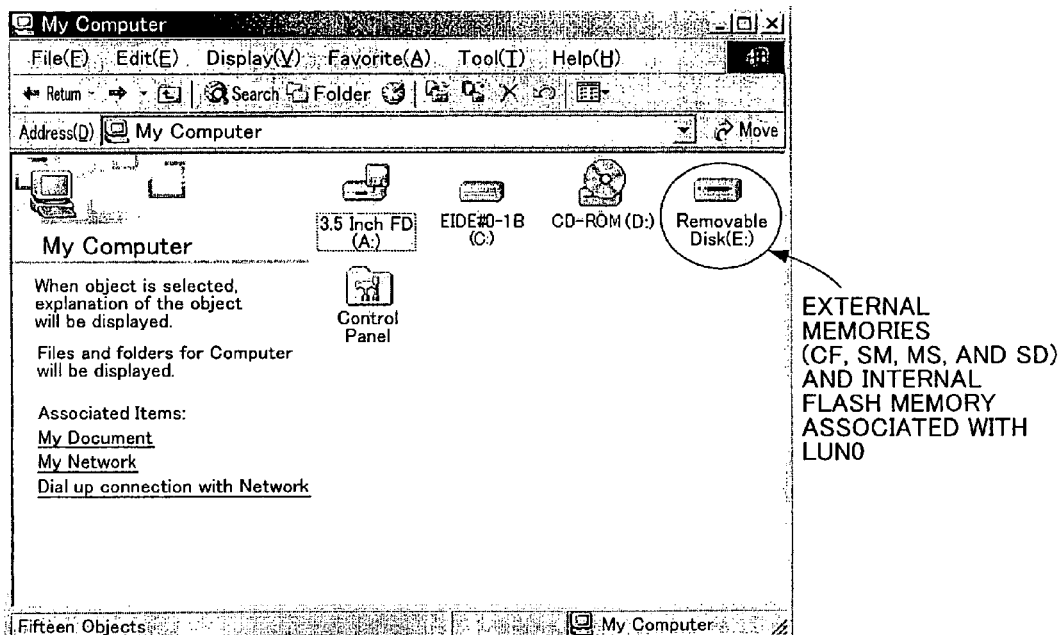
FIG. 38 is an explanatory diagram of an example of a PC window displaying drives recognized by the PC.

Each of the external memories 131-134 and the internal flash memory 126 is associated with one of the logical units 346-350. These associations can be changed by a LUN layout tool described later. However, in the present embodiment, the multi-reader/writer 301 is shipped with the settings shown in FIG. 37. Specifically, all media are associated with the first logical unit 346. With these settings, a single drive is set as the entire multi-reader/writer 301 in the personal computer 330. Accordingly, when the "My Computer" window is displayed on a display 339 of the personal computer 330 (see FIG. 32), only drive E is 5 displayed as a removable disk, as shown in the example of FIG. 38.

The associations described above are stored as parameters in a flash ROM 126*a* (see FIG. 31) used for storing settings in the multi-reader/writer 301. The flash ROM 126*a* is actually part of the internal flash memory 126 that has been allocated as a storage area.

The personal computer 330 is configured as a data processing device, such as that shown in FIG. 32. Specifically, the personal computer 330 includes a CPU 331, a ROM 332, a RAM 333, a hard disk drive 334, a floppy disk drive 335, a CD-ROM drive 336, a keyboard 337, a mouse 338, and the display 339, all of which are connected together via a bus 330*a*. The personal computer 330 is connected to the multi-reader/writer 301 via a USB interface 340 and the USB cable 326.

The CPU 331 executes processes according to: various programs in the ROM 332; an OS and various application programs installed on the hard disk drive 334; and the like. In particular, the CPU 331 of the present embodiment implements such functions as an OS kernel 341 and a file system 342 through the OS installed on the hard disk drive 334, as well as an LUN layout setting portion 343 through the LUN layout tool, which is an application program installed on the hard disk drive 334.

Using this LUN layout tool, the user can arbitrarily set associations (hereinafter referred to as an "LUN layout") of the external memories 131-134 and the internal flash memory 126 with respect to the logical units 346-350. In other words, the LUN layout tool can be used to set the desired number of drives in the multi-reader/writer 301 and the type of media for each drive.

Next, the operations of the data processing system according to the present embodiment involving, specifically, the exchange of data between the personal computer 330 and the multi-reader/writer 301 will be described with reference to FIG. 33.

Figure 33:
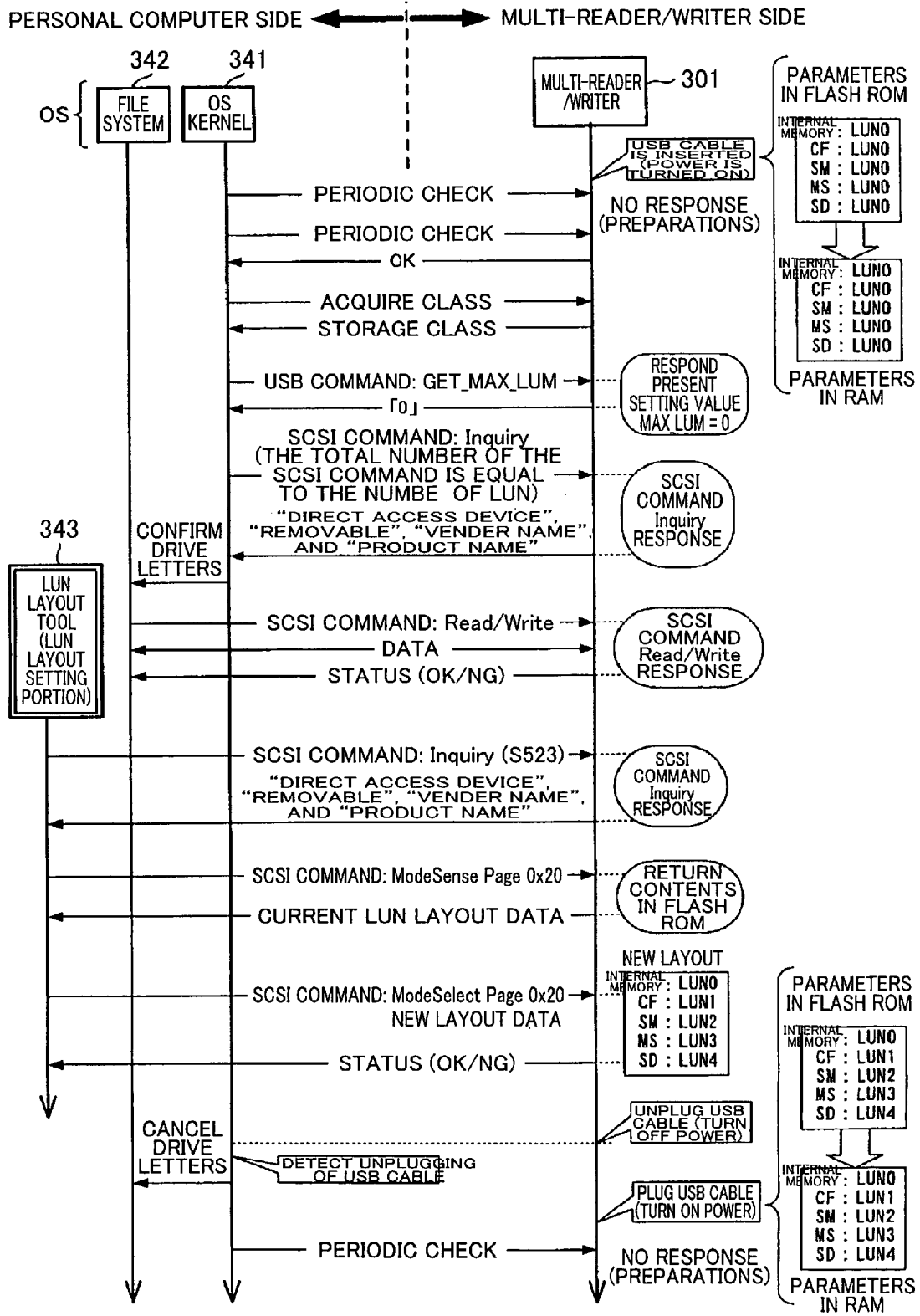
FIG. 33 is an explanatory diagram illustrating operations performed between the multi-reader/writer and the personal computer according to the eighth embodiment.

As shown in FIG. 33, the OS kernel 341 regularly checks for the existence of a connection with the multi-reader/writer 301. A connection is formed between the multi-reader/writer 301 and the personal computer 330 when the USB cable 326 is inserted into the personal computer 330. When bus power is supplied to the multi-reader/writer 301 from the personal computer 330, the multi-reader/writer 301 is powered on and begins operating.

Figure 34:
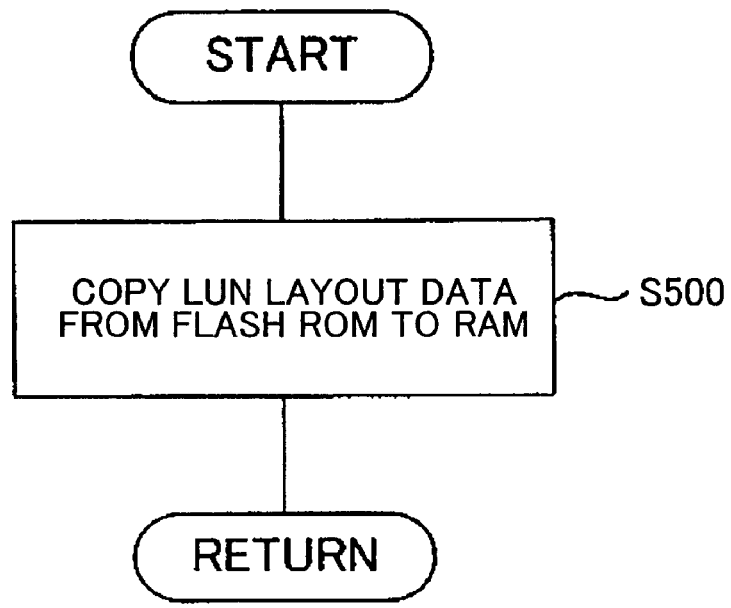
FIG. 34 is a flowchart showing an initialization process executed by the multi-reader/writer according to the eighth embodiment.

At the beginning of these operations, the multi-reader/writer 301 executes an initialization process shown in FIG. 34. The CPU 303 executes the initialization process according to a program in the ROM 304. After the multi-reader/writer 301 starts up, in S500 the CPU 303 copies parameters stored in the flash ROM 126a (LUN layout data) to the RAM 305, which is used for storing data during actual operations.

Through this process, the multi-reader/writer 301 operates based on the LUN layout data in the RAM 305 until the power to the multi-reader/writer 301 is shut off by unplugging the USB cable 326 or the like.

As described above, the LUN layout at shipping in the preferred embodiment has all media set to the first logical unit 346 (LUN0). Accordingly, when this LUN layout data is copied into the RAM 305, the multi-reader/writer 301 operates such that all media is set to LUN0.

Preparatory operations are completed after copying the LUN layout data to the RAM 305, and the CPU 303 issues a response to the periodic check from the personal computer 330 that preparations are complete.

When the personal computer 330 receives this response, the OS kernel 341 issues a request to the multi-reader/writer 301 for the device class. The multi-reader/writer 301 responds with "storage class." As a result, the personal computer 330 recognizes the multi-reader/writer 301 as a large-capacity storage device.

Figure 35:
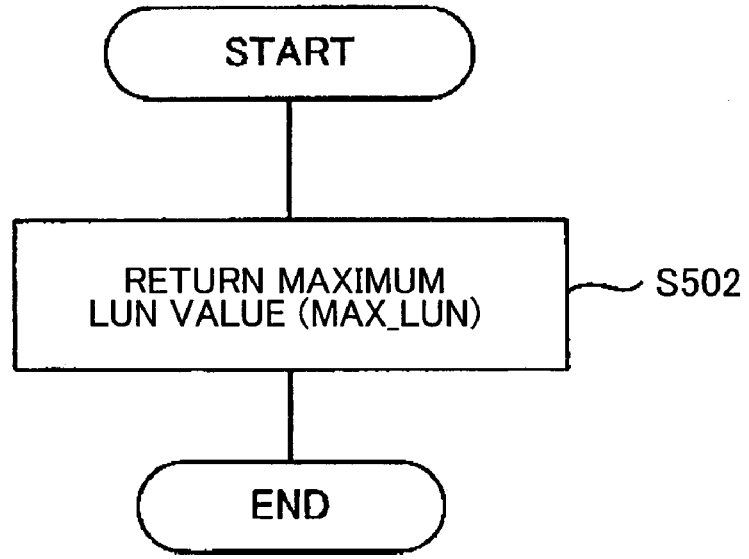
FIG. 35 is a flowchart showing a GET_MAX_LUN response process executed by the multi-reader/writer according to the eighth Embodiment.

Next, the OS kernel 341 transmits the USB command "GET_MAX_LUN" to the multi-reader/writer 301 asking for the maximum logical unit number, that is, the number of logical units to which media are associated. Upon receiving the GET_MAX_LUN command, the multi-reader/writer 301 executes a GET_MAX_LUN response process shown in FIG. 35. The CPU 303 executes this process according to a program in the ROM 304. After receiving the GET_MAX_LUN command, in S502 the CPU 303 returns the maximum logical unit number (MAX_LUN) to which media is associated. Since all media in the multi-reader/writer 301 has been set to the first logical unit 346 (LUN0), as shown in FIG. 37, the CPU 303 returns LUN=0 to the personal computer 330.

It is noted that the GET_MAX_LUN command is transmitted to the multi-reader/writer 301 from driver software installed on the personal computer 330 for supporting the multi-reader/writer 301 only when the OS of the personal computer 330 queries the driver software for the number of logical units in the multi-reader/writer 301 and when the driver software is a multi-support driver. In other words, the GET_MAX_LUN command asks for the total number of logical units provided in the multi-reader/writer 301. The command indicates that the personal computer 330 is provided with a multi-support driver.

If the driver software installed on the personal computer 330 is not a multi-support driver, but only supports a single-slot reader/writer, the driver will not transmit a GET_MAX_LUN command when the OS of the personal computer 330 requests the total number of logical units. This driver will issue a response to the OS that the total number of logical units is "1".

Therefore, if the personal computer 330 runs an older or lower rank OS in which a multi-support driver is not installed as standard, the GET_MAX_LUN command will not be transmitted to the multi-reader/writer 301. In other words, the GET_MAX_LUN response process of FIG. 35 will not be executed.

However, if the personal computer 330 runs a newer or upper rank OS in which the multi-support driver is installed as standard, then the GET_MAX_LUN command will be transmitted to the multi-reader/writer 301. Therefore, upon receiving the GET_MAX_LUN command, the multi-reader/writer 301 executes the GET_MAX_LUN response process of FIG. 35 as an interrupt process.

After the OS kernel 341 receives a response to the USB command "GET_MAX_LUN," the OS kernel 341 transmits a SCSI command "Inquiry" to the multi-reader/writer 301. "Inquiry" is a command at the SCSI level asks the device type for each logical unit to which media has been associated (only the first logical unit 346 in the present example).

Upon receiving this Inquiry command, the multi-reader/writer 301 executes a SCSI command response process (i) shown in FIG. 36(a). The CPU 303 executes this process according to a program in the ROM 304. After receiving the Inquiry command, in S504 the CPU 303 returns to the personal computer 330 prescribed data indicating that the device is a removable disk. More specifically, the CPU 303 returns data indicating that the device is a direct access device and is removable, and also returns the manufacturer's name and the product name (product name and LUN number). The CPU 303 returns this data for each LUN to which media has been associated.

After receiving this reply, the OS kernel 341 confirms the drive letters with respect to the file system 342, thereby enabling data reading and writing between the file system 342 and the multi-reader/writer 301. More specifically, the multi-reader/writer 301 will transmit data and status in response to a SCSI command "Read/Write" transmitted from the file system 342.

In this example, "E" is assigned as the drive letter associated with the multi-reader/writer 301, as shown in FIG. 38. All media are then associated with the first logical unit 346, which is the logical unit corresponding to drive E. Accordingly, in the present embodiment, when only one of the external memories 131-134 is inserted in the corresponding slot, the slot in which the external memory is inserted is accessed as drive E. When two or more of the external memories 131-134 are inserted in their corresponding slots, the medium that has been inserted first can be accessed. When none of the external memories are inserted in their slots, the internal flash memory 126 can be accessed.

After the drive letter is confirmed, the multi-reader/writer 301 can be used normally with no further change. However, the user can change the current LUN layout by starting the LUN layout tool, which is installed on the hard disk drive 334 of the personal computer 330. When the LUN layout tool is started, the SCSI command "Inquiry" is transmitted to the multi-reader/writer 301, as shown in FIG. 33. This is the same as the above-described SCSI command "Inquiry" that is transmitted by the OS kernel 341. In the same manner as described above, the multi-reader/writer 301 executes the SCSI command response process (i) shown in FIG. 36(a) upon receiving this command. In other words, the LUN layout tool itself collects data concerning the multi-reader/writer 301:

After receiving a response to the SCSI command "Inquiry," the LUN layout tool acquires the current LUN layout by transmitting a SCSI command "Mode Sense Page 0x20 to the multi-reader/writer 301. Upon receiving this command, the multi-reader/writer 301 executes a SCSI command response process (ii) shown in FIG. 36(b). The CPU 303 executes this process according to a program in the ROM 304. After receiving the "Mode Sense Page 0x20" command, in S506 the CPU 303 transmits the LUN layout data stored in the flash ROM 126a to the personal computer 330.

The personal computer 330 displays a LUN layout settings window showing the current LUN layout in the display 339. In the present example, the settings shown in the window of FIG. 37 are displayed.

In addition to displaying the logical units 346-350, the LUN layout settings window includes an Accept button 351, a Cancel button 352, a Shift Left button 353, a Help button 354, and various automatic setting buttons 355-357.

In this window, the user can move each medium to any desired logical unit 346-350 by dragging and dropping an icon representing the internal flash memory 126 or the external memories 131-134 using the mouse 338, for example. Hence, the user can arrange the icons in any desired layout. In the present embodiment, three layouts have already been recorded. The user can set these layouts automatically by clicking on one of the automatic setting buttons 355-357.

Figure 39:
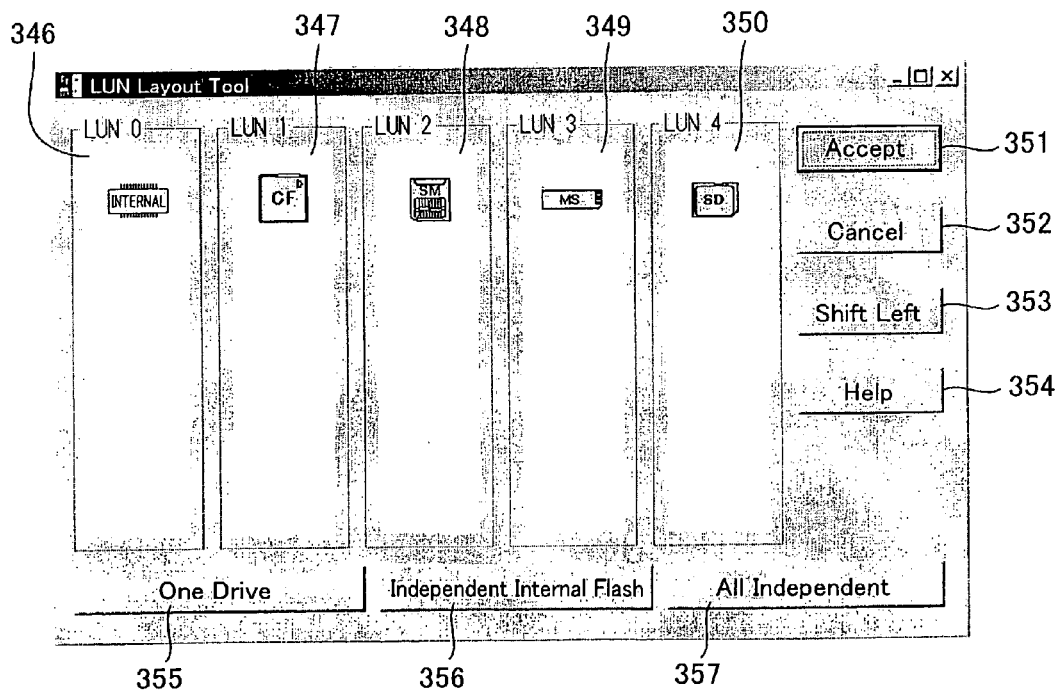
FIG. 39 is an explanatory diagram showing another example of the PC settings window for the LUN layout tool.
Figure 41A:
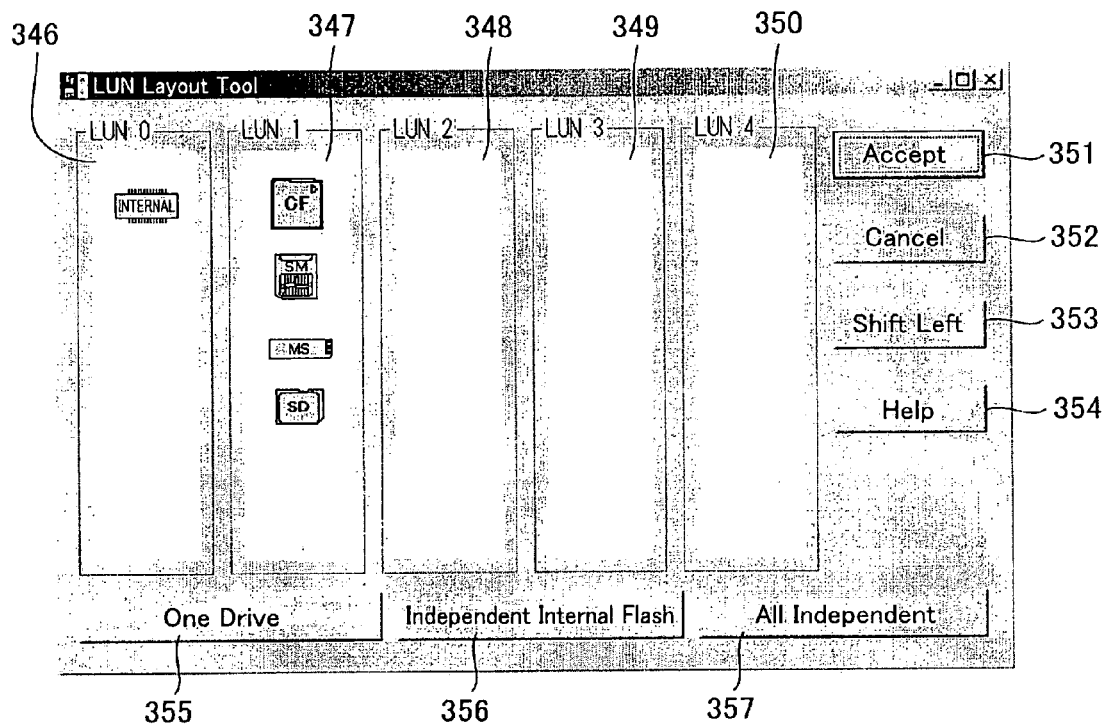
FIG. 41(a) is an explanatory diagram showing another example of the PC settings windows for the LUN layout tool.
Figure 41B:
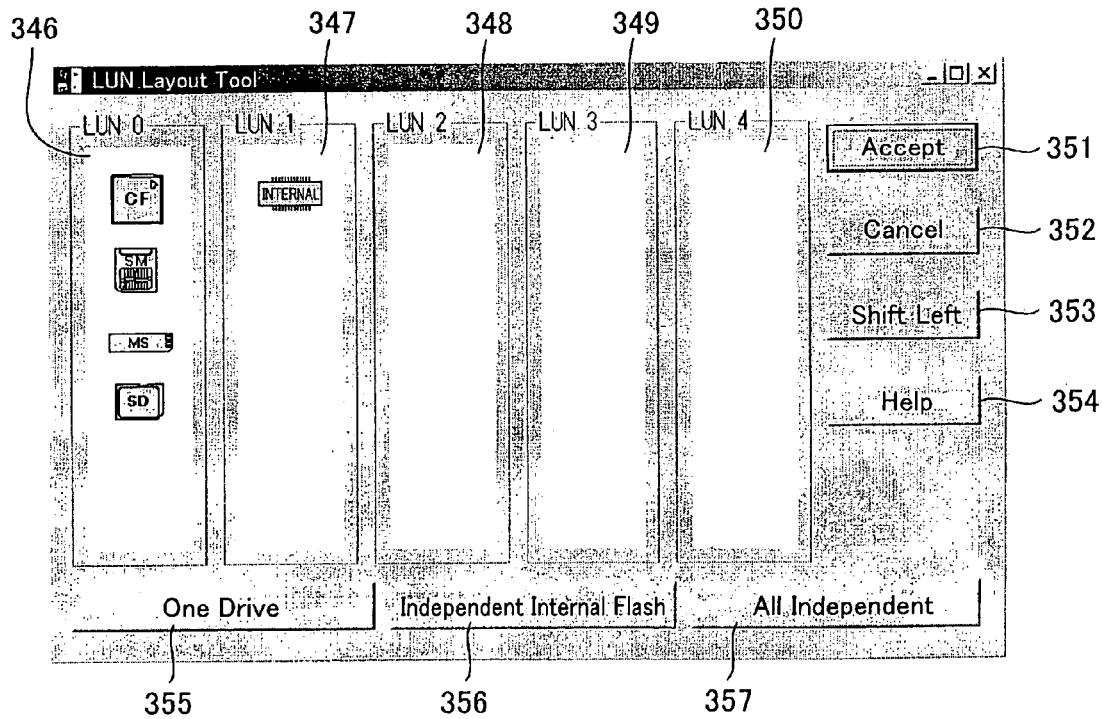
FIG. 41(b) is an explanatory diagram showing another example of the PC settings windows for the LUN layout tool.

More specifically, by clicking the Auto-switch with One Drive button 355, all icons are automatically arranged under the first logical unit 346, as shown in FIG. 37. Further, by clicking the Independent Internal Flash button 356, the icon for the internal flash memory 126 is automatically placed under the first logical unit 346, and the remaining icons are automatically arranged under the second logical unit 347, as shown in FIG. 41(*a*). Further, by clicking the All Independent button 357, each icon is automatically placed under one of the logical units 346-350, as shown in FIG. 39.

However, the user is still free to modify the layout after clicking on one of the automatic setting buttons 355-357 until the user clicks the Accept button 351. Accordingly, the user can set a desired layout by modifying only a portion of a fixed layout, for example.

By clicking on the Help button 354, a description of using the LUN layout tool and the like are displayed. If an LUN number without an icon exists to the left (the direction toward smaller LUN numbers) of an LUN number that has an icon after the user has arranged the icons in desired positions, icons to the right of the LUN number with no icon can be automatically shifted to the left by clicking the Shift Left button 353 so there are no spaces on the left. A space on the right (toward the larger LUN numbers) is not a problem. For example, all LUN numbers to the right of the first logical unit 346 are empty in the case of FIG. 37. Further, if the user clicks on the cancel button 352, the LUN layout tool is closed without modifying any settings, regardless of what settings the user had made.

If the user clicks the Accept button 351, the current LUN layout is set. However, if the Accept button 351 is clicked when an LUN number without an icon exists to the left of an LUN number with an icon, then the icons are automatically shifted left to fill the space, and the resulting LUN layout is set. In other words, clicking the Accept button 351 automatically shifts icons to the left when a space exists, while the user can use the Shift Left button 353 described above to view the layout before accepting.

After the user clicks the Accept button 351 to set the LUN layout, the LUN layout tool transmits the SCSI command "Mode Select Page 0x20" and the new LUN layout data. Upon receiving this data, the multi-reader/writer 301 executes a SCSI command response process (iii) shown in FIG. 36(*c*). The CPU 303 executes this process according to a program in the ROM 304. After receiving the "Mode Select Page 0x20" command, in S508 the CPU 303 writes the received LUN layout data to the flash ROM 126*a*. In other words, the existing LUN layout data is overwritten with the received LUN layout data.

Through this process, the LUN layout setting is completed with the LUN layout tool but the new setting (the new LUN layout data written to the flash ROM 126*a*) does not become effective immediately. This new setting becomes effective when the multi-reader/writer 301 is restarted by unplugging and inserting the USB cable 326, for example. In other words, when the multi-reader/writer 301 is restarted and executes the initialization process of FIG. 34 described above, the CPU 303 copies the updated LUN layout data to the RAM 305. The updated LUN layout data becomes effective only at this time.

Although not shown in FIG. 33, when the multi-reader/writer 301 again receives the USB command "GET_MAX_LUN" from the personal computer 330 thereafter, the multi-reader/writer 301 will execute the GET_MAX_LUN response process shown in FIG. 35 again to return, to the personal computer 330, the maximum logical unit number (MAX_LUN) in the updated LUN layout.

Figure 40:
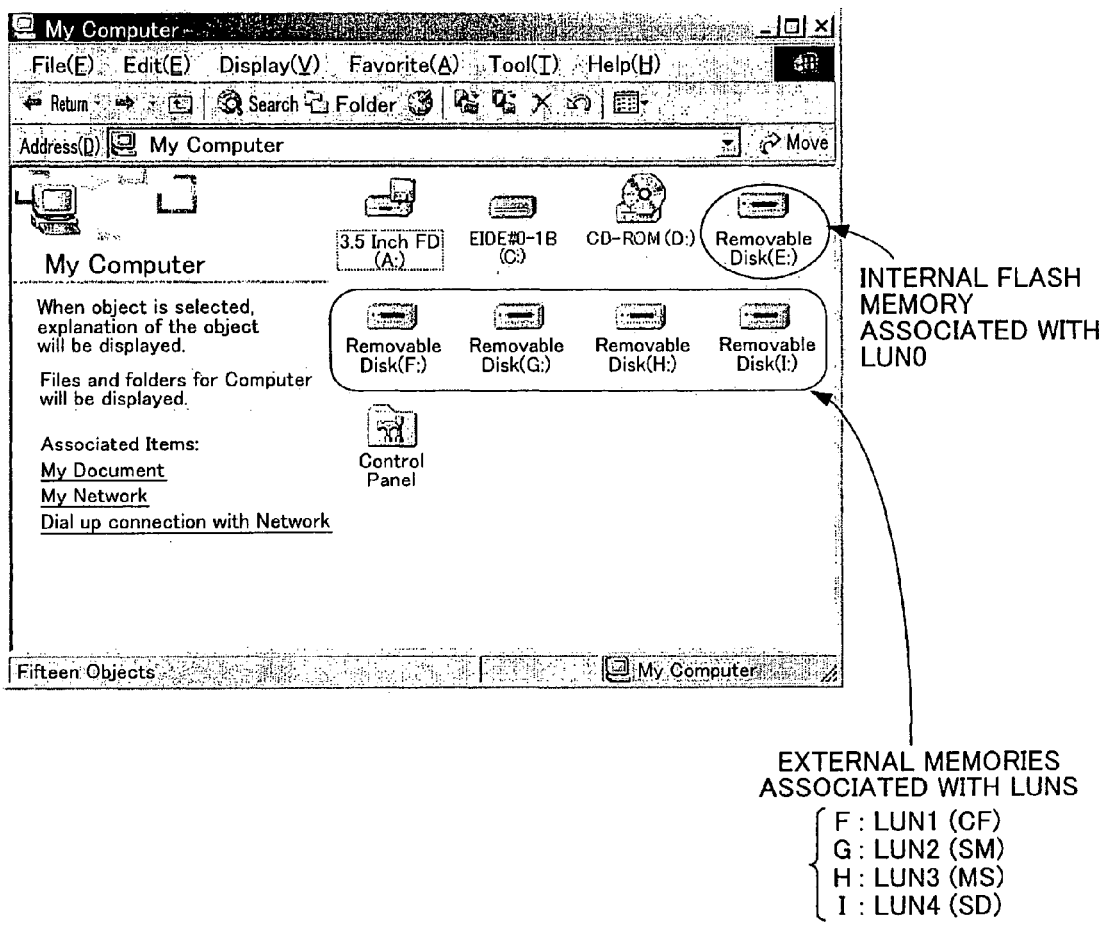
FIG. 40 is an explanatory diagram showing another example of the PC window displaying drives recognized by the PC.

If the layout has been updated with the LUN layout tool to that shown in FIG. 39, for example, then drives E, F, G, H, and I are displayed as removable disks in the "My Computer" window in the display 339, as shown in FIG. 40. Since drive letters are assigned to LUN numbers in order from smallest to largest, drive E is assigned to the internal flash memory 126 associated with the first logical unit 346 (LUN0). It is noted that when the multi-reader/writer 303 receives the GET_MAX_LUN command from the personal computer 330, the CPU 303 returns LUN=4 to the personal computer 330.

Figure 42:
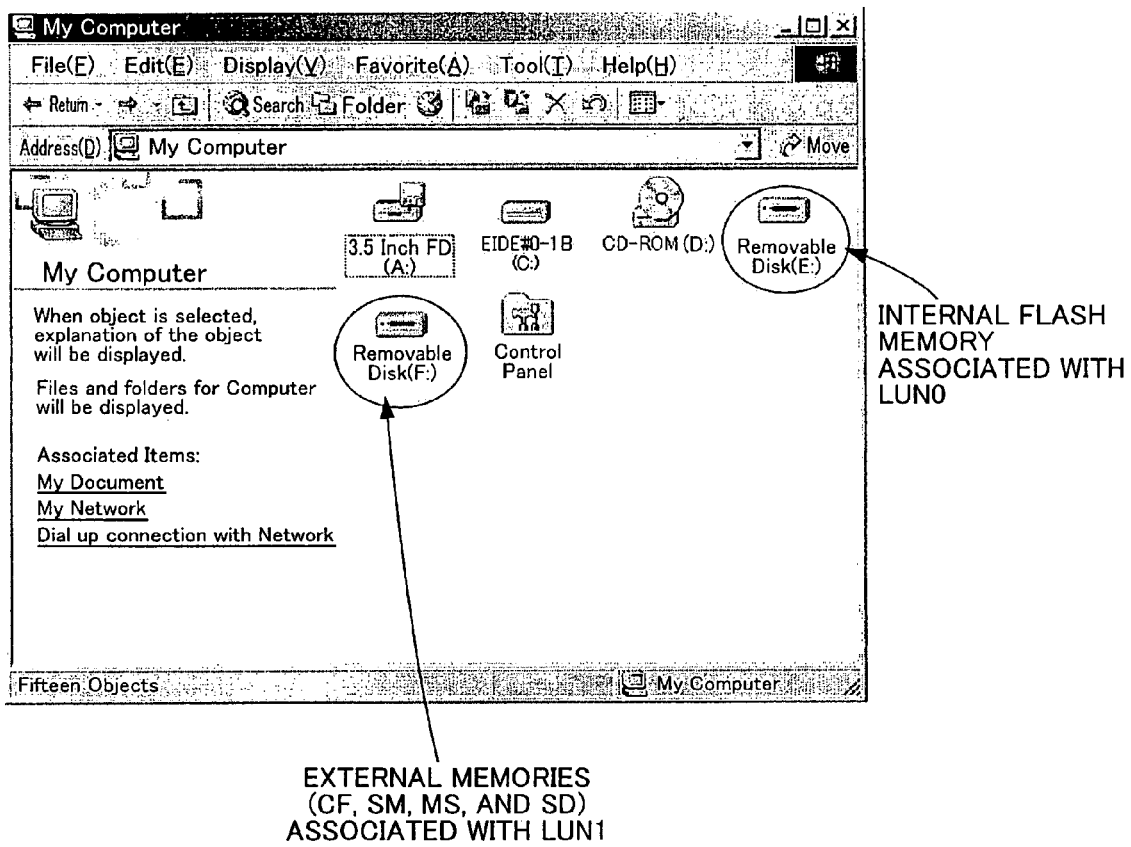
FIG. 42 is an explanatory diagram of another example of the PC window displaying drives recognized by the PC.

If the layout has been modified to that shown in FIG. 41(*a*), then drives E and F are displayed as removable disks in the "My Computer" window on the display 339, as shown in FIG. 42. If the layout has been set to the example shown in FIG. 41(*b*), then the "My Computer" window displayed on the display 339 is the same as the example of FIG. 41(*a*) shown in FIG. 42. However, the media corresponding to each drive in this case is opposite to that in the case of FIG. 41 (*a*), with the external memories 131-134 associated with drive E and the internal flash memory 126 associated with drive F.

It is noted that when the layout is modified as shown in each of FIG. 41(*a*) or FIG. 41(*b*), when the multi-reader/writer 303 receives the GET_MAX_LUN command from the personal computer 330, the CPU 303 returns LUN=1 to the personal computer 330.

Figure 43:
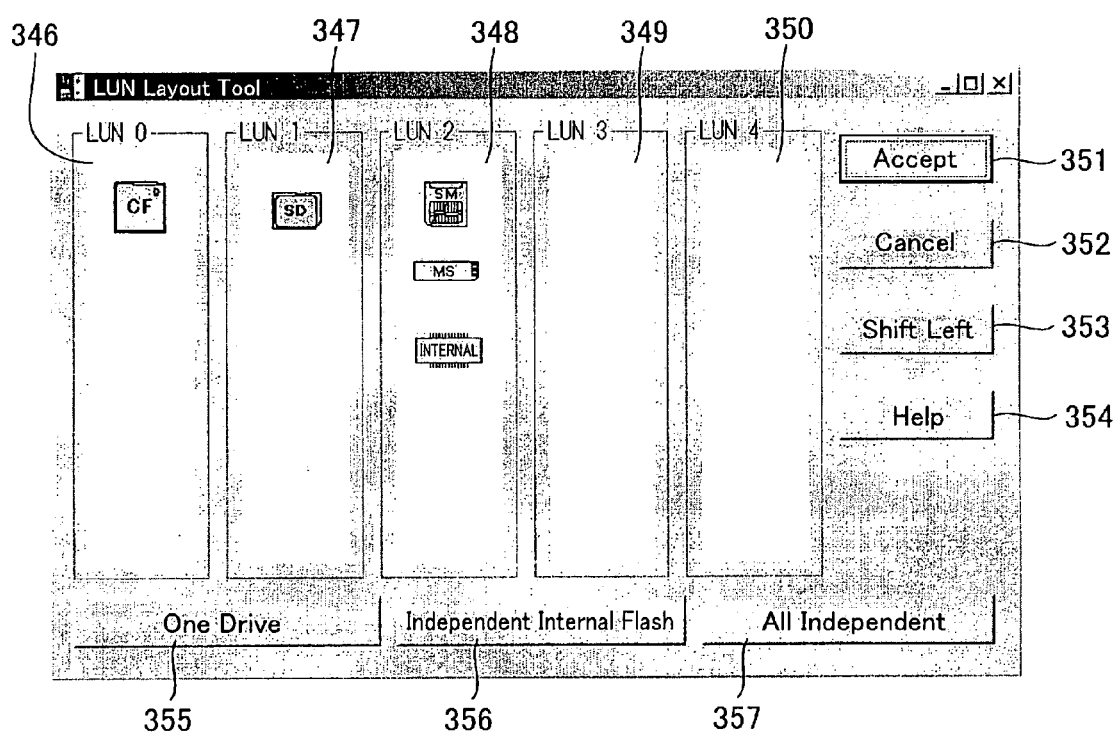
FIG. 43 is an explanatory diagram showing another example of the PC settings windows for the LUN layout tool.
Figure 44:
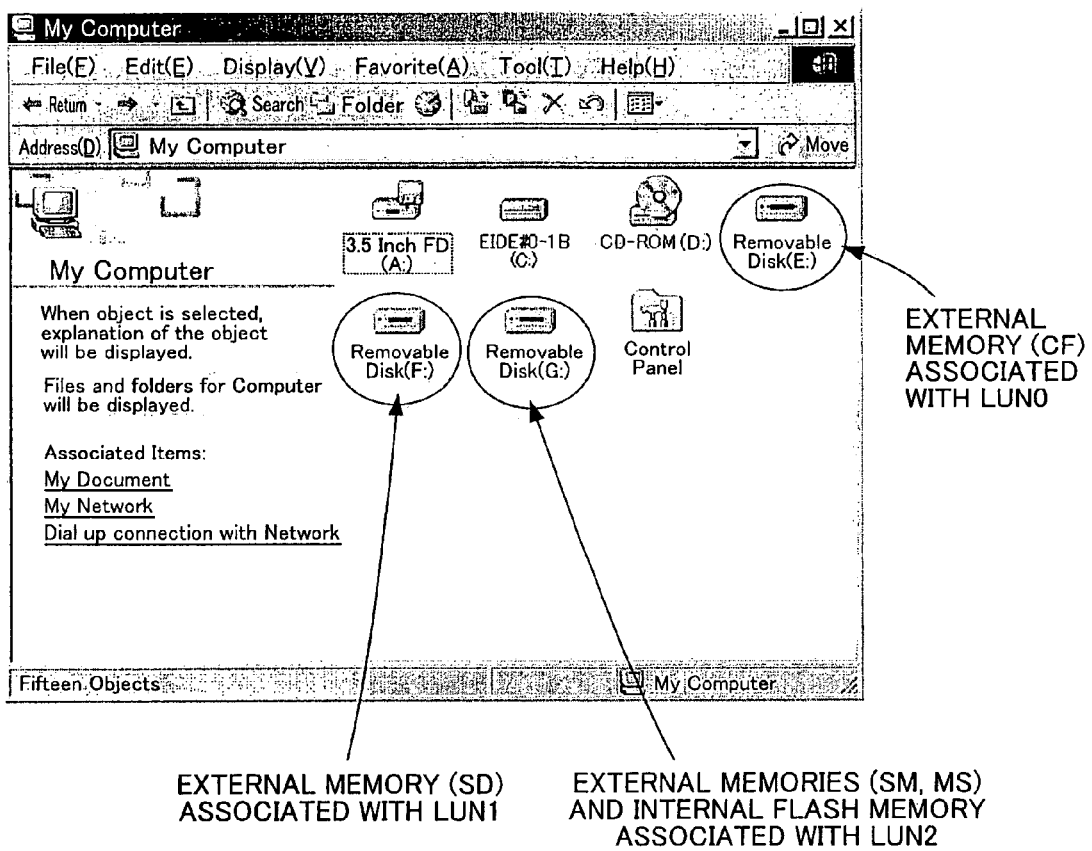
FIG. 44 is an explanatory diagram of another example of the PC window displaying drives recognized by the PC.

Further, if the layout is set to that shown in FIG. 43, then drives E, F, and G are displayed as removable disks in the "My Computers" window on the display 339, as shown in FIG. 44.

Next, the process executed by the LUN layout setting portion 343 of the CPU 331 when starting the LUN layout tool will be described with reference to FIGS. 45-47.

Figure 45:
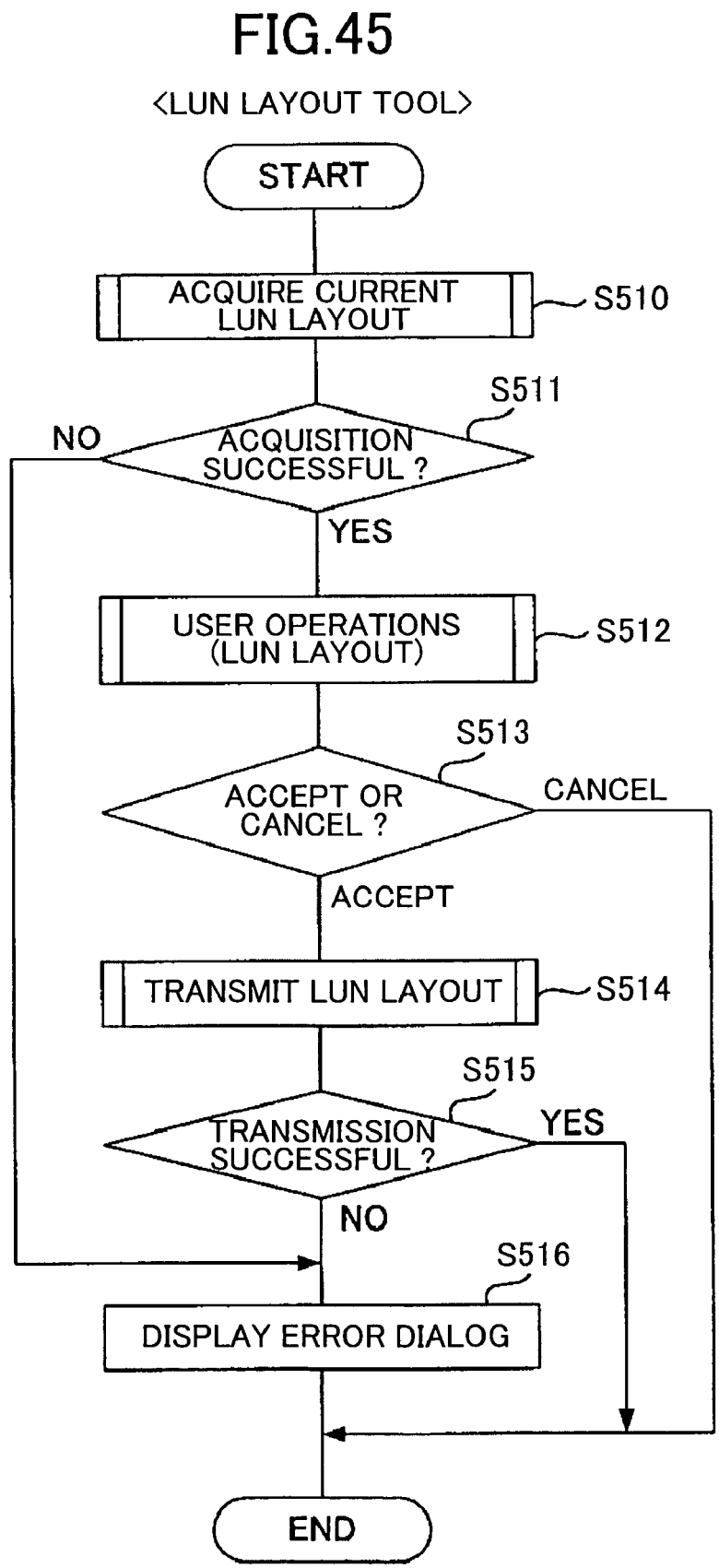
FIG. 45 is a flowchart showing a LUN layout setting process according to the eighth embodiment.

FIG. 45 shows the LUN layout setting process that begins when the LUN layout tool is started.

At the beginning of the process in S510, the CPU 331 acquires the current LUN layout. This process is shown in detail in FIG. 46.

Figure 46:
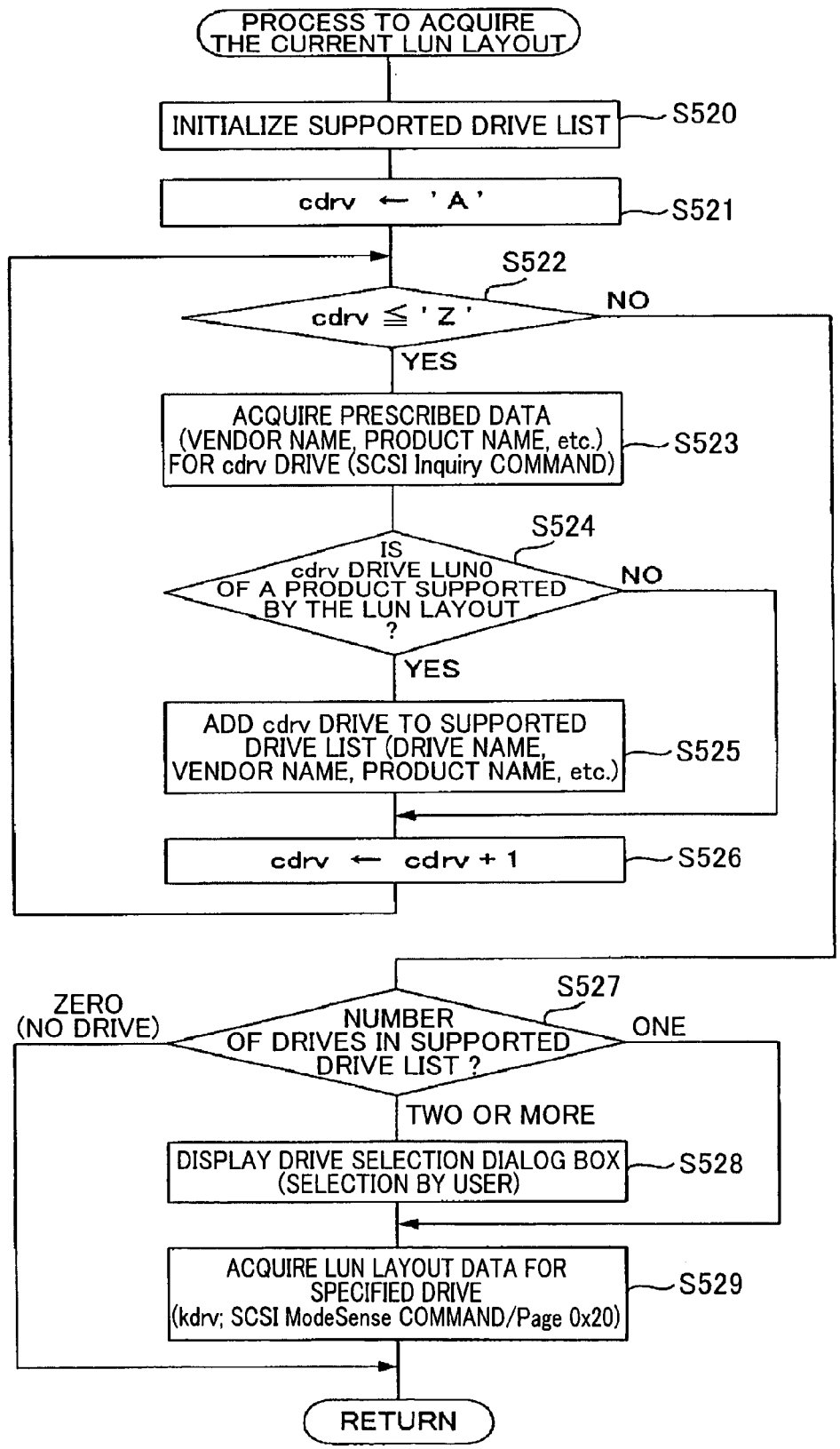
FIG. 46 is a flowchart showing the steps in a process to acquire the current LUN layout in the LUN layout settings process in FIG. 45.

In S520 of FIG. 46, the CPU 331 initializes a supported drive list. The supported drive list includes drives of products supported by the LUN layout tool.

In S521 the CPU 331 sets a variable cdrv to drive A.

In S522 the CPU 331 determines whether the variable cdrv is less than or equal to drive Z (in other words, within the range A-Z).

If the variable cdrv is within the range A-Z, then in S523 the CPU 331 transmits a SCSI command "Inquiry" to acquire prescribed data (vendor name, product name, etc.) related to the cdrv drive (initially drive A).

Figure 36:
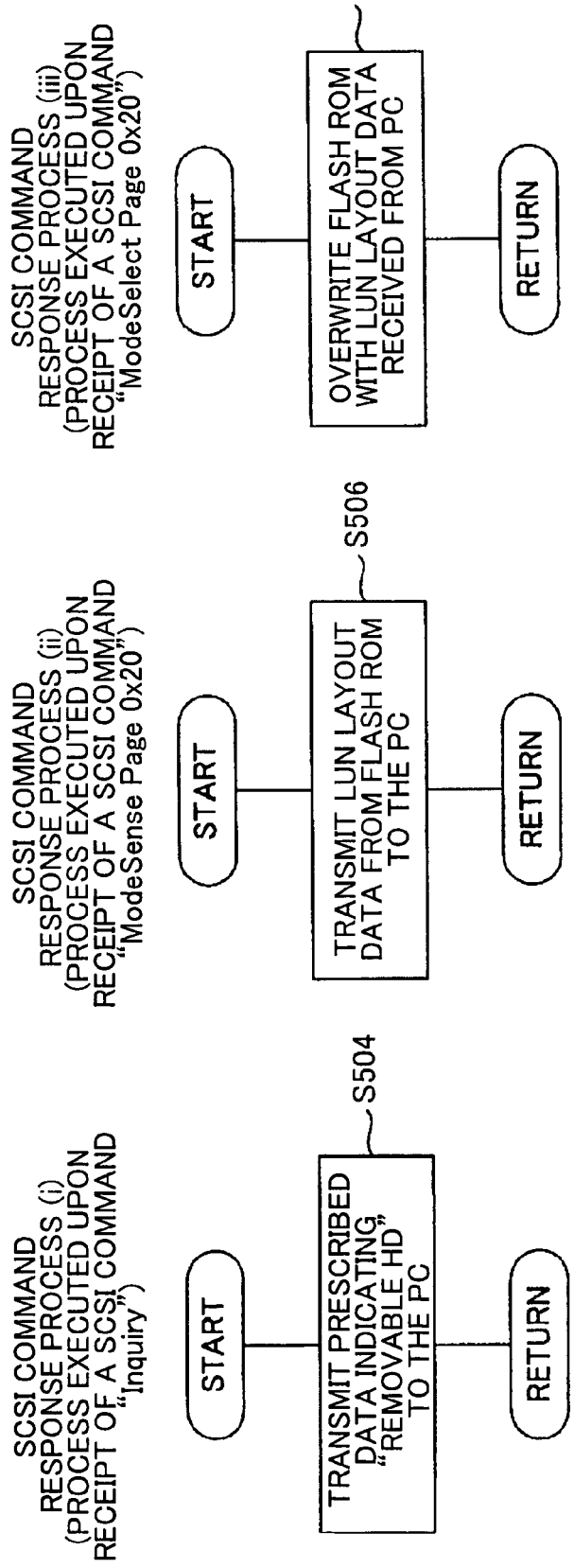

Upon receiving this command, the multi-reader/writer 301 executes the SCSI command response process (i) of FIG. 36(*a*), which has already been described.

Based on the acquired data, the CPU 331 determines in S524 whether the cdrv drive corresponds to the first logical unit 346 (LUN0) in a product supported by the LUN layout tool (the multi-reader/writer 301 in the present example).

The CPU 331 advances to S526 if a negative determination is made in S524, and to S525 if a positive determination is made.

In S525 the CPU 331 adds data related to the cdrv drive (drive name, vendor name, product name, etc.) to the supported drive list and advances to S526.

In S526 the CPU 331 increments the variable cdrv and repeats the process beginning from S522. In other words, if the variable cdrv has been drive A, then the drive letter is incremented to drive B and the process is repeated from S522.

After this process has been repeated through drive A to drive Z, the CPU 331 skips from S522 to S527 and checks the number of drives in the supported drive list. If only one multi-reader/writer 301 is connected to the personal computer 330 at this time, the number of drives in the list is one, and the CPU 331 advances to S529.

In S529 the CPU 331 sets the listed drive to a kdrv drive and acquires the current LUN layout of that drive by transmitting a SCSI command "Mode Sense Page 0x20" to the drive. Upon receiving this command, the multi-reader/writer 301 executes the SCSI command response process (ii) of FIG. 36(b), which has been described above.

However, if a plurality of the multi-reader/writers 301 or other storage devices supported by the LUN layout tool are connected to the multi-reader/writer 301, then the number of drives in the list is greater than one, and the CPU 331 advances to S528. In S528 the CPU 331 displays a drive selection dialog box prompting the user to select the drive (device) for setting the LUN layout and sets the user's selection as the target for the LUN layout setting.

If a multi-reader/writer 301 is not connected to the personal computer 330, then the number of listed drives is zero, and the CPU 331 advances to S511 in FIG. 45.

In S511 of FIG. 45, the CPU 331 determines whether a drive has been established for the LUN layout settings and the LUN layout data has been acquired in the process of S510 (S529). If the attempt to acquire LUN layout data has failed (no in S511), then in S516 the CPU 331 displays an error dialog and ends the process.

However, if LUN layout data has been successfully acquired (yes in S511), then in S512 the CPU 331 begins accepting user operations. Specifically, in S512, the LUN layout settings window is displayed on the display 339 as shown in FIG. 37, for example, to show the present LUN layout acquired in S510 and also to continuously showing how the user is presently modifying the LUN layout, thereby enabling the user to easily modify the LUN layout.

If the user clicks on the Cancel button 352, the LUN layout tool ends without change. On the other hand, if the user clicks on the Accept button 351, then in S514 the CPU 331 transmits the LUN layout data. The process of S514 is described in detail in FIG. 47.

Figure 47:
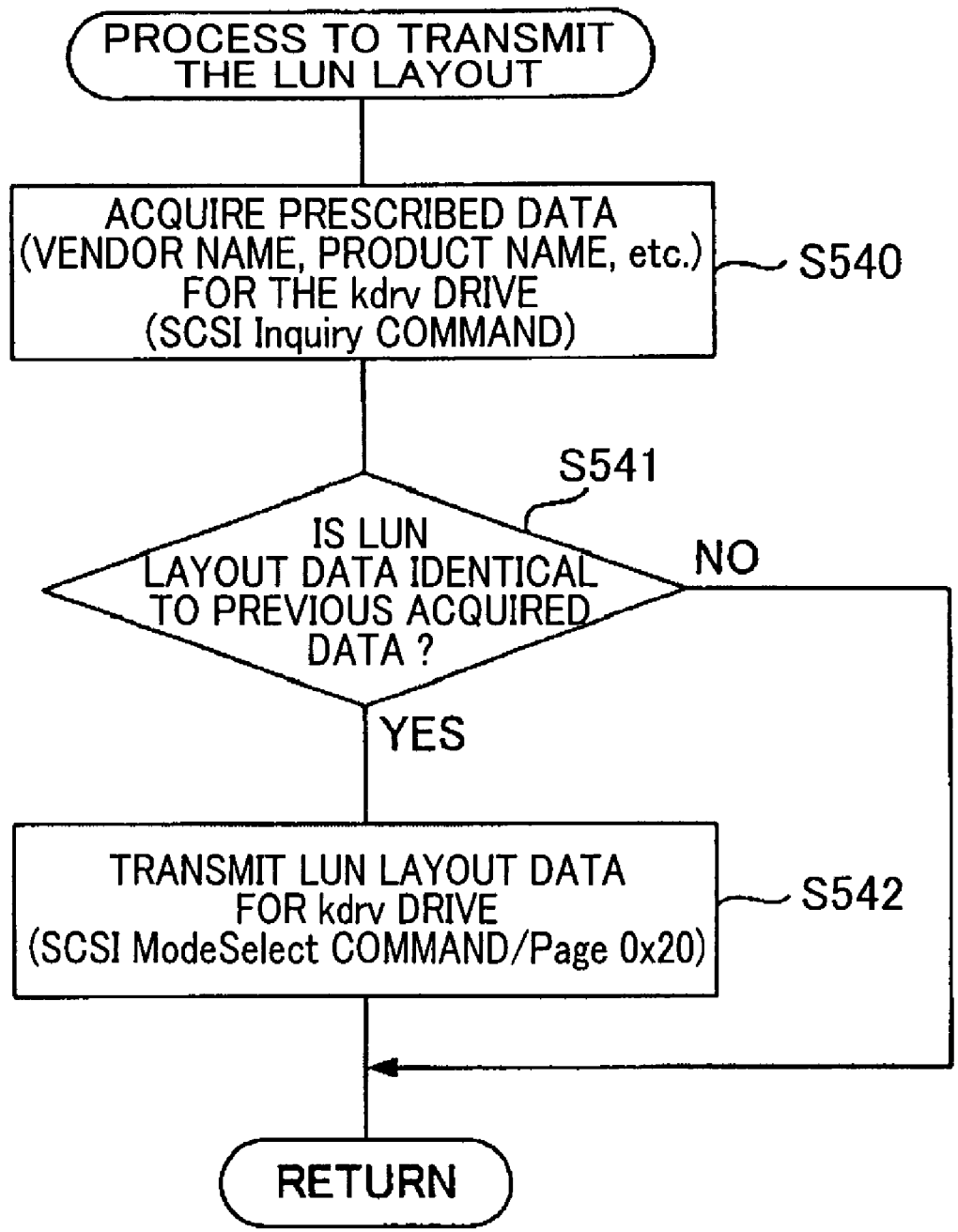
FIG. 47 is a flowchart showing the steps in a process for transmitting the LUN layout in the LUN layout settings process in FIG. 45.

In S540 of FIG. 47, the CPU 331 transmits a SCSI command "Inquiry" to acquire prescribed data (vendor name, product name, etc.) related to the kdrv drive. This step is identical to S523 of FIG. 46. The SCSI command response process (i) of FIG. 36(a) is executed by the multi-reader/writer 301 upon receiving this command.

The process of S540 is a confirmation step to ensure that the multi-reader/writer 301 for which LUN layout data has been acquired in S529 of FIG. 46 is still connected. In S541 the CPU 331 determines whether the data acquired in S540 is the same as that acquired in S523. If the data matches, then in S542 the CPU 331 transmits a SCSI command "Mode Select Page 0x20" and the LUN layout data corresponding to the kdrv drive, that is, the LUN layout data set when the user has clicked on the Accept button 351. After receiving this command, the multi-reader/writer 301 executes the SCSI command response process (iii) of FIG. 36(c), which has been described above.

On the other hand, if the data do not match in S541, then it is known that the multi-reader/writer 301 for which the LUN layout data has been acquired is no longer connected to the personal computer 330 or has been replaced with another device, for example. Therefore, the CPU 331 advances to S515 of FIG. 45 without transmitting the newly set LUN layout data.

In S515 the CPU 331 determines whether the LUN layout data has been successfully transmitted. If the data has been successfully transmitted (yes in S515), then the CPU 331 ends the LUN layout setting process. However, if the data has not been transmitted (no in S515), then in S516 the CPU 331 displays an error dialog and ends the LUN layout setting process.

Next, the method that the personal computer 330 uses to access the media in the multi-reader/writer 301, including the external memories 131-134 and the internal flash memory 126 will be described.

If the personal computer 330 is running an older or lower rank OS, then the. operating mode of the multi-reader/writer 301 is brought into the single-drive mode in which the personal computer 330 can access only media that is set to (associated with) the first logical unit 346 (hereinafter referred to as the "specified media"). This mode allows the personal computer 330 to access only one of the specified media inserted in a slot when a plurality of media has been set to the first logical unit 346. In other words, this mode is an automatic switching mode.

When the multi-reader/writer 301 is operating with the LUN layout shown in FIG. 37, for example, all of the media are specified media. The layout data, which is now copied into the RAM 305 from the flash ROM 126a, indicates that all of the media (internal memory 126, and first, second, third, and fourth external memories 131-134) correspond to LUN0. If the first external memory 131, for example, is inserted in the first slot 121, the CPU 303 sets the LUN0 to the first slot 121, in which the first external memory 131 is now being inserted, by referring to the LUN number that is stored in the RAM 305 in correspondence with the first external memory 131. The personal computer 330 can therefore access the first external memory 131, by indicating the LUN0, that is, by transmitting a "Read external memory inserted in the slot to which LUN0 is allocated" command or a "Write to external memory inserted in the slot to which LUN0 is allocated" command.

At this time, if the first external memory 131 is removed from the first slot 121 and a different medium inserted, then the medium that can be accessed by the personal computer 330 is automatically switched to the different medium. More specifically, the CPU 303 newly sets the LUN0 to a slot, in which the different medium is newly inserted, by referring to the LUN number that corresponds to the different medium in the layout data in the RAM 305. Accordingly, the personal computer 330 can access the different medium by indicating the LUN0. For example, it is now assumed that the first external memory 131 is removed from the first slot 121 and the second external memory 132 is inserted into the second slot 122. The CPU 303 newly sets the LUN0 to the second slot 122 that corresponds to the second external memory 132 by referring to the layout data in the RAM 305. As a result, the personal computer 330 can access the second external memory 132 by indicating the LUN0, that is, by transmitting a "Read external memory inserted in the slot to which LUN0 is allocated" command or a "Write to external memory inserted in the slot to which LUN0 is allocated" command.

When a plurality of media are associated with a single logical unit, as in the example described above, the following method can be used to determine the accessible medium when more than one media are inserted in slots at the same time.

For example, the order in which media are inserted into the slots 121-124 may be stored in the RAM 305. The medium that -has been inserted first into the slots 121-124 among currently inserted media may be determined based on the stored order and may be set as the accessible medium.

In this way, it is possible to determine a single slot (medium) that the personal computer 330 can access when a plurality of accessible media associated with the same logical unit are inserted in slots. Accordingly, no confusion will arise during operations of the multi-reader/writer 301.

However, if the personal computer 330 is running a newer or upper rank OS, then drives are set according to the layout specified by the LUN layout tool, and the multi-reader/writer 301 operates in a multi-drive mode that enables the personal computer 330 to access each drive individually.

If a plurality of media is set to the same logical unit (same drive) in this case, the drive associated with the logical unit operates according to the automatic switching mode described above. In other words, the multi-reader/writer 301 operates in the multi-drive mode overall, but operates in the automatic switching mode for individual drives associated with a plurality of media.

For example, when the multi-reader/writer 301 is operating with the LUN layout shown in FIG. 39, the layout data, which is now copied into the RAM 305 from the flash ROM 126*a*, indicates that the internal memory 126 corresponds to LUN0, the first through fourth external memories 131-134 correspond to LUN1-LUN4, respectively. The CPU 303 sets the LUN0 to LU4 to the internal memory 126 and the first through fourth slots 121-124, respectively.

When the multi-reader/writer 301 is operating with the LUN layout shown in FIG. 43, for example, the layout data, which is now copied into the RAM 305 from the flash ROM 126*a*, indicates that the internal memory 126 corresponds to LUN0, the first external memory 131 corresponds to LUN1, and the second through fourth external memories 132-134 correspond to LUN2. The CPU 303 sets the LUN0 to the internal memory 126. The CPU 303 sets the LUN1 to the first slot 121. If the second external memory 132, for example, is inserted in the second slot 122 first among the second-fourth external memories 132-134, the CPU 303 sets the LUN2 to the second slot 122. If the second external memory 132 is removed from the second slot 122 and then the third external memory 133 is inserted into the third slot 123, the CPU 303 sets the LUN2 to the third slot 122.

With the data processing system of the present embodiment described above, the user can use the LUN layout tool to set desired associations between the media and logical units 346-350 in the multi-reader/writer 301 and determine which drives the personal computer 330 has set for the multi-reader/writer 301. Therefore, it is possible to clean up the display in the "My Computer" window by combining infrequently used media on a single drive to reduce the number of drive letters. It is also possible to assign one drive letter to each frequently used medium. Hence, the data processing system of the present embodiment is user-friendly.

Further, the LUN layout tool of the present embodiment is provided with the three prerecorded layouts. By clicking on the Auto-switch with One Drive button 355, Independent Internal Flash button 356, or All Independent button 357 in the LUN layout settings window, the user can automatically set the layout based on the selected button, thereby reducing the operating load on the user.

Further, since the current layout is initially displayed in S512 in the LUN layout settings window upon starting up the LUN layout tool, the user can make needed modifications while viewing the current layout. Moreover, modifications are performed visually through such simple operations as dragging and dropping icons, allowing the user to set the LUN layout reliably and efficiently.

In this way, not only can the LUN layout be set appropriately for the multi-reader/writer 301, but also settings made by the LUN layout tool can be reliably reflected by updating the associations between media and drives based on the new LUN layout data.

Further, in the data processing system of the present embodiment, the personal computer 330 can access the internal flash memory 126 in addition to the media inserted in the slots 121-124. Accordingly, the personal computer 330 can perform data reading and writing with using the multi-reader/writer 301 only, even when no media is inserted in the slots. Hence, the peripheral device 303 is highly versatile.

Further, the personal computer 330 can reliably transmit an LUN layout to only the peripheral device for which unique identification data has been acquired in S523 and S540-S541. Accordingly, the present embodiment can prevent the incorrect transmission of LUN layout data, for example, if the multi-reader/writer 301, which has been connected to the personal computer 330 when the LUN layout has been inputted by the LUN layout tool, is replaced by another device. The process of S523 for acquiring identification data for a peripheral device that has been preset in the personal computer 330 and the process of S540 for acquiring identification data for a peripheral device, for which the layout data has been modified in S512, can be configured differently or as the same process.

Computer programs for operating the data processing system described above can be stored on a recording medium that can be read by a computer, such as a floppy disk, magneto-optic disk, CD-ROM, memory card, or hard disk and can be loaded into the computer and started when necessary.

Ninth Embodiment

Next, a multi-reader/writer 360 according to the ninth embodiment will be described with reference to FIG. 48.

Figure 48:
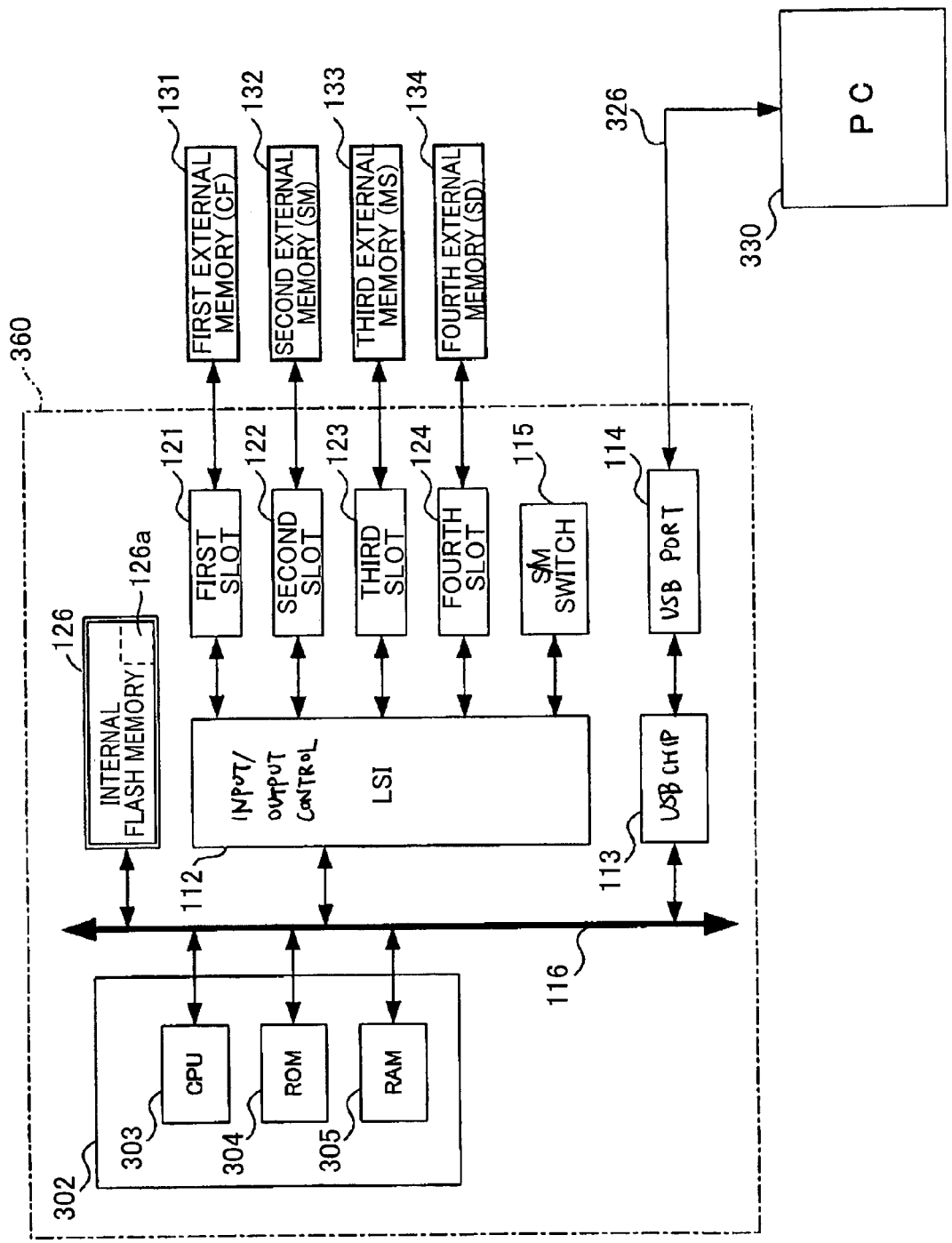
FIG. 48 is a block diagram showing the general construction of a multi-reader/writer according to a ninth embodiment.

FIG. 48 shows the multi-reader/writer 360 according to the ninth embodiment. In contrast to the multi-reader/writer 301 of the eighth embodiment described above (see FIG. 31), the multi-reader/writer 360 of the present embodiment is provided with an S/M switch 115; media accessible by the personal computer 330 is regulated by the setting of the S/M switch 115; and the LUN layout at shipping is set to the layout shown in FIG. 39 (with each medium independent). Other than the operations related to the S/M switch 115, the construction and operations of the multi-reader/writer 360 are identical to the multi-reader/writer 301 according to the eighth embodiment. Further, the personal computer 330 is constructed identically to the personal computer 330 described in the eighth embodiment. Hence, the LUN layout tool can be started on the personal computer 330 for setting the LUN layout for the multi-reader/writer 360.

As described above, the data processing system of the ninth embodiment is configured so that the multi-reader/writer 360 is provided with the S/M switch 115. The multi-reader/writer 360 has the same external configuration with the multi-reader-writer 101 shown in FIGS. 12(*a*) and 12(*b*). The S/M switch 115 is for selectively switching the multi-reader/writer 360 between the single-drive mode and the multi-drive mode. The user can select a mode by moving the protruding part 115*a* in the S/M switch 115 up or down.

The microcomputer 302 in the multi-reader/writer 360 executes the drive mode setting process shown in FIG. 14 similarly to the CPU 111 of the multi-reader/writer 101 in the fourth embodiment.

However, according to the present embodiment, when the operating mode is set in S173 to the single-drive mode based on the user's selection, the CPU 303 forcibly sets all media to the first logical unit 346 (LUN0), rather than enabling the personal computer 330 to access only media that is set to the first logical unit 346 (LUN0). In other words, when the single-drive mode has been selected, the automatic switching mode is employed for all media, regardless of the associations (LUN layout data) copied from the flash ROM 126a to the RAM 305 at start-up. For example, if the single-drive mode is selected by the S/M switch 115 when the LUN layout is set to the default shipping layout shown in FIG. 39, the layout is forcibly changed to that shown in FIG. 37.

With this construction, all media that are targeted for access can be accessed even in the single-drive mode, regardless the drive settings. Accordingly, the peripheral device 360 is convenient.

After the operating. mode of the multi-reader/writer 360 has been set to the mode selected by the S/M switch 115 as described above, thereafter this mode is preserved while the multi-reader/writer 360 continues operating. In order to change the mode, the USB cable 326 has to be temporarily disconnected from the USB port 114 and then reconnected, or the personal computer 330 has to be restarted, for example. In other words, it is necessary to restart the multi-reader/writer 360.

At the same time the drive mode setting process of FIG. 14 is being executed, the microcomputer 302 of the multi-reader/writer 360 executes the GET_MAX_LUN response process shown in FIG. 15 similarly to the CPU 111 of the multi-reader/writer 101 in the fourth embodiment. It is noted that as described above, the drive mode setting process of FIG. 14 and the GET_MAX_LUN response process of FIG. 15 are separately-executed tasks. However, the GET_MAX_LUN response process is executed when the OS of the personal computer 360 is a newer or upper rank OS, only after the drive mode setting process of FIG. 14 has been executed to set the operating mode.

It is noted that in S176 the CPU 303 returns a "0" to the personal computer 330 as the LUN value. Therefore, when the single-drive mode has been set, the CPU 303 returns to the personal computer 330 information indicating that a total drive number of "1", enabling the personal computer 330 to access only those media that are set to the first logical unit 346, even when a plurality of slots are provided. However, in the present embodiment, all media is forcibly set to LUN0 when the single-drive mode has been selected, as described above.

It is also noted that according to the present embodiment, in S177 the CPU 303 returns to the personal computer 330 the maximum value among all the LUNs, to which media are assigned, as the LUN value. In other words, the CPU 303 returns to the personal computer 330 a value equivalent to one less than the total number of drives n, to which media are assigned. For example, if the media are laid out as shown in FIG. 39, the CPU 303 returns the LUN=4. If the media are laid out as shown in FIG. 41(a), the CPU 303 returns the LUN=1.

Therefore, if the personal computer 330 is running an older or lower rank OS and the S/M switch 115 is switched to the single-drive mode, the automatic switching mode is used for all media, enabling the personal computer 330 to access all media. Further, if the personal computer 330 is running a newer or upper rank OS capable of setting a plurality of drives, then both the multi-drive mode and the single-drive mode can be used. The user can select a desired mode setting based on the conditions of use. Hence, the multi-reader/writer 360 is user-friendly.

More specifically, if the user does not wish to assign a plurality of drives and display a plurality of removable disks on the display 339, as shown in FIG. 40, the user can set the operating mode to the single-drive mode in order to display a single removable disk, as shown in FIG. 38.

Tenth Embodiment

Next, a multi-reader/writer 370 according to the tenth embodiment will be described with reference to FIGS. 49-52 (c).

Figure 49:
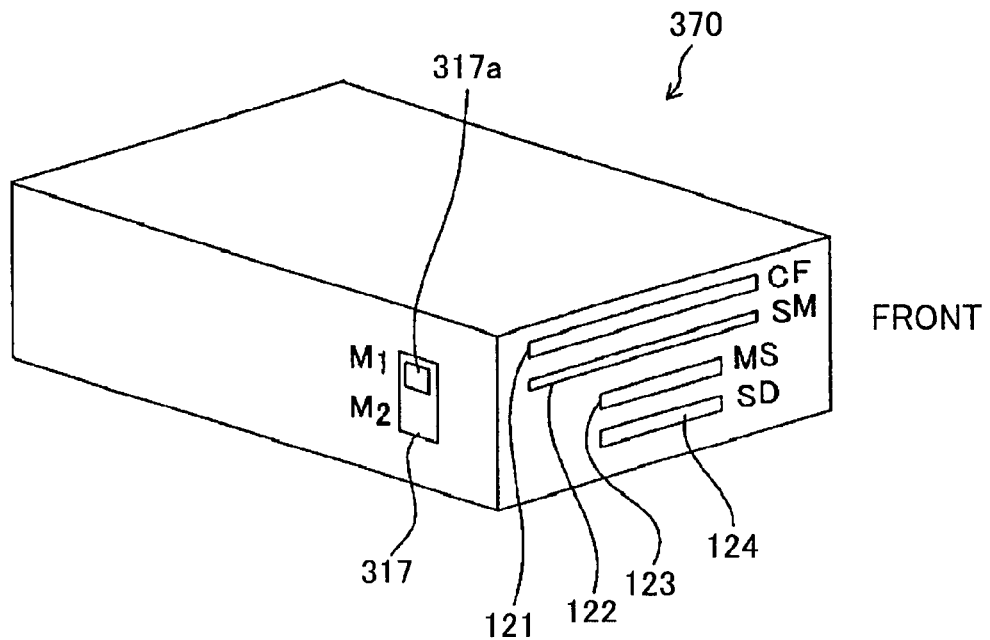
FIG. 49 is a perspective view showing a front side of a multi-reader/writer according to a tenth embodiment.

FIGS. 49 and 50 show the multi-reader/writer 370 according to the tenth embodiment. In contrast to the multi-reader/writer 301 according to the eighth embodiment (see FIG. 31), the multi-reader/writer 370 according to the tenth embodiment is provided with an M1/M2 switch 317; and the number of drives recognized by the personal computer 330 and types of media corresponding to each drive change according to the setting of the M1/M2 switch 317. Further, two different layouts can be set using the LUN layout tool.

As described above, the data processing system according to the tenth embodiment is configured so that the multi-reader/writer 370 includes the M1/M2 switch 317. Two types of LUN layout data are stored in the flash ROM 126a of the multi-reader/writer 370. When the multi-reader/writer 370 starts up, one of the LUN layouts is copied to the RAM 305 based on the selection of the M1/M2 switch 317, and the personal computer 330 allocates drive letters according to this LUN layout.

The M1/M2 switch 317 enables the user to selectively switch between two types of layouts for the multi-reader/writer 370. The user can select a layout mode between a mode 1 and a mode 2 by moving a protruding part 317a in the switch 317 up or down. In FIG. 49, the switch 317 has been set for operating the multi-reader/writer 370 in the mode 1.

Figure 51:
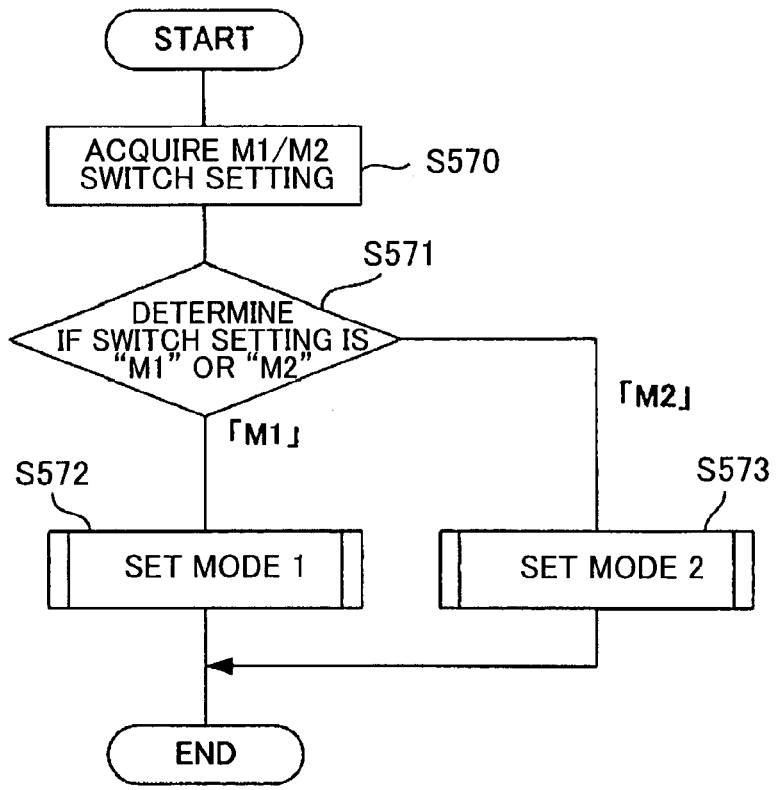
FIG. 51 is a flowchart showing a layout mode setting process executed by the multi-reader/writer according to the tenth embodiment.

Next, a layout mode setting process executed in the multi-reader/writer 370 based on a selection made with the M1/M2 switch 317 will be described with reference to FIG. 51. FIG. 51 is a flowchart showing the layout mode setting process executed by the CPU 303 of the multi-reader/writer 370. The multi-reader/writer 370 begins executing the layout mode setting process when the multi-reader/writer 370 receives a power supply (bus power) from the personal computer 330.

At the beginning of the process in S570, the CPU 303 reads the setting of the M1/M2 switch 317.

In S571 the CPU 303 determines based on the data read in S571 whether the switch 317 is set to a mode 1 or a mode 2.

If the mode 1 is selected at this time, the CPU 303 advances to S572 and sets the layout mode of the multi-reader/writer 370 to the mode 1.

On the other hand, if the mode 2 is selected, the CPU 303 advances to S573 and sets the layout mode of the multi-reader/writer 370 to the mode 2.

After the layout mode setting process, the multi-reader/writer 370 executes an initialization process shown in FIG. 34. The CPU 303 copies into the RAM 305 LUN layout data that corresponds to the mode set by the layout mode setting process.

However, the LUN layout tool installed on the personal computer 330 can be used to modify individual settings in the two types of LUN layouts according to the present embodiment.

Figure 52A:
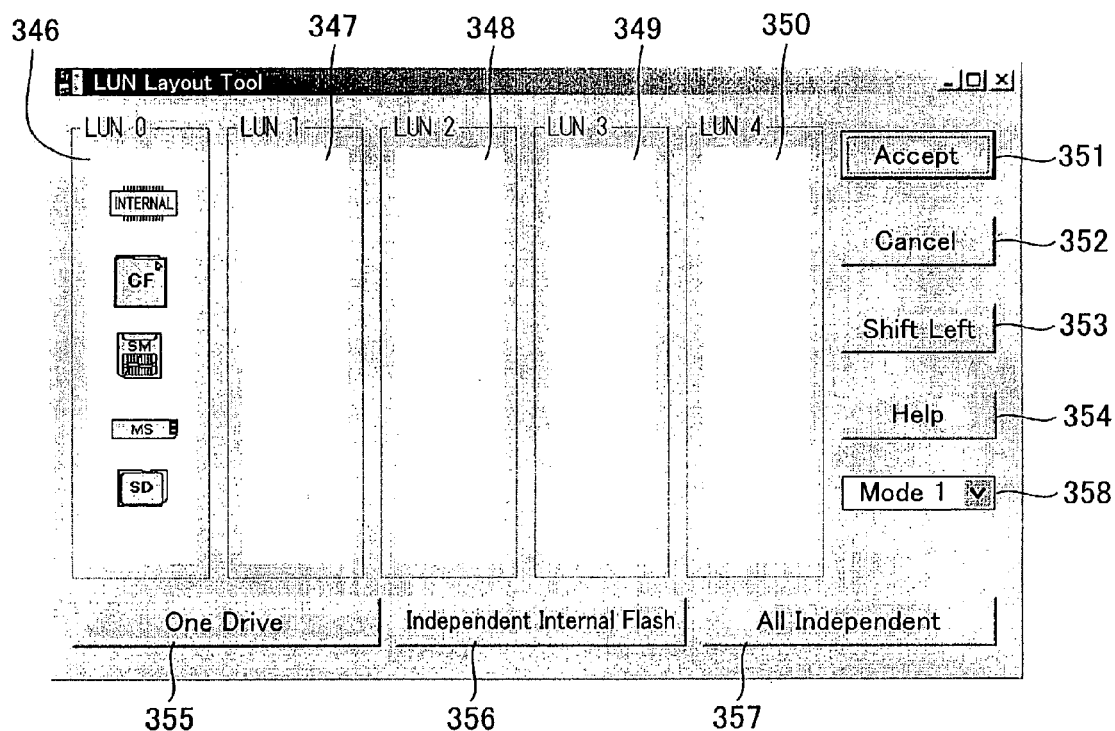
FIG. 52(a) is an explanatory diagram showing a PC LUN layout settings window according to the tenth embodiment.

Specifically, when the LUN layout tool is started up, the LUN layout settings window shown in FIG. 52(a) is displayed on the display 339 (FIG. 32). This LUN layout settings window differs from the settings windows described in the eighth embodiment (FIGS. 37, 39, 41, and 43) in that a list box 358 is provided for selecting either mode 1 or mode 2 as the target for LUN layout settings.

Figure 52B:
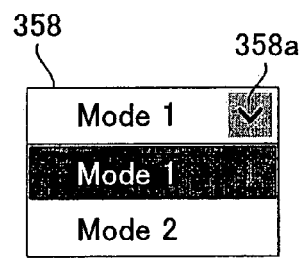
FIG. 52(b) is an explanatory diagram showing a list box in the PC LUN layout settings window of FIG. 52(a)

By clicking on a list display button 358a in the list box 358, as shown in FIG. 52(b), the two layout modes, mode 1 and mode 2, are displayed. The user can display the LUN layout corresponding to one of the modes by selecting a mode. At this time, the user can change the LUN layout corresponding to the selected mode as desired by performing operations on the displayed LUN layout in the same manner as described in the eighth embodiment (clicking on buttons, dragging and dropping icons, etc.).

Figure 52C:
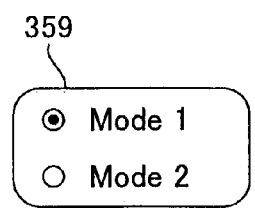
FIG. 52(c) is an explanatory diagram showing radio buttons that may be provided to the PC LUN layout settings window of FIG. 52(a) in place of the list box.

The list box 358 method of selection is simply an example, and the present embodiment is not limited to this method, provided that the user can select a mode. For example, the mode selection may be configured of radio buttons 359, as shown in FIG. 52(c).

Therefore, according to the data processing system of the present embodiment, the user can selectively set one of a plurality (two in the present embodiment) of LUN layouts. Hence, the present embodiment can provide a data processing system that supports a variety of user needs. For example, if the layout shown in FIG. 37 (automatic switching mode for all media) is set as mode 1 and the layout shown in FIG. 39 (independent drives for all media) is set as mode 2, then the personal computer 330 running a newer or upper rank OS can access each medium individually when the user selects mode 2. Further, the personal computer 330 running an older or lower rank OS can still use all of the media when mode 1 is selected.

Hence, the multi-reader/writer 370 satisfies the needs of a user who wishes to change the drive configuration according to the situation. For example, the user may wish to access each type of media individually when the peripheral device is connected to a home computer and to set only one drive corresponding to the peripheral device when accessing the peripheral device from a work computer. With the multi-reader/writer 370 according to the present embodiment, the user can selectively set a plurality of associations. Hence, the data processing system of the present embodiment is capable of supporting diverse user needs.

Eleventh Embodiment

Next, a multi-reader/writer 380 according to the eleventh embodiment will be described with reference to FIGS. 53-54.

Figure 53:
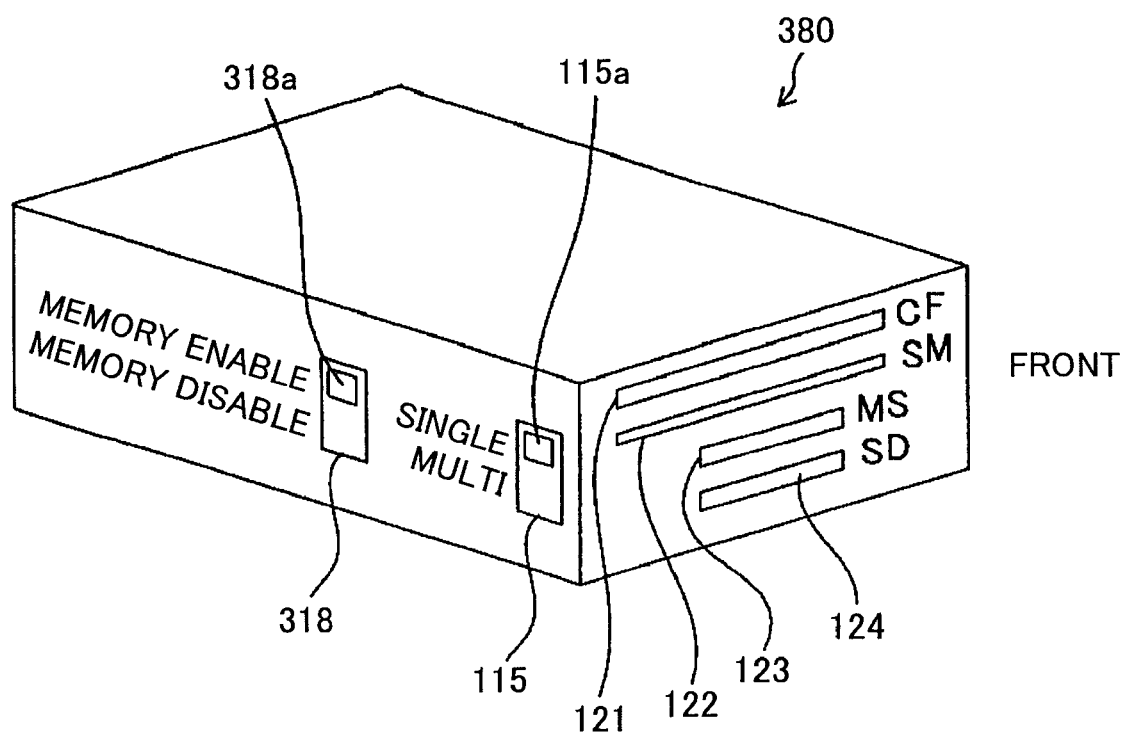
FIG. 53 is a perspective view showing a front side of a multi-reader/writer according to an eleventh embodiment.
Figure 54:
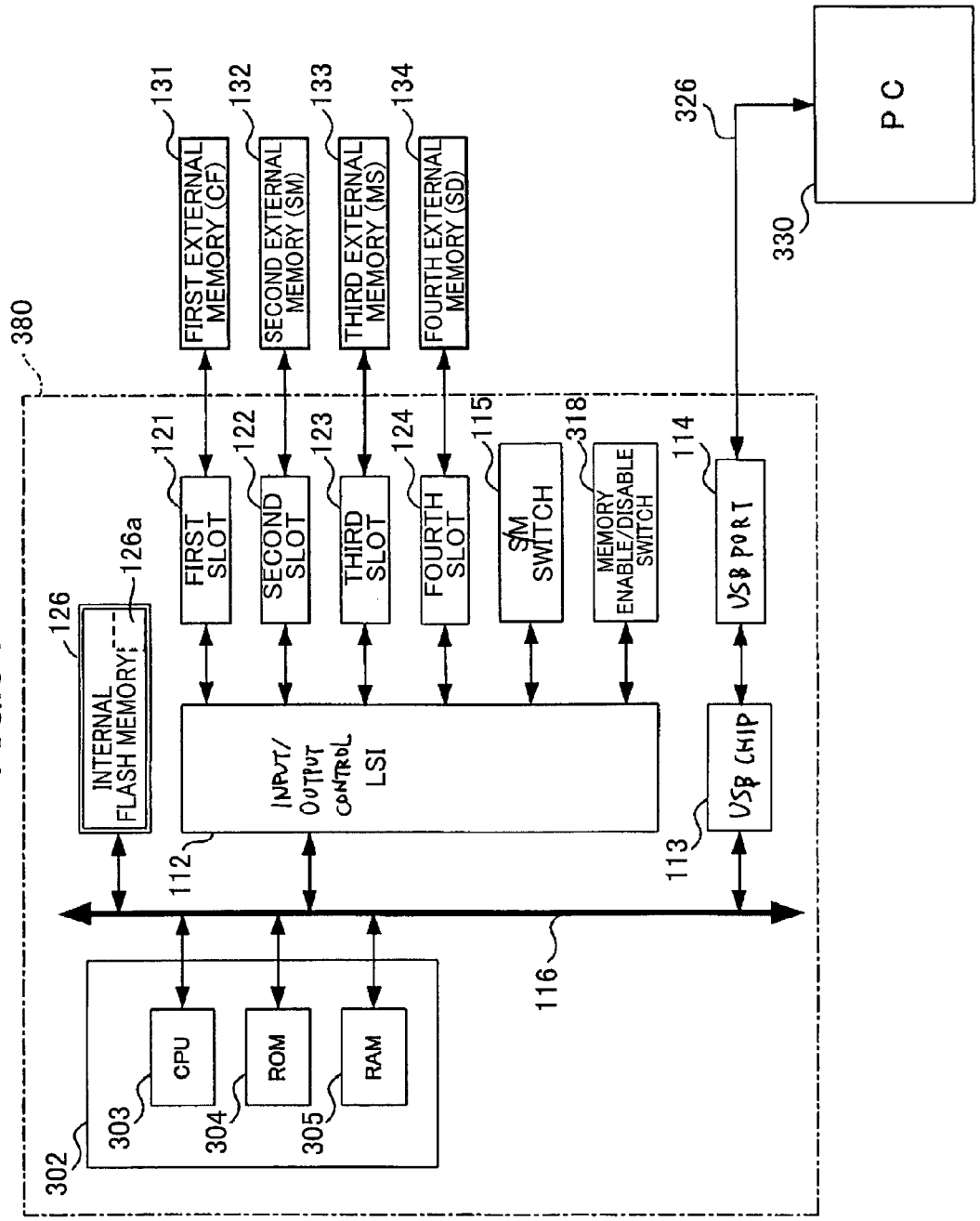
FIG. 54 is a block diagram showing the general construction of the multi-reader/writer according to the eleventh embodiment.

FIGS. 53 and 54 show the multi-reader/writer 380 according to the eleventh embodiment. In addition to the S/M switch 115 provided in the multi-reader/writer 360 of the ninth embodiment (see FIGS. 12(a) and 48), the multi-reader/writer 380 according to the eleventh embodiment also includes a memory enable/disable switch 318, which regulates access to the internal flash memory 126. The remaining construction and operations of the multi-reader/writer 380 are identical to the multi-reader/writer 360 according to the ninth embodiment.

When both the internal flash memory 126 and other accessible media (media inserted into slots) are associated with the same logical unit, it is necessary to remove all media from their slots in order to access the internal flash memory 126. Some user primarily uses the internal flash memory 126, but also uses other media.

The memory enable/disable switch 318 is provided in the multi-reader/writer 380 for selectively switching the target of access between the internal flash memory 126 and other media when the internal flash memory 126 and other media are associated with the same logical unit. By moving a protruding part 318a up or down, the user can switch between memory enable and memory disable.

When the user selects "Memory Enable" the internal flash memory 126 becomes the target of access. Therefore only the internal flash memory 126 can be accessed from the personal computer 330 for the drive corresponding to the logical unit associated with the internal flash memory 126, while all other media associated with the same logical unit cannot be accessed.

However, if "Memory Disable" has been selected, then all other media besides the internal flash memory 126 are accessible. Therefore, the PC 330 can only access media other than the internal flash memory 126 on the drive corresponding to the logical unit associated with the internal flash memory 126. The internal flash memory 126 cannot be accessed even when no media are inserted in the slots.

This method of selecting whether to access the internal flash memory 126 is effective when the user rarely uses the internal flash memory 126 or rarely uses the slots. The construction is particularly effective for allowing access to the internal flash memory 126 while media are still inserted in their slots, when the user primarily uses the internal flash memory 126.

Twelfth Embodiment

Next, a multifunction device 390 according to a twelfth embodiment will be described with reference to FIG. 55.

The multifunction device 390 is connected to the personal computer 330 via the USB cable 326. An information processing system is established by the multifunction device 390 and the personal computer 330.

The multifunction device 390 has an external configuration the same as those of the multifunction devices 140 (sixth embodiment) and 160 (seventh embodiment) shown in FIGS. 1 and 22.

Figure 55:
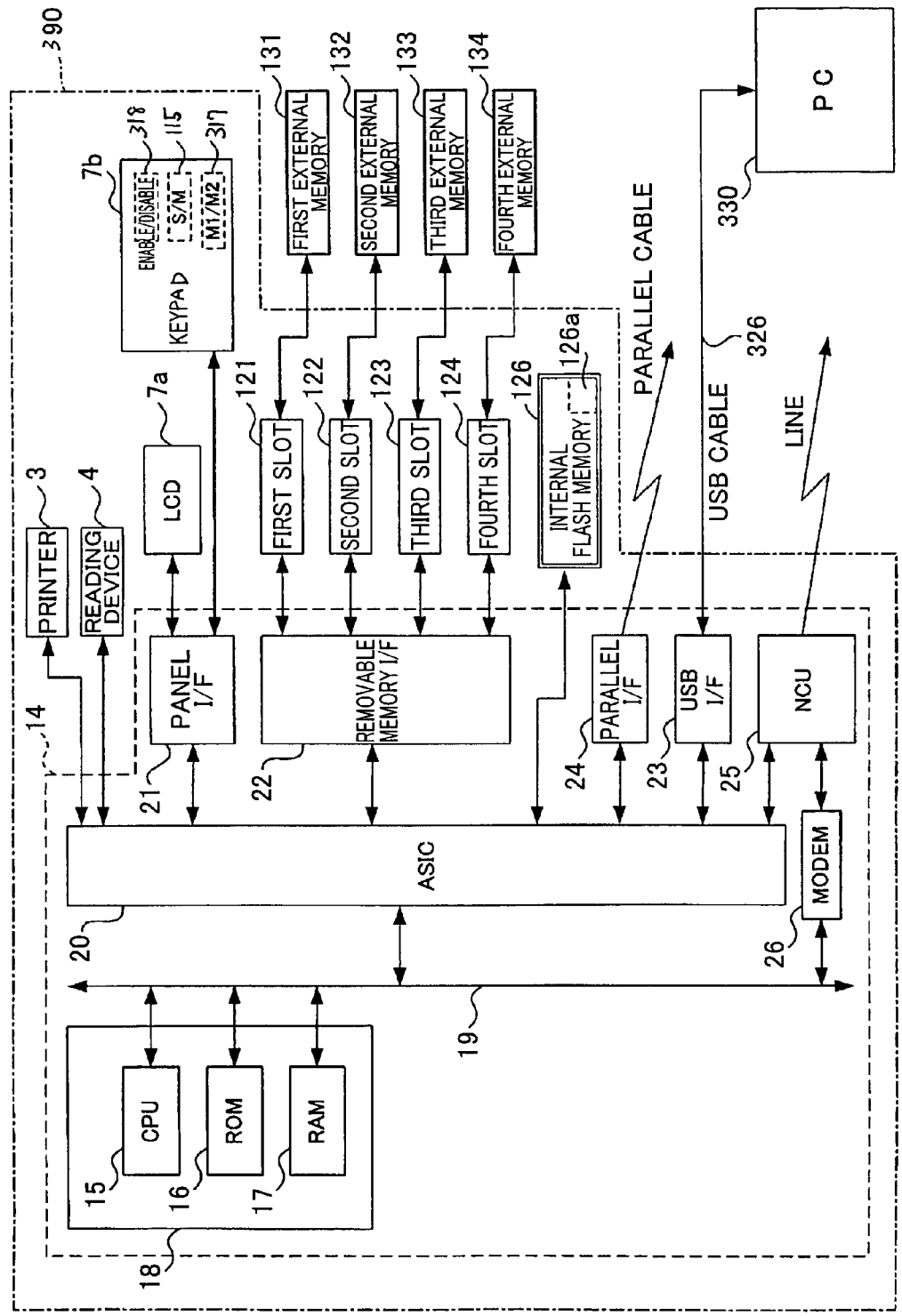
FIG. 55 is a block diagram showing the general construction of a multifunction device according to a twelfth embodiment.

The multifunction device 390 has an internal configuration, shown in FIG. 55, which is the same as that of the multifunction device 160 (seventh embodiment) shown in FIG. 25. It is noted that the multifunction device 390 is connected to the personal computer 330 via the USB cable 326.

Similarly to the eighth embodiment, in the multifunction device 390 with this construction, five logical units are set in correspondence with a total of five types of media including the external memories 131-134 and the internal flash memory 126 in the layout as shown in FIG. 37, for example. Each of the external memories 131-134 and the internal flash memory 126 is associated with one of the logical units 346-350.

Further, the personal computer 330 of the present embodiment is identical to the personal computer 330 in the eighth embodiment. As in the eighth embodiment, an LUN layout tool is installed on the personal computer 330. Using this LUN layout tool, the user can modify the associations between each media and the logical units 346-350 in the multifunction device 390. The personal computer 330 sets drives corresponding to the media based on the LUN layout in the multifunction device 390.

Hence, the ability to modify the LUN layout for the multifunction device 390 from the personal computer 330 and the method of setting drives according to the LUN layout (specifically, the LUN layout data in the flash ROM 126a) is identical to the eighth embodiment described above, If "multi-reader/writer" in the flowchart of FIG. 33 is replaced by the multifunction device 390, then the flowchart of FIG. 33 describes the exchange of data performed between the multifunction device 390 and the personal computer 330 of the present embodiment.

The multifunction device 390 having this construction allows the personal computer 330 to access each of the slots 121-124 and the internal flash memory 126. Accordingly, the personal computer 330 can read data from and write data to each of the external memories 131-134 inserted in the slots 121-124 and the internal flash memory 126.

Figure 4:
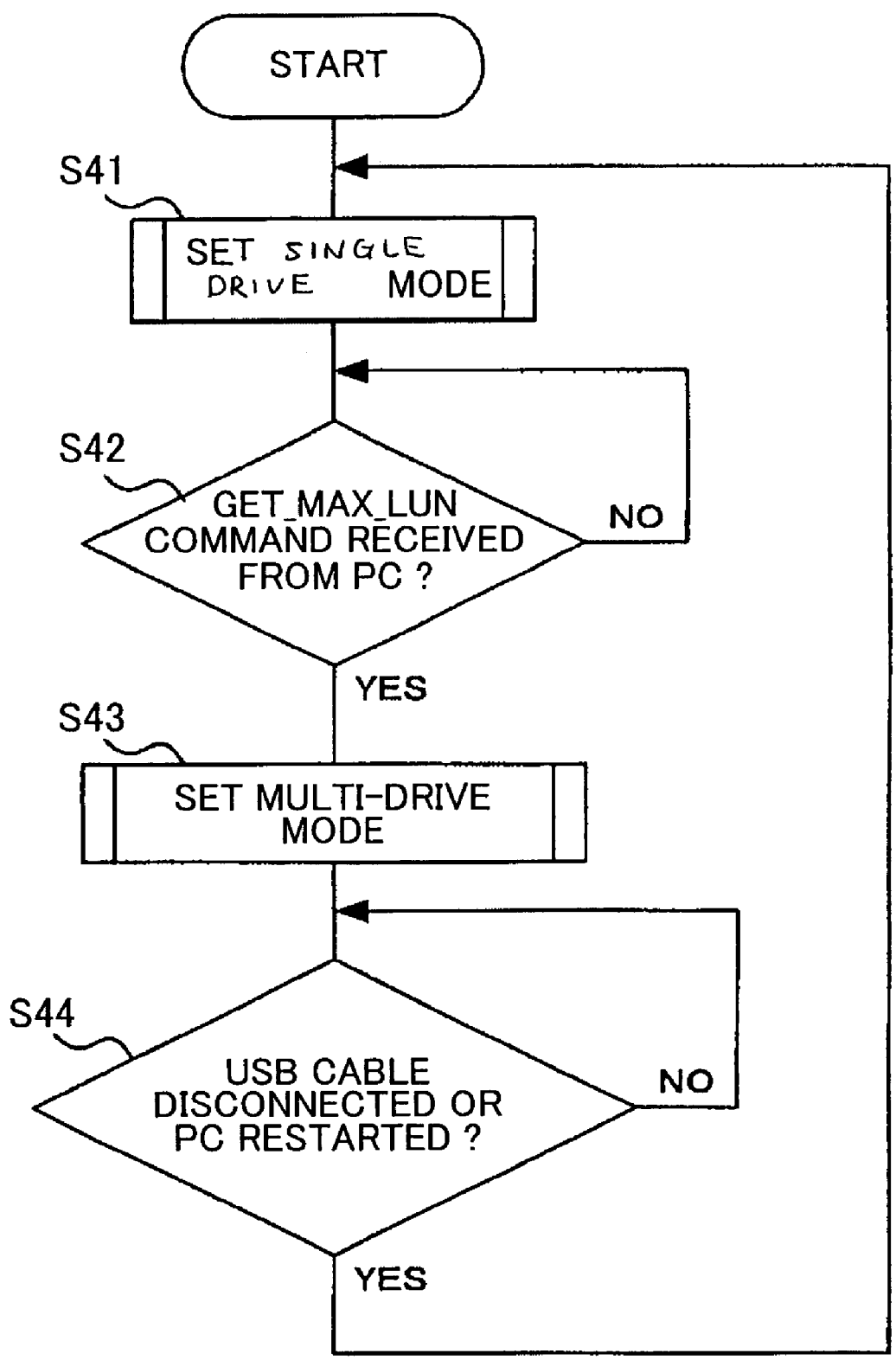
FIG. 4 is a flowchart showing a drive mode setting process executed by the multifunction device of the first embodiment.

The CPU 15 in the multifunction device 390 executes a drive mode setting process of FIG. 4 similarly to the CPU 15 in the multifunction device 1 of the first embodiment. The drive mode setting process begins when the multifunction device 390 is turned on.

At the beginning of the process in S41, the CPU 15 sets the operating mode to the single-drive mode. That is, the multifunction device 390 is set to the single-drive mode when the multifunction device 390 is turned ON regardless of whether the multifunction device 390 is connected to the personal computer 330 via the USB cable 326.

It is noted that when the multifunction device 390 is connected to the personal computer 330 via the USB cable 326, the multifunction device 390 receives a device check command from the personal computer 330, and therefore sends to the personal computer 330 a command indicating that the multifunction device 390 is a storage class device. More specifically, as shown in FIG. 5, the entire multifunction device 390 is recognized by the personal computer 330 as a "USB composite device", and a plurality of constituent functions are further recognized thereunder. For example, USB printing support is recognized as constituent function 0, the reading device 4 (the scanner) as constituent function 1, the facsimile modem 26 as constituent function 2, and a large-capacity storage device (external memories 131-134 and internal flash memory 126) as constituent function 3.

Each constituent function can have an individual class. Constituent function 3, that is, a multi-reader/writer function is a "storage class." The multi-reader/writer function is achieved by the slots 121-124, the internal flash memory 126, and the microcomputer 14 that controls the slots 121-124 and the internal flash memory 126, In S42, the CPU 15 judges whether the multifunction device 390 receives a GET_MAX_LUN command from the personal computer 330. If a GET_MAX_LUN command has not been received (no in S42), S42 is repeated. That is to say, the multifunction device 390 is in a state in which the single-drive mode remains being set. On the other hand, if a GET_MAX_LUN command has been received (yes in S42), the processing flow proceeds to S43, in which the multifunction device 390 is brought into the multi-drive mode.

In S44, the CPU 15 determines whether communication with the USB host (i.e., the personal computer 330) has been interrupted. In other words, the CPU 15 determines whether the USB cable 326 has been disconnected, the personal computer 330 has been restarted, or the power to the personal computer 330 has been turned off, for example. In other words, the CPU 15 determines whether the personal computer 330 is capable of accessing the multi-reader/writer 390.

The determination in S44 is repeated (no in S44) as long as the personal computer 330 is connected to the multi-reader/writer 390 by the USB cable 326 and the personal computer 330 is capable of accessing the multi-reader/writer 390. When communication with the USB host (personal computer 330) is interrupted by disconnection of the USB cable 326 or the like, the CPU 15 returns to S41. As a result, the entire process is repeated from S41 to set the operating mode into the single drive mode.

As in the single-drive mode of the ninth embodiment described above, the single-drive mode in the present embodiment forcibly sets all media to the first logical unit 346. Therefore, when the personal computer 330 is running an older or lower rank OS, the automatic switching mode is set for all media, regardless of the LUN layout set by the LUN layout tool. However, when the personal computer 330 is running a newer or upper rank OS, the drives are set according to the LUN layout set by the LUN layout tool.

Therefore, even if the personal computer 330 is running an older or lower rank OS, the multifunction device 390 enables the personal computer 330 to access all media. Further, if the personal computer 330 is running a newer or upper rank OS, then the multifunction device 390 is brought into the multi-drive mode, and operates according to the LUN layout set by the LUN layout tool.

<Modification of the Twelfth Embodiment>

The drive mode on the multifunction device 390 can be set to either the single-drive mode or the multi-drive mode, as in the ninth embodiment.

More specifically, as indicated by broken line in FIG. 55, the multifunction device 390 may be configured with the S/M switch 115 on the outside thereof for enabling the user to select a drive mode similarly to the sixth embodiment (FIG. 23). The multifunction device 390 basically sets the drive mode according to the selection made with the S/M switch 115.

It is noted that the operating mode of the multifunction device 390 is forcibly set to the single-drive mode on startup. The multifunction device 390 leaves the operating mode in the single-drive mode if the single-drive mode has been selected by the S/M switch 115 when a GET_MAX_LUN command is received from the personal computer 330, but changes the operating mode to the multi-drive mode if the multi-drive mode has been selected at this time.

In this modification, the S/M switch 115 is configured as a function key implemented by manipulating keys on the keypad 7b in a prescribed order. However, the S/M switch 115 may also be provided as a physically independent device similarly to the fourth and eighth embodiments.

In this modification, the CPU 15 of the multifunction device 390 executes the drive mode setting process the same as that of the sixth embodiment shown in FIG. 24. The CPU 15 executes the drive mode setting process when the multifunction device 390 is turned on.

It is noted that in S185, the CPU 15 sets the operating mode to the single-drive mode regardless of which mode the user has selected with the S/M switch 115.

In S187, the CPU 15 reads the setting of the S/M switch 115. In S188 the CPU 15 determines whether the single-drive mode or the multi-drive mode has been selected based on the switch setting.

It is also noted that similarly to the ninth embodiment, when the single-drive mode has been selected, the operating mode is set to the single-drive mode, wherein all media are forcibly set to the first logical unit (LUN0) 346 as shown in FIG. 37.

When the personal computer 330 is running an older or lower rank OS, the automatic switching mode is set for all media, regardless of the LUN layout set by the LUN layout tool. However, when the personal computer 330 is running a newer or upper rank OS, the drives are set according to the LUN layout set by the LUN layout tool.

As described above, according to the present modification, the multifunction device 390 is set to the single drive mode regardless of the selection by the S/M selection switch 115 when the OS of the personal computer 330 is an older or lower rank OS that is not provided with a multi-support driver as standard. Accordingly, the drive is automatically allocated to a desired slot among a plurality of slots simply by inserting a medium into the desired slot. Accordingly, the user can access his/her desired slot easily.

Moreover, since the operating mode is automatically initialized to the single-drive mode (all-media automatic switching mode) as described above, the multifunction device 390 will not be set in the multi-drive mode, even if the switch 115 has been set to the multi-drive mode in error, is because the multifunction device 390 will not receive a GET_MAX_LUN command from the personal computer 330. Accordingly, an incorrect setting of the S/M switch 115 does not affect the multifunction device 390.

On the other hand, when the personal computer 136 is running a newer or upper rank OS provided with a multi-support driver as standard, use of the multi-drive mode or the single-drive mode can be selected using the S/M switch 115. The user can select his/her desired mode setting according to the using conditions. Accordingly, the present embodiment can provide a user-friendly multifunction device 390.

<Various Modifications>

The arrangement of the S/M switch 115 (FIG. 48), M1/M2 switch 317 (FIG. 50), and memory enable/disable switch 318 (FIG. 54) described in the ninth through eleventh embodiments may be modified. For example, both of the S/M switch 115 and M1/M2 switch 317 may be provided to a multi-reader/writer to provide both functions. Similarly, both of the M1/M2 switch 317 and memory enable/disable switch 318 may be provided to a multi-reader/writer to provide both functions. Further, it is possible to provide all three switches 115, 317, and 318 to a single multi-reader/writer.

Similarly, in the twelfth embodiment and its modification, the memory enable/disable switch 318, the S/M switch 115, and the M1/M2 switch 317 may be provided as indicated by broken lines in FIG. 55 or not according to need.

When the M1/M2 switch 317 is provided to the multifunction device 390, the multifunction device 390 is given the same function provided in the multi-reader/writer 370 (FIG. 50) according to the tenth embodiment. When the S/M switch 115 and memory enable/disable switch 318 are provided to the multifunction device 390, the multifunction device 390 is given the same functions provided in the multi-reader/writer 380 (FIG. 54) according to the eleventh embodiment.

It is noted that in this modification, the M1/M2 switch 317 and the memory enable/disable switch 318 are configured as function keys implemented by manipulating keys on the keypad 7b in other prescribed orders. However, the M1/M2 switch 317 and the memory enable/disable switch 318 may also be provided as physically independent devices.

Further, in the twelfth embodiment described above, the multi-function device 390 is initially set to the single-drive mode and subsequently set to the multi-drive mode after receiving a GET_MAX_LUN command from the personal computer 330. These same functions may also be provided to the multi-reader/writer 301 according to the eighth embodiment.

As in the modification of the twelfth embodiment, the multi-reader/writer 360 according to the ninth embodiment may also be forcibly set to the single-drive mode initially and may be switched to the multi-drive mode after receiving a GET_MAX_LUN command, provided that the multi-drive mode has been selected with the S/M switch 115. conversely, the twelfth embodiment and its modification can be modified so the drive mode is not set based on the existence of a GET_MAX_LUN command, similarly to the eighth through eleventh embodiments.

In the ninth and twelfth embodiments described above, all media are forcibly set to LUN0 when the single-drive mode has been selected with the S/M switch 115. However, it is also possible to simply allow access only to media that are currently set to the first logical unit (LUN0).

In the eleventh embodiment described above, the internal flash memory 126 cannot be accessed even if there are no media inserted in the slots when "Memory Disable" has been selected by the memory enable/disable switch 318. However, while the media is always given priority over the internal flash memory 126 when media is inserted in the slots, it is possible, for example, to allow access to the internal flash memory 126 as long as no media are inserted.

While the multi-reader/writers of the eighth through twelfth embodiments and modifications are provided with all of the slots 121-124, as well as the internal flash memory 126, these multi-reader/writers and multifunction devices may instead be provided with only a plurality of slots and not the internal flash memory 126, or one slot and the internal flash memory 126.

If the multi-reader/writer 380 according to the eleventh embodiment (FIG. 54) is not provided with the internal flash memory 126, then the memory enable/disable switch 318 also becomes unnecessary.

If the internal flash memory 126 is not provided, a separate storage medium for storing the LUN layout data has to be provided to the multifunction devices and the multi-reader writers.

Figure 56:
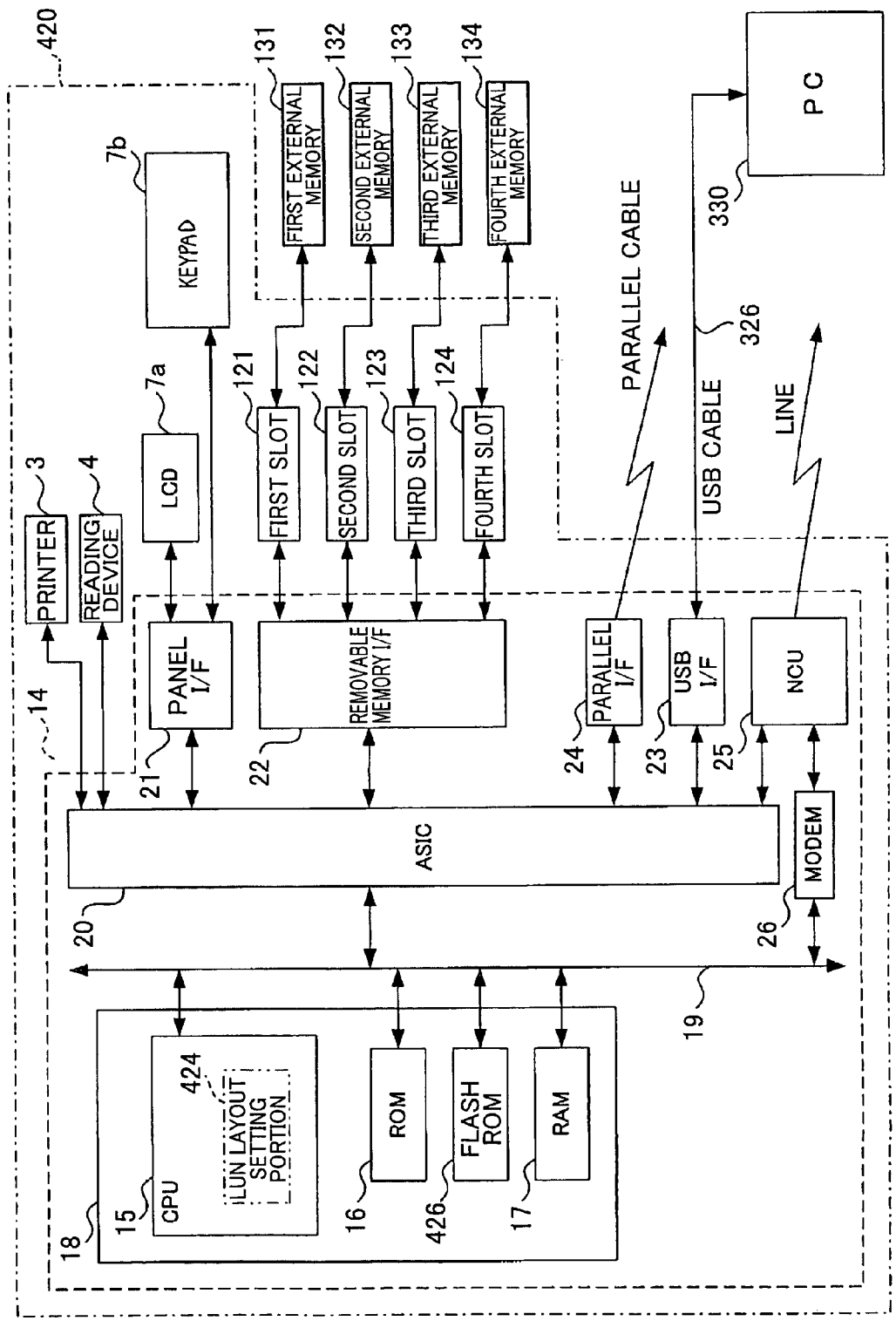
FIG. 56 is a block diagram showing the general construction of a multifunction device according to a variation of the twelfth embodiment.

For example, as shown in FIG. 56, in a multifunction device 420 of a modification of the twelfth embodiment, a flash ROM 426 for storing settings is provided in the microcomputer 18.

Or, the entire internal flash memory 126 may be used as a flash ROM for storing settings, while not allowing external access.

Further, while in all of the eight through twelfth embodiments described above the LUN layout tool is installed on the personal computer 330 enabling the user to set the LUN layout on the personal computer 330. However, in the modification shown in FIG. 56, the multi-function device 420 is configured to enable a user to set the LUN layout by providing the LUN layout tool in the multi-function device 420 and enabling the CPU 15 of the microcomputer 18 to function as an LUN layout setting portion 424. With this construction, the user uses the LCD 7a and the keypad 7b to input mode settings for the LUN layout, and the multi-function device 420 subsequently sets the LUN layout based on the inputted settings.

Since the multi-function device 420 in FIG. 56 does not include the internal flash memory 126, the flash ROM 426 for storing settings is provided separately, and the LUN layout data is stored on the flash ROM 426.

Figure 57:
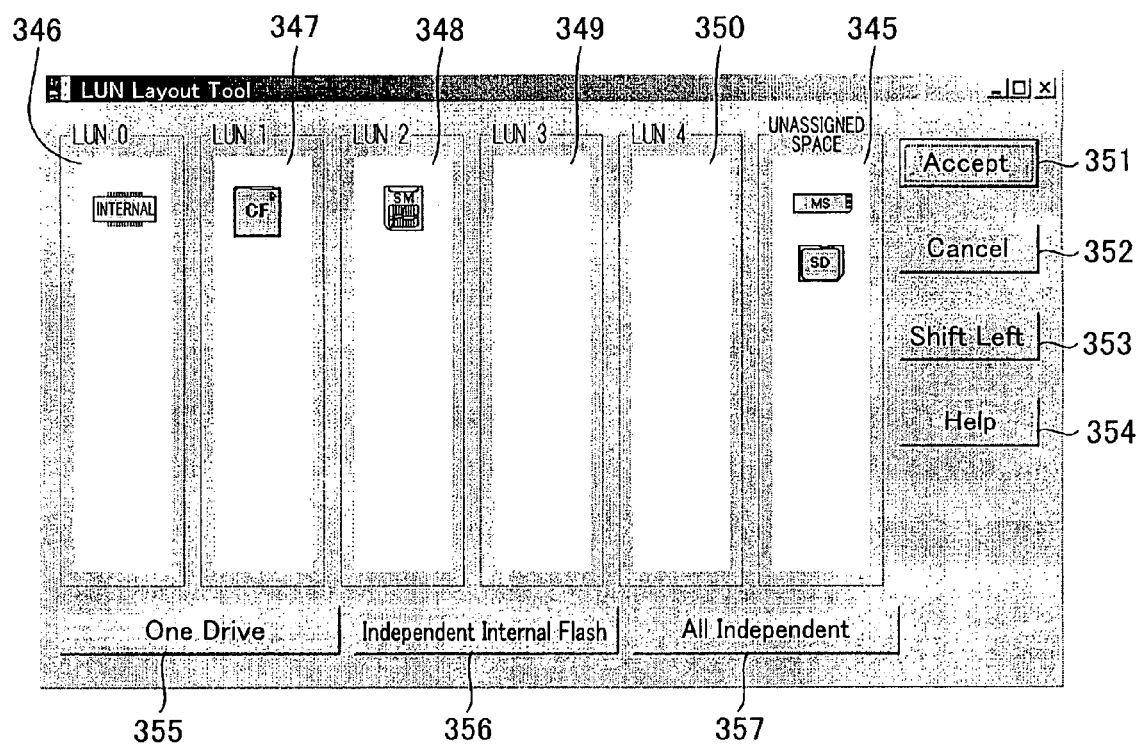
FIG. 57 is an explanatory diagram showing an example of the PC settings window for the LUN layout tool.

In the eighth through twelfth embodiments and modifications described above, the external memories 131-134 and the internal flash memory 126 are each set to (associated with) one of the logical units 346-350. However, an unassigned space 345 may be provided as shown in FIG. 57, for example, for placing media that are not set to any logical unit. In the example of FIG. 57, the third external memory (MS) 133 and the fourth external memory (SD) 134 are set in the unassigned space 345. Accordingly, the personal computer 330 does not recognize either of the memories 133 or 134 and, hence, cannot access these memories.

Providing the unassigned space 345 in this way is effective when, for example, the user wishes to strictly prevent the PC from recognizing media that are absolutely not used; the user does not want others to use media that the user does not use; or the user wishes to prevent external recognition and access in order to protect important data.

Further, it is obvious that the above-described embodiments are not limited to the five types of media described above (CompactFlash, SmartMedia, Memory Stick, Secure Digital, and the internal flash memory). For example, the embodiments can be applied to a multi-reader/writer and a multifunction device supporting such media as microdrives (trademark), multimedia cards (trademark), XD picture cards (trademark), Memory Stick Duo (trademark), mini-SDs (trademark), and PC cards.

It is noted that the CF and the Micro Drive card are according to the same standard, and therefore serve as the same type of media that can be inserted into the same slot. Similarly, the SD and the Multi Media card are according to the same standard, and therefore serve as the same type of media that can be inserted into the same slot.

While the invention has been described in detail with reference to the specific embodiments thereof, it would be apparent to those skilled in the art that various changes and modifications may be made therein without departing from the spirit of the invention.

What is claimed is:

1. A peripheral device capable of being connected to a data processing device, the peripheral device comprising:
    a memory receiving portion that is configured so as to be capable of receiving a plurality of memories;
    a mode setting portion that executes a mode setting operation that sets either one of an automatic switching mode and a multi-drive mode;
    a memory-state setting portion that sets, during the automatic switching mode, a single memory among the plurality of memories presently received in the memory receiving portion into a state accessible by the data processing device,
    the memory-state setting portion setting, during the multi-drive mode, two or more memories among the plurality of memories received in the memory receiving portion into states individually accessible by the data processing device; and
    a command receiving portion receiving a command indicating that the data processing device supports the multi-drive mode,
    the mode setting portion being configured so as to be capable of setting the multi-drive mode in response to the command received by the command receiving portion.

2. A peripheral device as claimed in claim 1,
    further comprising a mode selection portion that selects either one of the automatic switching mode and the multi-drive mode,
    the mode setting portion executing the mode setting operation to set the selected mode based on a selected result.

3. A peripheral device as claimed in claim 2,
    wherein the mode selection portion includes a mode selection switch enabling a user to select the automatic switching mode and the multi-drive mode,
    wherein the mode setting portion executes the mode setting operation to judge the mode selection switch and to set the user's selected mode based on the judged result.

4. A peripheral device as claimed in claim 1,
    wherein the mode setting portion maintains the automatic switching mode until the command receiving portion receives the command, the mode setting portion changing the automatic switching mode into the multi-drive mode upon receipt of the command.

5. A peripheral device as claimed claim 1,
    further comprising a mode selection switch enabling a user to select the automatic switching mode and the multi-drive mode,
    wherein the mode setting portion executes, in response to the command, the mode setting operation to judge the mode selection switch and to set the user's selected mode based on a judged result.

6. A peripheral device as claimed in claim 1,
    further comprising:
    a connecting portion connectable to the data processing device; and
    a monitoring portion monitoring communication between the connecting portion and the data processing device,
    the mode setting portion executing the mode setting operation when the monitoring portion detects that the communication is interrupted after being established.

7. A peripheral device as claimed in claim 1,
    further comprising an image recording portion recording an image based on data read from one memory received in the memory receiving portion.

8. A peripheral device as claimed in claim 1,
    wherein the memory receiving portion includes a plurality of external memory receiving portions, each of which is capable of receiving a corresponding type of external memory in a removable state, the corresponding type of external memory including at least one kind of memory that is receivable in the subject external memory receiving portion.

9. A peripheral device as claimed in claim 8,
    further comprising a memory storing the order in which at least one of the plurality of external memory receiving portions has received a corresponding external memory,
    wherein the memory-state setting portion selects, during the automatic switching mode, one external memory receiving portion that is presently receiving a corresponding external memory and that has received the corresponding external memory at a predetermined order among the plurality of external memory receiving portions.

10. A peripheral device as claimed in claim 1,
    wherein the memory receiving portion includes:
    one internal memory receiving portion receiving one internal memory in a fixed state; and
    at least one external memory receiving portion, each of which is capable of receiving a corresponding type of external memory in a removable state, the corresponding type of external memory including at least one kind of memory that is receivable in the subject external memory receiving portion,
    wherein the memory-state setting portion sets, during the automatic switching mode, either one of the internal memory and a single external memory receiving portion into a state accessible by the data processing device, the memory setting portion setting, during the multi-drive mode, the internal memory and the at least one external memory receiving portion into another state individually accessible by the data processing device.

11. A peripheral device as claimed in claim 10,
further comprising an access selection switch selecting either one of the internal memory and the at least one external memory receiving portion,
wherein when the access selection switch selects the at least one external memory receiving portion, the memory-state setting portion sets, during the automatic switching mode, a single external memory receiving portion that is presently receiving a corresponding memory to the state accessible by the data receiving device, and
wherein when the access selection switch selects the internal memory, the memory-state setting portion sets, during the automatic switching mode, the internal memory to the state accessible by the data receiving device.

12. A peripheral device as claimed in claim 10,
wherein the mode setting portion sets one of the automatic switching mode, the multi-drive mode, and a double-drive mode, the mode setting portion being configured so as to be capable of setting either one of the multi-drive mode and the double-drive mode in response to the command received by the command receiving portion, and
wherein the memory-state setting portion sets, during the double-drive mode, the internal memory and either one of the at least one memory receiving portion into another state individually accessible by the data processing device.

13. A peripheral device as claimed in claim 12,
further comprising:
a mode selection switch enabling a user to select the automatic switching mode and the multi-drive mode; and
a command receiving portion receiving a command indicating that the data processing device supports the multi-drive mode,
wherein the mode setting portion maintains the automatic switching mode until the command receiving portion receives the command, the mode setting portion judging the mode selection switch in response to the command and setting the multi-drive mode when the judged result indicates that the user's selected mode is the multi-drive mode and setting the double-drive mode when the judged result indicates that the user's selected mode is the automatic switching mode.

14. A peripheral device as claimed in claim 1,
wherein the memory-state setting portion includes a logical unit-assigning portion that assigns, during the automatic switching mode, a single logical unit to a single memory that is received in the memory receiving portion, the data processing device accessing the single memory, to which the single logical unit is assigned, by indicating the single logical unit,
the logical unit-assigning portion assigning, during the multi-drive mode, two or more logical units to two or more memories received in the memory receiving portion, the data processing device accessing individually the two or more memories, to which the two or more logical units are assigned, by indicating the two or more logical units.

15. A peripheral device as claimed in claim 14,
further comprising a transmission portion that transmits to the data processing device, upon receipt of a command from the data processing device during the automatic switching mode, data indicative of the single logical unit assigned to the single memory, thereby enabling the data processing device to indicate the single logical unit,
the transmission portion transmitting to the data processing device, upon receipt of the command from the data processing device during the multi-drive mode, data indicative of the two or more logical units assigned to the two or more memories, thereby enabling the data processing device to indicate the two or more logical units.

16. A peripheral device as claimed in claim 1,
further comprising: an association storage portion that stores data of association between a plurality of different types of memories that are receivable in the memory receiving portion and a plurality of logical units, at least one type of memory being associated to each of at least one logical unit among the plurality of logical units, the at least one logical unit including a predetermined one logical unit,
wherein the memory-state setting portion includes a logical unit-assigning portion that assigns, during the automatic switching mode, the predetermined logical unit to one type of memory that is received in the memory receiving portion and that is one of at least the at least one type of memory associated with the predetermined logical unit, the data processing device accessing the one type of memory, to which the predetermined logical unit is assigned, by indicating the predetermined logical unit,
the logical unit-assigning portion assigning, during the multi-drive mode, the at least one logical unit to at least one type of memory that is associated to the at least one logical unit, each logical unit being assigned to one type of memory that is associated to the subject logical unit, the data processing device accessing individually the at least one type of memory, to which the at least one logical unit is assigned, by indicating the at least one logical unit.

17. A peripheral device as claimed in claim 16,
wherein the logical unit-assigning portion assigns, during the automatic switching mode, the predetermined logical unit to one type of memory that is received in the memory receiving portion and that is associated with the predetermined logical unit.

18. A peripheral device as claimed in claim 16,
wherein the logical unit-assigning portion assigns, during the automatic switching mode, the predetermined logical unit to one type of memory that is received in the memory receiving portion and that is one of all the plurality of types of memories receivable in the memory receiving portion.

19. A peripheral device as claimed in claim 16,
further comprising a transmission portion that transmits, upon receipt of a command from the data processing device during the automatic switching mode, data indicative of the predetermined logical unit, thereby enabling the data processing device to indicate the predetermined logical unit,
the transmission portion transmitting, upon receipt of the command from the data processing device during the multi-drive mode, data indicative of the at least one logical unit, thereby enabling the data processing device to indicate the at least one logical unit.

20. A peripheral device as claimed in claim 16,
wherein the total number of the plurality of logical units is equal to the total number of the plurality of different types of memories receivable in the memory receiving portion.

21. A peripheral device as claimed in claim 16,
further comprising an association setting portion that sets the association between the plurality of different types of memories and the plurality of logical units, the association storage portion storing the set association.

22. A peripheral device as claimed in claim 21,
wherein the association storage portion further stores an additional logical unit, to which the association setting portion sets at least one type of memory that is receivable in the memory receiving portion and that is not to be accessed by the data processing device.

23. A peripheral device as claimed in claim 21,
wherein the association storage portion includes:
a first memory storing data of the association; and
a second memory storing the data of the association read from the first memory,
the logical unit-assigning portion executing the assigning operation based on the data of the association stored in the second memory,
wherein the association setting portion sets the data of the association in the first memory.

24. A peripheral device as claimed in claim 21,
wherein the association setting portion includes an input portion that receives data of a user's desired association,
the association setting portion sets the inputted user's desired association.

25. A peripheral device as claimed in claim 24,
further comprising:
a storing portion prestored with data of a plurality of different associations,
wherein the input portion includes a selection portion that enables the user to select his/her desired association among the plurality of different associations,
wherein the association setting portion sets the user's selected association.

26. A peripheral device as claimed in claim 21,
wherein the input portion includes a data receiving portion that receives the data of the user's desired association from the data processing device.

27. A peripheral device as claimed in claim 1, further comprising a transmission portion that transmits, to the data processing device, data indicative of a number of at least one memory that is accessible by the data processing device according to a mode that is set by the mode setting portion in response to the command received by the command receiving portion.

28. A peripheral device as claimed in claim 1, wherein the mode setting portion sets the multi-drive mode in response to the command received by the command receiving portion.

29. A peripheral device capable of being connected to a data processing device, the peripheral device comprising:
a plurality of memory receiving portions, each being configured so as to be capable of receiving one memory;
a mode setting portion setting either one of an automatic switching mode and a multi-drive mode;
a memory-state setting portion that sets, during the automatic switching mode, a single memory receiving portion into a state accessible by the data processing device, the memory setting portion setting, during the multi-drive mode, the plurality of memory receiving portions into another state individually accessible by the data processing device; and
a command receiving portion receiving a command indicating that the data processing device supports the multi-drive mode,
the mode setting portion being configured so as to be capable of setting the multi-drive mode in response to the command received by the command receiving portion.

30. A peripheral device as claimed in claim 29,
wherein the memory-state setting portion includes a logical unit-assigning portion that assigns, during the automatic switching mode, a single logical unit to one memory receiving portion that receives a corresponding memory, the data processing device accessing the one memory receiving portion, to which the single logical unit is assigned, by indicating the single logical unit,
the logical unit-assigning portion assigning, during the multi-drive mode, a plurality of logical units to the plurality of memory receiving portions in one-to-one correspondence with each other, the data processing device accessing individually the plurality of memory receiving portions, to which the plurality of logical units are assigned, by indicating the plurality of logical units.

31. A peripheral device as claimed in claim 30,
further comprising a memory storing the order in which the plurality of memory receiving portions has received the corresponding memories,
wherein the logical unit-assigning portion assigns, during the automatic switching mode, the single logical unit to one memory receiving portion that is presently receiving the corresponding memory and that has received the corresponding memory first among the plurality of memory receiving portions.

32. A peripheral device as claimed in claim 30,
wherein the logical unit-assigning portion assigns, during the multi-drive mode, a plurality of predetermined logical units to the plurality of memory receiving portions, in one-to-one correspondence with each other, in a predetermined order.

33. A peripheral device capable of being connected to a data processing device, the peripheral device comprising:
at least one memory receiving portion that is configured so as to be capable of receiving one memory;
an internal memory;
a mode setting portion setting either one of an automatic switching mode and a multi-drive mode;
a memory-state setting portion that sets, during the automatic switching mode, either one of the internal memory and a single memory receiving portion into a state accessible by the data processing device, the memory setting portion setting, during the multi-drive mode, the internal memory and the at least one memory receiving portion into another state individually accessible by the data processing device; and
a command receiving portion receiving a command indicating that the data processing device supports the multi-drive mode,
the mode setting portion being configured so as to be capable of setting the multi-drive mode in response to the command received by the command receiving portion.

34. A peripheral device as claimed in claim 33,
wherein the memory-state setting portion includes a logical unit-assigning portion that assigns, during the automatic switching mode, a single logical unit to either one of the one memory receiving portion and the internal memory, the data processing device accessing the either one of the one memory receiving portion and the internal memory, to which the single logical unit is assigned, by indicating the single logical unit,
the logical unit-assigning portion assigning, during the multi-drive mode, two or more logical units to the internal memory and the at least one memory receiving portion in one-to-one correspondence with each other, the data processing device accessing individually the internal memory and the at least one memory receiving portion, to which the two or more logical units are assigned, by indicating the two or more logical units.

35. A peripheral device as claimed in claim 34, wherein the logical unit-assigning portion assigns, during the automatic-switching mode, the single logical unit to one memory receiving portion that is presently receiving a corresponding memory, the data processing device accessing the memory receiving portion, to which the single logical unit is assigned, by indicating the single logical unit, and wherein the logical unit-assigning portion assigns, during the automatic-switching mode, the single logical unit to the internal memory when no memory receiving portion is presently receiving a corresponding memory, the data processing device accessing the internal memory, to which the signal logical unit is assigned, by indicating the single logical unit.

36. A peripheral device as claimed in claim 34, further comprising an access selection switch selecting either one of the internal memory and the at least one memory receiving portion, wherein when the access selection switch selects the at least one memory receiving portion, the logical unit-assigning portion assigns, during the automatic switching mode, the single logical unit to one memory receiving portion that is presently receiving a corresponding memory, and wherein when the access selection switch selects the internal memory, the logical unit-assigning portion assigns, during the automatic switching mode, the single logical unit to the internal memory.

37. A peripheral device as claimed in claim 34, wherein the mode setting portion sets one of the automatic switching mode, the multi-drive mode, and a double-drive mode, wherein the logical unit-assigning portion assigns, during the double-drive mode, two logical units to the internal memory and one memory receiving portion among the at least one memory receiving portion, the data processing device accessing individually the internal memory and the one memory receiving portion, to which the two logical units are assigned, by indicating the two logical units.

* * * * *